(12) United States Patent
Hommura et al.

(10) Patent No.: US 7,838,170 B2
(45) Date of Patent: Nov. 23, 2010

(54) MEMBRANE/ELECTRODE ASSEMBLY WITH MULTILAYERED CATHODE CATALYST FOR POLYMER ELECTROLYTE FUEL CELLS

(75) Inventors: Satoru Hommura, Chiyoda-ku (JP); Shinji Kinoshita, Chiyoda-ku (JP); Hiroshi Shimoda, Chiyoda-ku (JP); Susumu Saito, Chiyoda-ku (JP); Seigo Kotera, Chiyoda-ku (JP); Tetsuji Shimohira, Chiyoda-ku (JP); Hideki Nakagawa, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/533,667

(22) Filed: Jul. 31, 2009

(65) Prior Publication Data

US 2009/0291345 A1 Nov. 26, 2009

Related U.S. Application Data

(63) Continuation of application No. PCT/JP2008/051557, filed on Jan. 31, 2008.

(30) Foreign Application Priority Data

Jan. 31, 2007 (JP) ............................. 2007-022404
Jan. 31, 2007 (JP) ............................. 2007-022406
Jun. 4, 2007 (JP) ............................. 2007-147984

(51) Int. Cl.
*H01M 4/88* (2006.01)
(52) U.S. Cl. ........................ 429/529; 429/523; 429/483; 429/484
(58) Field of Classification Search ............. 429/12–34, 429/529, 523, 483, 484; 502/101
See application file for complete search history.

(56) References Cited

U.S. PATENT DOCUMENTS 6,977,234 B2 * 12/2005 Kosako et al. ............... 502/101

(Continued)

FOREIGN PATENT DOCUMENTS

JP 11-288727 10/1999

(Continued)

OTHER PUBLICATIONS

U.S. Appl. No. 11/771,332, filed Jun. 29, 2007, Shimohira, et al.

(Continued)

*Primary Examiner*—Dah-Wei D Yuan
*Assistant Examiner*—Zachary Best
(74) *Attorney, Agent, or Firm*—Oblon, Spivak, McClelland, Maier & Neustadt, L.L.P.

(57) ABSTRACT

To provide a membrane/electrode assembly for polymer electrolyte fuel cells, a polymer electrolyte fuel cell and processes for their production, which make it possible to stably exhibit a high power generation performance in various environments. A membrane/electrode assembly for polymer electrolyte fuel cells, which comprises a first electrode having a first catalyst layer and a first gas diffusion layer, a second electrode having a second catalyst layer and a second gas diffusion layer, and a polymer electrolyte membrane disposed between the first electrode and the second electrode, wherein the 90° peel strength at least one of the interface between the first electrode and the polymer electrolyte membrane and the interface between the second electrode and the polymer electrolyte membrane is at least 0.03 N/cm.

5 Claims, 22 Drawing Sheets

U.S. PATENT DOCUMENTS

| | | |
|---|---|---|
| 7,531,610 B2 | 5/2009 | Kaneko et al. |
| 2008/0138685 A1 | 6/2008 | Kaneko et al. |
| 2008/0138686 A1 | 6/2008 | Kotera et al. |
| 2008/0166601 A1 | 7/2008 | Honmura et al. |
| 2008/0193821 A1 | 8/2008 | Shimohira et al. |
| 2009/0004527 A1 | 1/2009 | Shimohira et al. |
| 2009/0042067 A1 | 2/2009 | Honmura et al. |
| 2009/0187044 A1 | 7/2009 | Kaneko et al. |

FOREIGN PATENT DOCUMENTS

| | | |
|---|---|---|
| JP | 2001-196068 | 7/2001 |
| JP | 2001196068 A * | 7/2001 |
| JP | 2001213987 (A) | 8/2001 |
| JP | 2001-338654 | 12/2001 |
| JP | 2001338654 A * | 12/2001 |
| JP | 2002367626 (A) | 12/2002 |
| JP | 2003217339 (A) | 7/2003 |
| JP | 2004127846 (A) | 4/2004 |
| JP | 2005071755 (A) | 3/2005 |
| JP | 2005166329 (A) | 6/2005 |
| JP | 2006260901 (A) | 9/2006 |
| JP | 2006312739 (A) | 11/2006 |

OTHER PUBLICATIONS

Yeh-Hung Lai, et al. "Viscoelastic Stress Model and Mechanical Characterizaton of Perfluorosulfonic Acid J(PFSA) Polymer Electrolyte Membranes" Third International Conference on Fuel Cell Science, Engineering and Technology, May 23-25, 2005 Fuelcell 2005-74120.

U.S. Appl. No. 12/483,315, filed Jun. 12, 2009, Kotera, et al.

* cited by examiner (A)

(B)

(a)

(b)

(a)

(b)

(a)

(b)

(a)

(b)

(a)

(b)

MEMBRANE/ELECTRODE ASSEMBLY WITH MULTILAYERED CATHODE CATALYST FOR POLYMER ELECTROLYTE FUEL CELLS

TECHNICAL FIELD

The present invention relates to a membrane/electrode assembly for polymer electrolyte fuel cells, a polymer electrolyte fuel cell, and processes for their production.

BACKGROUND ART

In recent years, solid electrolyte fuel cells are required to be operated under a low humidity environment, primarily in their use for automobiles. Therefore, a material which exhibits high proton conductivity in a low humidity environment is desired for a proton-conductive polymer contained in a polymer electrolyte membrane for a membrane/electrode assembly.

In actual driving of an automobile having a polymer electrolyte fuel cell mounted, the polymer electrolyte membrane will be exposed to various humidity environments. As a test to simulate such a situation, a cycle test (hereinafter referred to as a moistening/drying cycle test) has been proposed wherein the polymer electrolyte membrane is repeatedly exposed to each of a dried environment with a relative humidity of at most 25% and a moistening environment with a relative humidity of 100% (Non-Patent Document 1). In such a moistening/drying cycle test, the polymer electrolyte membrane swells in the moistening environment and shrinks in the dried environment and thus undergoes swelling and shrinkage repeatedly along with moistening and drying cycles and thus undergoes a dimensional change especially in a planar direction. Therefore, by the moistening/drying cycle test, it is possible to evaluate the mechanical durability of the membrane/electrode assembly in an environment where moistening and drying are repeated.

A polymer electrolyte fuel cell is constructed, for example, by stacking a plurality of membrane/electrode assemblies each having electrodes (a cathode (an air electrode) and an anode (a fuel electrode)) disposed on both sides of a polymer electrolyte membrane, via an electrically conductive separator having a gas channel formed therein. Each electrode is composed of a catalyst layer in contact with a polymer electrolyte membrane and a porous gas diffusion layer disposed outside of the catalyst layer.

It has been always required that a polymer electrolyte fuel cell has a high power generation performance. Accordingly, a material capable of exhibiting a high proton conductivity is required for a proton-conductive polymer contained in the polymer electrolyte membrane and catalyst layer of the membrane/electrode assembly.

In order to improve the proton conductivity of the proton-conductive polymer, the ion exchange capacity may be increased. However, if the ion exchange capacity is increased, the water content of the proton-conductive polymer will increase. If the water content of the proton-conductive polymer to be used for the catalyst layer becomes too high, the proton-conductive polymer will swell and clog void spaces in the catalyst layer, thus leading to a problem of a so-called flooding phenomenon. If the flooding phenomenon takes place, the diffusion of the gas supplied to the catalyst layer decreases, whereby the power generation performance of the polymer electrolyte fuel cell will be substantially deteriorated.

To cope with the above problem, a membrane/electrode assembly of the following (1) and a polymer electrolyte fuel cell of the following (2) have been proposed.

(1) A membrane/electrode assembly for polymer electrolyte fuel cells, which has a catalyst layer containing at least an electrode catalyst and a proton-conductive polymer on each side of a polymer electrolyte membrane, wherein at least one catalyst layer is made of a plurality of layers so that it has a proton-conductive polymer layer having EW (equivalent weight of proton-conductive exchange groups) different from the polymer electrolyte membrane at the interface where at least one of the catalyst layers is in contact with the polymer electrolyte membrane, and it has a gas diffusion layer containing at least an electrically conductive porous material and a fluoropolymer, on the side of the catalyst layer opposite to the side in contact with the polymer electrolyte membrane (Patent Document 1).

(2) A polymer electrolyte fuel cell comprising an anode, a cathode and a polymer electrolyte membrane disposed between the anode and the cathode, and designed to supply an anode reaction gas to the above anode and supply a cathode reaction gas to the above cathode thereby to generate an electric power by an electrochemical reaction, wherein the cathode is provided with a gas diffusion layer and a plurality of catalyst layers disposed between the gas diffusion layer and the polymer electrolyte membrane, and the ion exchange capacity X (meq/g dry resin) of the proton-conductive polymer contained in the innermost catalyst layer in contact with the polymer electrolyte membrane and the ion exchange capacity Y (meq/g dry resin) of the proton-conductive polymer contained in the outermost catalyst layer in contact with the gas diffusion layer satisfy the following conditions simultaneously (Patent Document 2):

$$0.88 \leq X \leq 1.50$$

$$0.70 \leq Y \leq 1.32$$

$$0.18 \leq (X-Y) \leq 0.70$$

Further, to cope with the above problem, a polymer electrolyte fuel cell is, for example, proposed which is designed so that on the surface of a cathode on the side opposite to the side in contact with a polymer electrolyte membrane, a gas containing oxygen is permitted to flow in parallel with said surface, and in the cathode, the ion exchange capacity of a proton-conductive polymer at a portion in contact with the upstream of the gas flow is "higher" than the ion exchange capacity of a proton-conductive polymer at a portion in contact with the downstream of the gas flow (Patent Document 3).

Non-Patent Document 1: Yeh-Hung Lai, Cortney K. Mittelsteadt, Craig S. Gittleman, David A. Dillard, "VISCOELASTIC STRESS MODEL AND MECHANCIALS CHARACTERIZATION OF PERFLUOROSULFONIC ACID (PFSA) POLYMER ELECTROLYTE MEBRANES", Proceedings of FUELCELL 2005, Third International Conference on Fuel Cell Science, Engineering and Technology, FUELCELL 2005, (2005), 74120

Patent Document 1: JP-A-11-288727
Patent Document 2: JP-A-2001-338654
Patent Document 3: JP-A-2001-196068

SUMMARY OF THE INVENTION

Technical Problem

In order to obtain a high proton conductivity in a low humidity environment, it is effective to improve the proton conductivity of a proton-conductive polymer, and for this purpose, ionic groups may be increased. Otherwise, in a membrane/electrode assembly, it is possible to improve the proton conductivity in a low humidity environment by reducing the thickness of the polymer electrolyte membrane.

However, if the ionic groups are increased, the water content of the proton-conductive polymer increases. If the water content of the proton-conductive polymer to be used for a polymer electrolyte membrane becomes too high, the proton-conductive polymer tends to swell, and in the above-mentioned moistening/drying cycle test, the swelling and shrinking degrees in the planar direction of the polymer electrolyte membrane become larger. As a result, in such a polymer electrolyte membrane, holes are likely to be formed, thus leading to deterioration of the mechanical durability of the membrane/electrode assembly.

Whereas, with a membrane/electrode assembly, if the thickness of the polymer electrolyte membrane is reduced, the mechanical strength of the polymer electrolyte membrane decreases, whereby the durability will be deteriorated.

Whereas, in the case of the membrane/electrode assembly of the above (1) and the polymer electrolyte fuel cell of the above (2), if the ion exchange capacity of the proton-conductive polymer used for the catalyst layer is further increased in order to further improve the power generation performance, there will be a problem that the proton-conductive polymer undergoes deformation by swelling and shrinkage along with the humidity changes during the operation of the polymer electrolyte fuel cell. Accordingly, the electrodes and the polymer electrolyte membrane tend to be peeled, whereby power generation may not be carried out stably.

Whereas, in the case of the polymer electrolyte fuel cell disclosed in Patent Document 3, if the ion exchange capacity of the proton-conductive polymer having a higher ion exchange capacity is further increased in order to further increase the power generation performance, there will be a problem that the proton-conductive polymer undergoes deformation by swelling and shrinkage along with the humidity changes during the operation of the polymer electrolyte fuel cell. Therefore, the electrodes and the polymer electrolyte membrane tend to be peeled, whereby power generation may not be carried out stably.

A first object of the present invention is to provide a membrane/electrode assembly for polymer electrolyte fuel cells, which is capable of exhibiting a high power generation performance even under a low humidity environment and which is excellent in durability in an environment where moistening and drying are repeated, preferably in durability within a wide temperature range of from high temperature to low temperature, and a process for its production.

A second object of the present invention is to provide a membrane/electrode assembly for polymer electrolyte fuel cells, a polymer electrolyte fuel cell and processes for their production, which make it possible to provide a high power generation performance stably in an environment covering from high humidity to low humidity conditions within a wide temperature range of from high temperature to low temperature.

Solution to Problem

The membrane/electrode assembly for polymer electrolyte fuel cells of the present invention comprises a first electrode having a first catalyst layer and a first gas diffusion layer, a second electrode having a second catalyst layer and a second gas diffusion layer, and a polymer electrolyte membrane disposed between the first electrode and the second electrode, wherein the 90° peel strength at least one of the interface between the first electrode and the polymer electrolyte membrane and the interface between the second electrode and the polymer electrolyte membrane is at least 0.03 N/cm.

Further, in the membrane/electrode assembly for polymer electrolyte fuel cells of the present invention, it is preferred that the first catalyst layer contains an electrode catalyst and a proton-conductive polymer; the second catalyst layer contains an electrode catalyst and a proton-conductive polymer; said polymer electrolyte membrane is disposed between the first catalyst layer and the second catalyst layer; the polymer electrolyte membrane has an proton conductivity of at least 0.05 S/cm in an atmosphere at a temperature of 80° C. under a relative humidity of 40%; the 90° peel strength between the polymer electrolyte membrane and the first gas diffusion layer is at least 0.03 N/cm; and the dimensional change when the first gas diffusion layer is immersed in warm water of 80° C., is less than 10%.

Further, in the membrane/electrode assembly for polymer electrolyte fuel cells of the present invention, it is preferred that the polymer electrolyte membrane is formed by casting a liquid composition having a proton-conductive polymer dispersed in a dispersing medium.

The process for producing a membrane/electrode assembly for polymer electrolyte fuel cells of the present invention, is a process for producing a membrane/electrode assembly for polymer electrolyte fuel cells, comprising a first electrode having a first catalyst layer containing an electrode catalyst and a proton-conductive polymer and a first gas diffusion layer, a second electrode having a second catalyst layer containing an electrode catalyst and a proton-conductive polymer and a second gas diffusion layer, and a polymer electrolyte membrane disposed between the first electrode and the second electrode, wherein the polymer electrolyte membrane has an proton conductivity of at least 0.05 S/cm in an atmosphere at a temperature of 80° C. under a relative humidity of 40%; the 90° peel strength between the polymer electrolyte membrane and the first gas diffusion layer is at least 0.03 N/cm; and the dimensional change when the first gas diffusion layer is immersed in warm water of 80° C., is less than 10%, which process comprises forming the first catalyst layer on the first gas diffusion layer, and then, bonding the first catalyst layer and the polymer electrolyte membrane.

The process for producing a membrane/electrode assembly for polymer electrolyte fuel cells of the present invention, is a process for producing a membrane/electrode assembly for polymer electrolyte fuel cells, comprising a first electrode having a first catalyst layer containing an electrode catalyst and a proton-conductive polymer and a first gas diffusion layer, a second electrode having a second catalyst layer containing an electrode catalyst and a proton-conductive polymer and a second gas diffusion layer, and a polymer electrolyte membrane disposed between the first electrode and the second electrode, wherein the polymer electrolyte membrane has an proton conductivity of at least 0.05 S/cm in an atmosphere at a temperature of 80° C. under a relative humidity of 40%; the 90° peel strength between the polymer electrolyte membrane and the first gas diffusion layer is at least 0.03 N/cm; and the dimensional change when the first gas diffusion layer is immersed in warm water of 80° C., is less than 10%, which process comprises forming the first catalyst layer on the polymer electrolyte membrane, and then, bonding the first catalyst layer and the first gas diffusion layer.

Further, in the process for producing a membrane/electrode assembly for polymer electrolyte fuel cells of the present invention, it is preferred that the polymer electrolyte membrane is formed by casting a liquid composition having a proton-conductive polymer dispersed in a dispersing medium.

Further, in the membrane/electrode assembly for polymer electrolyte fuel cells of the present invention, it is preferred that the first electrode having a first catalyst layer and a first gas diffusion layer, is a cathode having a cathode catalyst layer and a cathode gas diffusion layer, and the second electrode having a second catalyst layer and a second gas diffusion layer, is an anode having an anode catalyst layer and an anode gas diffusion layer.

Further, in the membrane/electrode assembly for polymer electrolyte fuel cells of the present invention, it is preferred that the cathode catalyst layer has a layer A containing a proton-conductive polymer with an ion exchange capacity of X meq/g dry resin and being in contact with the polymer electrolyte membrane, and a layer B containing a proton-conductive polymer with an ion exchange capacity of Y meq/g dry resin and being in contact with the cathode gas diffusion layer; said X and Y satisfy the following formulae (a) to (c) simultaneously; and the 90° C. peel strength at least one of the interface between the anode and the polymer electrolyte membrane and the interface between the cathode and the polymer electrolyte membrane, is at least 0.1 N/cm:

$$1.5 < X \leq 2.0 \quad (a)$$

$$0.9 < Y \leq 1.5 \quad (b)$$

$$0.18 \leq (X-Y) \quad (c)$$

Further, the process for producing a membrane/electrode assembly for polymer electrolyte fuel cells of the present invention, is a process for producing a membrane/electrode assembly for polymer electrolyte fuel cells, comprising an anode having a catalyst layer and a gas diffusion layer, a cathode having a catalyst layer and a gas diffusion layer, and a polymer electrolyte membrane disposed between the anode and the cathode, wherein the cathode catalyst layer has a layer A containing a proton-conductive polymer with an ion exchange capacity of X meq/g dry resin and being in contact with the polymer electrolyte membrane, and a layer B containing a proton-conductive polymer with an ion exchange capacity of Y meq/g dry resin and being in contact with the cathode gas diffusion layer; said X and Y satisfy the following formulae (a) to (c) simultaneously; and the 90° C. peel strength at least one of the interface between the anode and the polymer electrolyte membrane and the interface between the cathode and the polymer electrolyte membrane, is at least 0.1 N/cm:

$$1.5 < X \leq 2.0 \quad (a)$$

$$0.9 < Y \leq 1.5 \quad (b)$$

$$0.18 \leq (X-Y) \quad (c)$$

which process comprises a step of forming the polymer electrolyte membrane, and a step of applying a coating fluid for a catalyst layer, containing an electrode catalyst and a proton-conductive polymer, to at least one side of the polymer electrolyte membrane to form the anode catalyst layer or the cathode catalyst layer.

The polymer electrolyte fuel cell of the present invention comprises a membrane/electrode assembly having a polymer electrolyte membrane disposed between an anode having an anode catalyst layer and an anode gas diffusion layer, and a cathode having a cathode catalyst layer and a cathode gas diffusion layer, and a channel to let a gas containing oxygen flow along the surface of the cathode, wherein the 90° peel strength at least one of the interface between the anode and the polymer electrolyte membrane and the interface between the cathode and the polymer electrolyte membrane is at least 0.03 N/cm.

Further, in the polymer electrolyte fuel cell of the present invention, it is preferred that the cathode catalyst layer contains a proton-conductive polymer; the proton-conductive polymer contained in the cathode catalyst layer in contact with an inlet of the channel has an ion exchange capacity higher than that of the proton-conductive polymer contained in the cathode catalyst layer in contact with an outlet of the channel; and the 90° peel strength at least one of the interface between the anode and the polymer electrolyte membrane and the interface between the cathode and the polymer electrolyte membrane is at least 0.1 N/cm.

Further, in the polymer electrolyte fuel cell of the present invention, it is preferred that the ion exchange capacity of the proton-conductive polymer contained in the cathode catalyst layer is continuously or gradually decreased from the inlet side of the channel towards the outlet side of the channel.

Further, in the polymer electrolyte fuel cell of the present invention, it is preferred that the cathode catalyst layer is composed of two regions i.e. a region (A) on the inlet side of the channel and a region (B) on the outlet side of the channel, and the proton-conductive polymer contained in the region (A) has an ion exchange capacity higher than that of the proton-conductive polymer contained in the region (B).

The process for producing a polymer electrolyte fuel cell of the present invention is a process for producing the above-mentioned polymer electrolyte fuel cell of the present invention, which process comprises a step of forming the polymer electrolyte membrane, and a step of applying a coating fluid for a catalyst layer containing an electrode catalyst and a proton-conductive polymer to at least one side of the polymer electrolyte membrane to form the anode catalyst layer or the cathode catalyst layer.

Further, the process for producing a polymer electrolyte fuel cell of the present invention is a process for producing a polymer electrolyte fuel cell comprising a membrane/electrode assembly having a polymer electrolyte membrane disposed between an anode having an anode catalyst layer and an anode gas diffusion layer, and a cathode having a cathode catalyst layer and a cathode gas diffusion layer, and a channel to let a gas containing oxygen flow along the surface of the cathode, wherein the cathode catalyst layer contains a proton-conductive polymer; the proton-conductive polymer contained in the cathode catalyst layer in contact with an inlet of the channel has an ion exchange capacity higher than that of the proton-conductive polymer contained in the cathode catalyst layer in contact with an outlet of the channel; and the 90° peel strength at least one of the interface between the anode and the polymer electrolyte membrane and the interface between the cathode and the polymer electrolyte membrane is at least 0.1 N/cm, which process comprises a step of forming the polymer electrolyte membrane, and a step of applying a coating fluid for a catalyst layer containing an electrode catalyst and a proton-conductive polymer to at least one side of the polymer electrolyte membrane to form the anode catalyst layer or the cathode catalyst layer.

Further, in the process for producing a polymer electrolyte fuel cell of the present invention, it is preferred that the ion exchange capacity of the proton-conductive polymer contained in the cathode catalyst layer is continuously or gradually decreased from the inlet side of the channel towards the outlet side of the channel.

Further, in the process for producing a polymer electrolyte fuel cell of the present invention, it is preferred that the cathode catalyst layer is composed of two regions i.e. a region (A) on the inlet side of the channel and a region (B) on the outlet side of the channel, and the proton-conductive polymer contained in the region (A) has an ion exchange capacity higher than that of the proton-conductive polymer contained in the region (B).

EFFECTS OF THE INVENTION

The membrane/electrode assembly for polymer electrolyte fuel cells of the present invention can exhibit a high power generation performance in various environments.

According to the process for producing a membrane/electrode assembly for polymer electrolyte fuel cells of the present invention, it is possible to produce a membrane/electrode assembly for polymer electrolyte fuel cells which is capable of providing a high power generation performance stably in various environments.

The polymer electrolyte fuel cell of the present invention can exhibit a high power generation performance stably in various environments.

According to the process for producing a polymer electrolyte fuel cell of the present invention, it is possible to produce a polymer electrolyte fuel cell capable of providing a high power generation performance stably in various environments.

BRIEF DESCRIPTION OF DRAWINGS

In FIG. 12.

FIG. 14(a) is a plan view of the separator, and FIG. 14(b) is a plan view of the cathode.

FIG. 15(a) is a plan view of the separator, and FIG. 15(b) is a plan view of the cathode.

FIG. 16(a) is a plan view of the separator, and FIG. 16(b) is a plan view of the cathode.

FIG. 17(a) is a plan view of the separator, and FIG. 17(b) is a plan view of the cathode.

In FIG. 22.

In FIG. 23.

In FIG. 24.

In FIG. 25.

MEANINGS OF SYMBOLS

1-1, 2-1, 3-5: membrane/electrode assembly; 1-10, 2-10, 3-10: first electrode (cathode); 1-12, 2-12, 3-12: first catalyst layer; 1-14, 2-14, 3-14: first gas diffusion layer; 1-20, 2-20, 3-20: second electrode (anode); 1-22, 2-22, 3-22: second catalyst layer; 1-24, 2-24, 3-24: second gas diffusion layer; 1-30, 2-30, 3-30: polymer electrolyte membrane; 1-50, 2-50, 3-50: first intermediate; 1-60, 2-60, 3-60: second intermediate; 1-80, 2-80, 3-82, 3-84: separator; 2-82a, 2-84a: channel; 1-91, 2-90: test piece; 2-12a: layer A; 2-12b: layer B; 2-32, 3-32: layer Ma; 2-34, 3-34: layer Mb; 2-36, 3-36: layer Mc;

1-92, 2-92: roller; 1-94, 2-94: aluminum plate; 3-1: fuel cell; 3-12a: region (A); and 3-12b: region (B).

BEST MODE FOR CARRYING OUT THE INVENTION

In this specification, a group represented by the formula (α) will be referred to as a group (α). Groups represented by other formulae will be referred to in the same manner. Further, a compound represented by the formula (1) will be referred to as a compound (1). Compounds represented by other formulae will be referred to in the same manner.

First Embodiment

<Membrane/Electrode Assembly for Polymer Electrolyte Fuel Cells>

Figure 1:
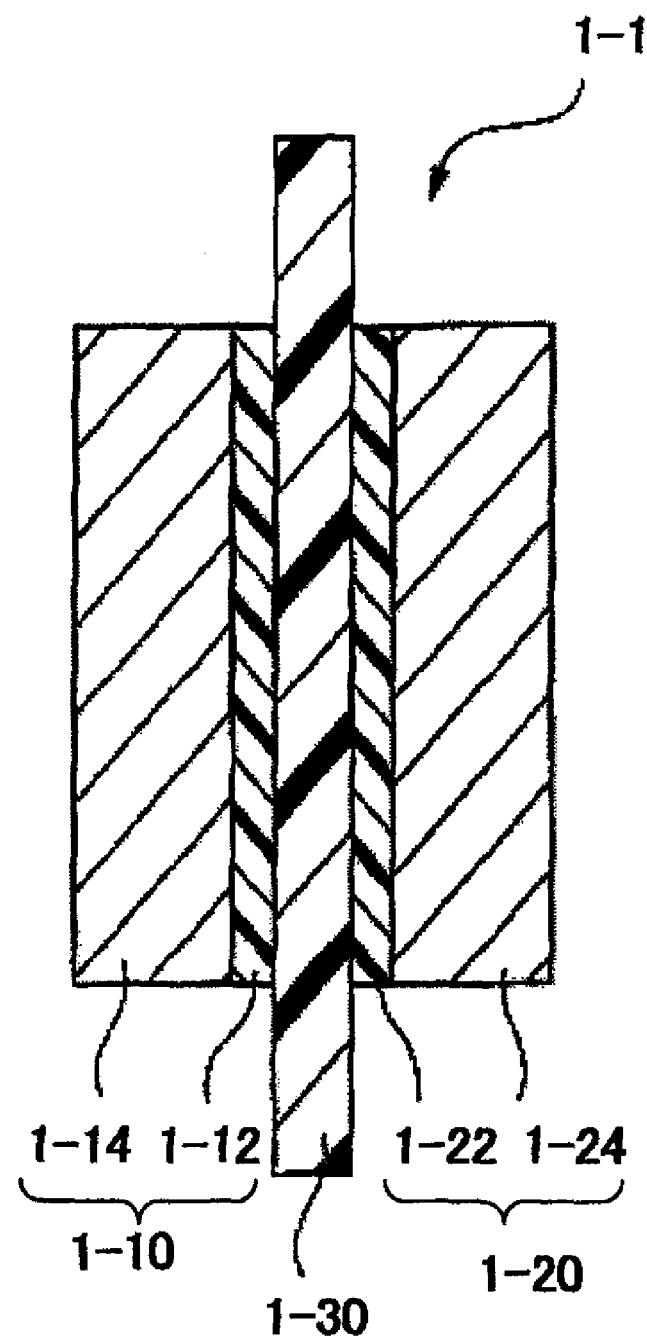
FIG. 1 is a schematic cross-sectional view illustrating an embodiment of the membrane/electrode assembly for polymer electrolyte fuel cells of the present invention.

FIG. 1 is a schematic cross-sectional view illustrating an example of the first embodiment of the membrane/electrode assembly for polymer electrolyte fuel cells (hereinafter referred to as a membrane/electrode assembly). The membrane/electrode assembly 1-1 comprises a first electrode 1-10 having a first catalyst layer 1-12 and a first gas diffusion layer 1-14, a second electrode 1-20 having a second catalyst layer 1-22 and a second gas diffusion layer 1-24, and a polymer electrolyte fuel cell 1-30 disposed between the first electrode 1-10 and the second electrode 1-20 in such a state as being in contact with the first catalyst layer 1-12 and the second catalyst layer 1-22.

Each of the first electrode 1-10 and the second electrode 1-20 may be an anode or a cathode, so long as they are mutually different.

In the membrane/electrode assembly 1-1, the 90° peel strength between the polymer electrolyte membrane 1-30 and the gas diffusion layer 1-14 (or 1-24) is at least 0.03 N/cm, preferably at least 0.07 N/cm, particularly preferably at least 0.1 N/cm.

When the 90° peel strength is at least 0.03 N/cm, the polymer electrolyte membrane 1-30 and the gas diffusion layer 1-14 (or 1-24) are bonded with a sufficient bond strength via the catalyst layer 1-12 (or 1-22). Accordingly, a high power generation performance can be obtained even in a low humidity environment, and the durability is excellent in an environment where moistening and drying are repeated. Especially when the 90° peel strength is at least 0.07 N/cm, deformation of the polymer electrolyte membrane 1-30 will be more suppressed, whereby the durability of the membrane/electrode assembly 1-1 in an environment where moistening and drying are repeated, will be further improved.

The method for measuring the 90° peel strength will be described hereinafter.

(Gas Diffusion Layer)

In the membrane/electrode assembly 1-1, the first gas diffusion layer 1-14 has a dimensional change of less than 10%, preferably less than 5%, when immersed in a warm water of 80° C., as measured by the following Procedures 1 to 4.

When the dimensional change is less than 10%, the function to suppress deformation particularly in a planar direction of the polymer electrolyte membrane 30, is provided when the membrane/electrode assembly 1-1 is exposed to a moistened or dried environment.

Especially when the dimensional change is less than 5%, the mechanical durability of the polymer electrolyte membrane 1-30 will be further improved. On the other hand, if the dimensional change is 10% or more, the effect to suppress deformation of the polymer electrolyte membrane 1-30 tends to be inadequate, whereby breakage of the polymer electrolyte membrane 1-30 due to the mechanical deterioration can not be suppressed.

Further, in the membrane/electrode assembly 1-1, the dimensional change of the second gas diffusion layer 1-24 is also preferably less than 10%.

The dimensional change of the first gas diffusion layer 1-14 is determined by the following Procedures 1 to 4.

Procedure 1: The first gas diffusion layer 1-14 is left to stand for at least 16 hours in an atmosphere at a temperature of 25° C. under a relative humidity of 50° C., whereupon the dimension (a) is measured.

Procedure 2: Then, the gas diffusion layer 1-14 is immersed in a warm water of 80° C. for 16 hours.

Procedure 3: Thereafter, the gas diffusion layer 1-14 is cooled to room temperature as immersed in the warm water and then taken out from the water, and the dimension (b) is measured.

Procedure 4: The dimensional change is calculated from the following formula.

$$\text{Dimensional change (\%)}=[\text{dimension }(b)-\text{dimension }(a)]/\text{dimension }(a)\times 100$$

The material for the first gas diffusion layer 1-14 and the second gas diffusion layer 1-24 (which may hereinafter be referred to generally as a gas diffusion layer) is not particularly limited, and an electrical conductive material such as a woven fabric of carbon fiber, carbon paper or carbon felt may, for example, be mentioned.

The thickness of the gas diffusion layer is preferably from 100 to 400 μm, more preferably from 140 to 350 μm.

The gas diffusion layer may have a porous layer (surface treated layer) composed mainly of carbon at the surface of the layer made of the electrically conductive material.

Such a porous layer preferably contains a fluorinated resin component such as a polytetrafluoroethylene, since it is thereby possible to improve the water repellency of the first catalyst layer 1-12 and the second catalyst layer 1-22. Such a porous layer is preferably used in close contact with the first catalyst layer 1-12 and the second catalyst layer 1-22.

(Polymer Electrolyte Membrane)

The polymer electrolyte membrane 1-30 is a membrane containing a proton-conductive polymer.

The polymer electrolyte membrane 1-30 preferably has an proton conductivity of at least 0.05 S/cm, more preferably at least 0.07 S/cm, in an atmosphere at a temperature of 80° C. under a relative humidity of 40%. When the proton conductivity is at least 0.05 S/cm, the membrane/electrode assembly 1-1 can provide a higher power generation performance even in a case where power generation is carried out in a high temperature and low humidity environment.

The proton conductivity of the polymer electrolyte membrane 1-30 is determined by the following method.

To a film (polymer electrolyte membrane 1-30) with a width of 5 mm, a substrate having four-terminal electrodes disposed at 5 mm intervals, is brought in close contact, and the resistance of the film is measured at an alternate current of 10 kHz at a voltage of 1V under a constant temperature and humidity condition at a temperature of 80° C. under a relative humidity of 40%, whereupon the proton conductivity is calculated from the result.

With the polymer electrolyte membrane 1-30, the water content when immersed in warm water of 80° C. is preferably less than 180 mass %, more preferably less than 150 mass %.

In order to increase the proton conductivity of the polymer electrolyte membrane 1-30, it is effective to increase the ion exchange capacity of the proton-conductive polymer. However, usually, as the ion exchange capacity of the proton-conductive polymer is increased, the water content when immersed in warm water tends to be high, and the dimensional change upon absorption of water tends to be large. Accordingly, the mechanical durability against the moisture changes due to repetition of moistening and drying tends to be deteriorated. When the water content is less than 180 mass %, the durability in an environment where moistening and drying are repeated, will be more improved.

The water content of the polymer electrolyte membrane 1-30 is determined by the following method.

The polymer electrolyte membrane 1-30 is immersed in warm water of 80° C. for 16 hours, and then, the polymer electrolyte membrane 1-30 is cooled to room temperature as immersed in warm water. Thereafter, the polymer electrolyte membrane 1-30 is taken out from the water, and water droplets attached to the surface of the polymer electrolyte membrane 1-30 are wiped off, and the mass upon absorption of water is immediately measured. Then, the polymer electrolyte membrane 1-30 is put in a globe box and left to stand for at least 24 hours in an atmosphere under circulation of dried nitrogen for drying. And, in the globe box, the dried mass of the polymer electrolyte membrane 1-30 is measured.

The difference between the mass upon absorption of water and the dried mass is the mass of water which the polymer electrolyte membrane 1-30 absorbs during the water absorption. And, the water absorption of the polymer electrolyte membrane 1-30 is obtained by the following formula:

Water content (%)=(mass of water which the polymer electrolyte membrane 1-30 absorbs during the water absorption/dried mass of the polymer electrolyte membrane 1-30)×100

The proton-conductive polymer may, for example, be a fluoropolymer having ionic groups or a hydrocarbon polymer having ionic groups, and from the viewpoint of the chemical durability, a fluoropolymer having ionic groups is preferred. The ionic groups may, for example, be sulfonic acid groups, sulfonimide groups or sulfonemethide groups.

As the fluoropolymer having ionic groups, a polymer (hereinafter referred to as polymer H) having sulfonic acid groups obtainable by hydrolyzing a polymer having repeating units based on the compound (1), followed by conversion to an acid-form, or a polymer (hereinafter referred to as polymer Q) having repeating units having a group (α) is preferred, and the polymer Q is more preferred.

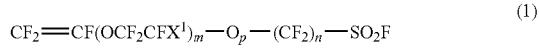

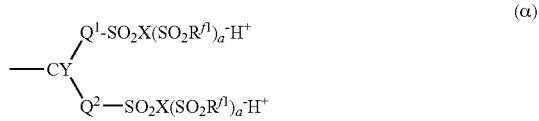

The symbols in the formulae have the following meanings.

In the formula (I), $X^1$ is a fluorine atom or a trifluoromethyl group, m is an integer of from 0 to 3, n is an integer of from 1 to 12, and p is 0 or 1.

In the group (α), $Q^1$ is a perfluoroalkylene group which may have an etheric oxygen atom, Q2 is a single bond or a perfluoroalkylene group which may have an etheric oxygen atom, $R^{f1}$ is a perfluoroalkyl group which may have an etheric oxygen atom, X is an oxygen atom, a nitrogen atom or a carbon atom, a is 0 when X is an oxygen atom, or 1 when X is a nitrogen atom, or 2 when X is a carbon atom, and Y is a fluorine atom or a monovalent perfluoroorganic group.

Polymer H:

As the compound (1), compounds (11) to (14) are preferred.

 (11)

 (12)

 (13)

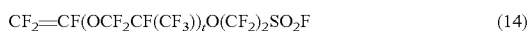 (14)

wherein q is an integer of from 1 to 8, r is an integer of from 1 to 8, s is an integer of from 1 to 8, and t is an integer of from 1 to 5.

The polymer H may further have repeating units based on the after-mentioned other monomers. Among repeating units based on other monomers, repeating units based on a perfluoromonomer are preferred from the viewpoint of the chemical durability, and repeating units based on tetrafluoroethylene are more preferred from the viewpoint of the chemical durability and mechanical strength.

As the polymer H, a perfluorocarbon polymer is preferred from the viewpoint of the chemical durability, Such a perfluorocarbon may have an etheric oxygen atom.

Polymer Q:

In the group (α), when the perfluoroalkylene group for $Q^1$ or $Q^2$ has an etheric oxygen atom, such oxygen atom may be one or more. Further, the oxygen atom may be inserted in the carbon atom-carbon atom bond of the perfluoroalkylene group or may be inserted at the carbon atom bond terminal.

The perfluoroalkylene group may be linear or branched, preferably linear.

The number of carbon atoms in the perfluoroalkylene group is preferably from 1 to 6, more preferably from 1 to 4. If the number of carbon atoms is too much, the boiling point of the fluoromonomer tends to be high, and purification by distillation tends to be difficult. Further, if the number of carbon atoms is too much, the ion exchange capacity of the polymer Q becomes low.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, the stability in the output voltage is excellent when the polymer electrolyte fuel cell is operated over a long period of time, as compared with a case where $Q^2$ is a single bond.

At least one of $Q^1$ and $Q^2$ is preferably a $C_{1-6}$ perfluoroalkylene group having an etheric oxygen atom. A fluoromonomer having a $C_{1-6}$ perfluoroalkylene group having an etheric oxygen atom can be synthesized without a fluorination reaction by fluorine gas, whereby the yield is good, and the production is easy.

The $-SO_2X(SO_2R^{f1})_a^-H^+$ group may, for example, be a sulfonic acid group ($-SO_3^-H^+$ group), a sulfonimide group ($-SO_2N(SO_2R^{f1})^-H^+$ group) or a sulfonemethide group ($-SO_2C(SO_2R^{f1})_2^-H^+$ group).

The perfluoroalkyl group for $R^{f1}$ may be linear or branched, preferably linear. The number of carbon atoms in $R^{f1}$ is preferably from 1 to 6, more preferably from 1 to 4. $R^{f1}$ may, for example, be preferably a perfluoromethyl group or a perfluoroethyl group.

In the case of the sulfonemethide group, two $R^{f1}$ may be the same groups or different groups.

Y is preferably a fluorine atom or a $C_{1-6}$ linear perfluoroalkyl group which may have an etheric oxygen atom.

The polymer Q may further have repeating units based on the after-mentioned other monomers. Among repeating units based on other monomers, repeating units based on a perfluoromonomer are preferred from the viewpoint of the chemical durability, and repeating units based on tetrafluoroethylene are more preferred from the viewpoint of the chemical durability and mechanical strength.

As the polymer Q, a perfluorocarbon polymer is preferred from the viewpoint of the chemical durability. Such a perfluorocarbon polymer may have an etheric oxygen atom.

The polymer Q may, for example, be produced via the following steps.

(I) Step of polymerizing a monomer having a group (β) (hereinafter referred to as a compound m1)) and, as the case requires, another monomer, to obtain a precursor polymer having —SO$_2$F groups (hereinafter referred to as a polymer P)

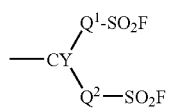

(β)

(II) Step of contacting the polymer P with fluorine gas to fluorinate unstable terminal groups of the polymer P, as the case requires (III) Step of converting —SO$_2$F groups in the polymer P to sulfonic acid groups, sulfonimide groups or sulfonemethide groups to obtain the polymer Q Step (I):

The compound (m1) can be obtained, for example, by a synthesis route as described in "PREPARATION (1) OF PROTON-CONDUCTIVE POLYMER" hereinafter.

Another monomer may, for example, be tetrafluoroethylene, chlorotrifluoroethylene, vinylidene fluoride, hexafluoropropylene, trifluoroethylene, vinyl fluoride, ethylene, $CF_2$=$CFOR^{f2}$, $CH_2$=$CHR^{f3}$ or $CH_2$=$CHCH_2R^{f3}$, wherein $R^{f2}$ is a $C_{1-12}$ perfluoroalkyl group which may contain an etheric oxygen atom, ad $R^{f3}$ is a $C_{1-12}$ perfluoroalkyl group. As another monomer, a perfluoromonomer is preferred, and tetrafluoroethylene is more preferred, from the viewpoint of the chemical durability.

The polymerization method may, for example, be a known polymerization method such as a bulk polymerization method, a solution polymerization method, a suspension polymerization method or an emulsion polymerization method.

The polymerization is carried out under a condition where radicals will be formed. The method to form radicals may, for example, be a method of applying a radiation such as ultraviolet ray, γ ray or electro ray, or a method of adding an initiator.

The polymerization temperature is usually from 20 to 150° C.

The initiator may, for example, be a bis(fluoroacyl)peroxide, a bis(chlorofluoroacyl)peroxide, a dialkylperoxydicarbonate, a diacylperoxide, a peroxyester, an azo compound or a persulfate. From such a viewpoint that it is possible to obtain a precursor polymer P having little unstable terminal groups, a perfluoro compound such as a bis(fluoroacyl)peroxide is preferred.

The solvent to be used for the solution polymerization method may, for example, be a polyfluorotrialkylamine compound, a perfluoroalkane, a hydrofluoroalkane, a chlorofluoroalkane, a fluoroolefin having no double bond at the molecular chain terminal, a polyfluorocycloalkane, a polyfluorocyclic ether compound, a hydrofluoroether, a fluorine-containing low molecular weight polyether or a tert-butanol.

Step (II):

The unstable terminal group is, for example, a group formed by a chain transfer reaction or a group derived from a radical initiator, and specifically, it may, for example, be a —COOH group, a —CF=CF$_2$ group, a —COF group or a —CF$_2$H group. By fluorinating the unstable terminal group, decomposition of the polymer Q can be suppressed.

The fluorine gas may be diluted with an inert gas such as nitrogen, helium or carbon dioxide, or may be used as it is without being diluted.

The temperature at the time of contacting the polymer P with fluorine gas is preferably from room temperature to 300° C., more preferably from 50 to 250° C., further preferably from 100 to 220° C., particularly preferably from 150 to 200° C.

The time for contacting the polymer P with fluorine gas is preferably from 1 minute to 1 week, more preferably from 1 to 50 hours.

Step (III):

For example, in a case where the —SO$_2$F groups are converted to sulfonic acid groups, Step (III-1) is carried out, and in a case where the —SO$_2$F groups are converted to sulfonimide groups, Step (III-2) is carried out.

(III-1) Step of hydrolyzing the —SO$_2$F groups in the polymer P to a sulfonic acid salt, and the sulfonic acid salt is converted to sulfonic acid groups by conversion to an acid-form (III-2) Step of converting —SO$_2$F groups in the polymer P to sulfonimide groups by sulfonimide modification Step (III-1):

The hydrolysis is carried out, for example, by contacting the polymer P with a based compound in a solvent. The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to an acid-form is carried out, for example, by contacting the polymer P wherein —SO$_2$F groups are hydrolyzed, with an aqueous solution of hydrochloric acid, sulfuric acid or the like.

The hydrolysis and the conversion to an acid form are carried out usually at a temperature of from 0 to 120° C.

Step (III-2):

As the sulfonimide-modification, a known method may be mentioned such as a method disclosed in U.S. Pat. No. 5,463,005 or a method disclosed in Inorg. Chem. 32(23), p. 5007 (1993).

The hydrocarbon polymer may, for example, be a sulfonated polyarylene, a sulfonated polybenzoxazole, a sulfonated polybenzothiazole, a sulfonated polybenzimidazole, a sulfonated polystyrene, a sulfonated polyethersulfone, a sulfonated polyether ethersulfone, a sulfonated polyphenylene sulfone, a sulfonated polyphenylene oxide, a sulfonated polyphenylene sulfoxide, a sulfonated polyphenylene sulfide, a sulfonated polyphenylene sulfidesulfone, a sulfonated polyether ketone, a sulfonated polyether ether ketone, a sulfonated polyether ketone, or a sulfonated polyimide.

The thickness of the polymer electrolyte membrane 1-30 is preferably at most 50 μm, particularly preferably from 5 to 30 μm. By adjusting the thickness of the polymer electrolyte membrane 1-30 to at most 50 μm, particularly at most 30 μm, deterioration in the power generation performance of the polymer electrolyte fuel cell in a low humidity environment can be more suppressed. By adjusting the thickness of the polymer electrolyte membrane 1-30 to at least 5 μm, short-circuiting can be avoided.

The polymer electrolyte membrane 1-30 may contain a reinforcing material, as the case requires.

As the reinforcing material, a porous body, fiber, woven fabric or non-woven fabric may, for example, be mentioned.

The material for the reinforcing material may, for example, be a polytetrafluoroethylene, a tetrafluoroethylene/hexafluoropropylene copolymer, a tetrafluoroethylene/perfluoro(alkyl vinyl ether) copolymer, a polyethylene, a polypropylene, a polyphenylene sulfide or a polyimide.

(Catalyst Layer)

A first catalyst layer 1-12 and a second catalyst layer 1-22 (which may generally be referred to as a catalyst layer) are a layer containing an electrode catalyst and a proton-conductive polymer.

The electrode catalyst may preferably be a supported catalyst having platinum or a platinum alloy supported on a carbon carrier.

The carbon carrier may, for example, be activated carbon or carbon black.

The specific surface area of the carbon carrier is preferably at least 200 $m^2/g$. The specific surface area of the carbon carrier is measured by nitrogen adsorption on the carbon surface by means of a BET specific surface area measuring apparatus.

Further, one graphitized by e.g. heat treatment is preferred in order to improve the chemical durability of the carbon carrier.

The platinum alloy is preferably an alloy of platinum with at least one metal selected from the group consisting of platinum group metals except for platinum (ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum with a metal which can be alloyed with platinum.

The supported amount of platinum or a platinum alloy is preferably from 10 to 70 mass % in the electrode catalyst (100 mass %).

The proton-conductive polymer may, for example, be the same one as the proton-conductive polymer contained in the polymer electrolyte membrane 1-30.

In a case where the proton-conductive polymer is a fluoropolymer, the ratio of the electrode catalyst to the fluoropolymer (electrode catalyst/proton-conductive polymer) is preferably from 4/6 to 9.5/0.5 (mass ratio), particularly preferably from 6/4 to 8/2, from the viewpoint of the proton conductivity and water repellency of the electrode.

The amount of platinum contained in the catalyst layer is preferably from 0.01 to 0.5 $mg/cm^2$, more preferably from 0.05 to 0.35 $mg/cm^2$, from the viewpoint of the optimum thickness to carry out an electrode reaction efficiently.

The thickness of the catalyst layer is preferably at most 20 μm, more preferably from 1 to 15 μm, with a view to facilitating the gas diffusion in the catalyst layer and improving the power generation performance of the polymer electrolyte fuel cell. Further, the thickness of the catalyst layer is preferably uniform. If the thickness of the catalyst layer is made thin, the amount of the electrode catalyst per unit area decreases, whereby the reaction activities are likely to be low. In such a case, if a supported catalyst is employed wherein platinum or a platinum alloy as an electrode catalyst is supported in a high supported ratio, it is possible to maintain the reaction activities of the electrode to be high without deficiency in the amount of electrode catalyst even if the catalyst layer is thin.

The catalyst layer may contain a water repellent with a view to increasing the effect to prevent flooding. Such a water repellent may, for example, be a copolymer of tetrafluoroethylene with hexafluoropropylene, a copolymer of tetrafluoroethylene with a perfluoroalkyl vinyl ether or a polytetrafluoroethylene. As the water repellent, a fluoropolymer which can be dissolved in a solvent, is preferred from such a viewpoint that the catalyst layer can easily be treated for water repellency.

The amount of the water repellent is preferably from 0.01 to 30 mass % in the catalyst layer (100 mass %).

In the membrane/electrode assembly 1-1 as described above, it is preferred that the polymer electrolyte membrane 1-30 has an proton conductivity of at least 0.05 S/cm in an atmosphere at a temperature of 80° C. under a relative humidity of 40%, the 90° peel strength between the polymer electrolyte membrane 1-30 and the first gas diffusion layer 1-14 is at least 0.03 N/cm, and the dimensional change when the first gas diffusion layer 1-14 is immersed in warm water of 80° C., is less than 10%.

When the proton conductivity of the polymer electrolyte membrane 1-30 is at least 0.05 S/cm, the membrane/electrode assembly 1-1 has good proton conductivity and can exhibit a higher power generation performance.

When the membrane/electrode assembly 1-1 is exposed to various humidity environments, the polymer electrolyte membrane 1-30 usually tends to absorb water depending upon the humidity environment, and it undergoes an isotropic dimensional change in the planar direction and the thickness direction. As the humidity environment undergoes moistening and drying repeatedly, the polymer electrolyte membrane 1-30 undergoes swelling and shrinkage repeatedly, whereby especially such repetition in the planar direction brings about mechanical fatigue, thus leading to breakage.

With the first gas diffusion layer 1-14 in the membrane/electrode assembly 1-1, the dimensional change as immersed in warm water of 80° C. is less than 10%, whereby even if the humidity environment changes, it scarcely undergoes a dimensional change. Accordingly, by adjusting the 90° peel strength between the first gas diffusion layer 1-14 and the polymer electrolyte membrane 1-30 to be at least 0.03 N/cm, the first gas diffusion layer 1-14 and the polymer electrolyte membrane 1-30 are firmly bonded, whereby deformation of the polymer electrolyte membrane 1-30 is suppressed especially in the planar direction. And, as the deformation of the polymer electrolyte membrane 1-30 is suppressed, no peeling between the first electrode 1-10 and the polymer electrolyte membrane 1-30 will take place. Thus, by the membrane/electrode assembly 1-1 of the present invention, a high power generation performance can be obtained in a low humidity environment, and it is possible to remarkably improve the durability in an environment where moistening and drying are repeated.

Figure 2:
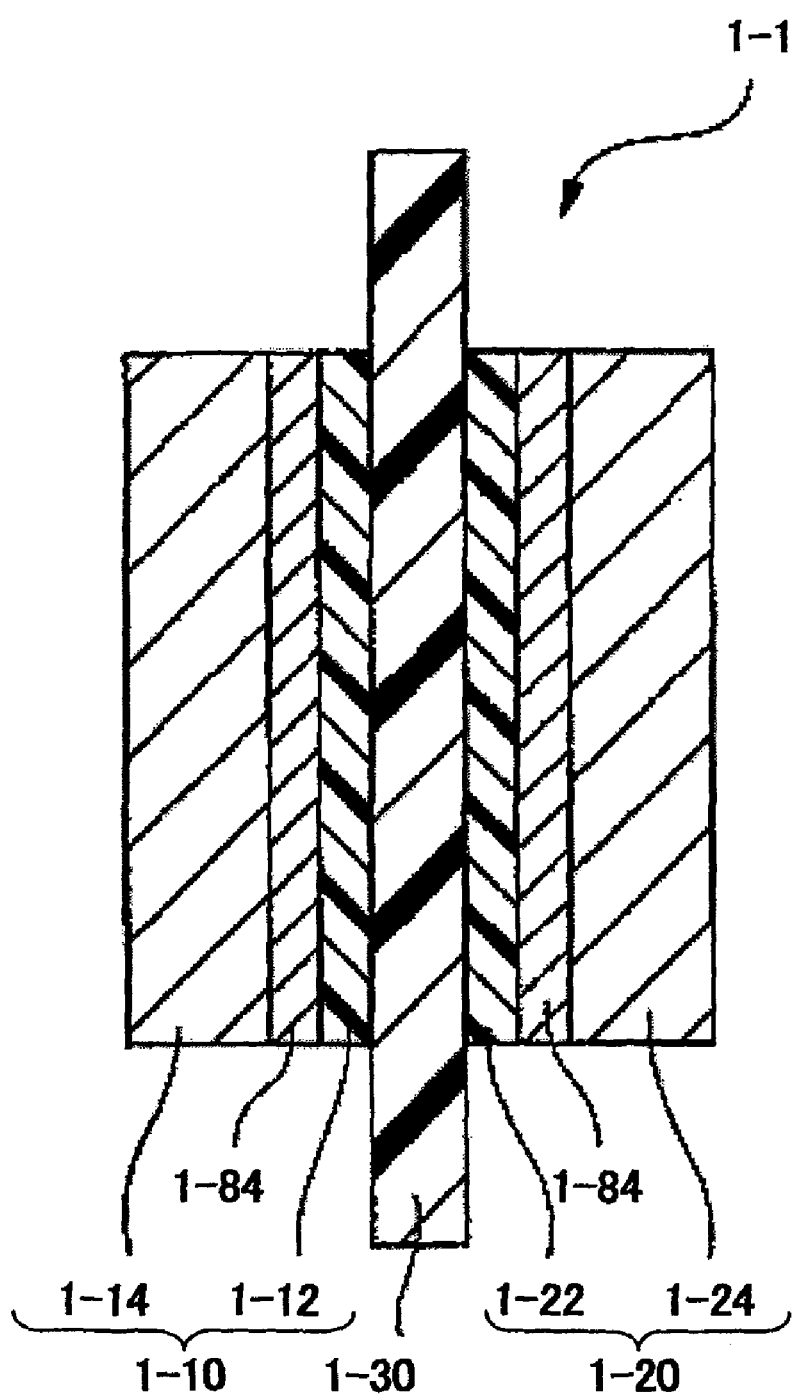
FIG. 2 is a schematic cross-sectional view illustrating another embodiment of the membrane/electrode assembly for polymer electrolyte fuel cells of the present invention.

Further, as shown in FIG. 2, the membrane/electrode assembly of the present invention may be one having an interlayer 1-84 between the first catalyst layer 1-12 and the first gas diffusion layer 1-14, and between the second catalyst layer 1-22 and the second gas diffusion layer 1-24. By such an interlayer 1-84, the bond strength between the gas diffusion layer and the catalyst layer is further improved, and their adhesion is further improved, whereby the effects of the present invention will be further improved.

The interlayer 1-84 may be provided only on one electrode side of the first electrode 1-10 and the second electrode 1-20.

The interlayer 1-84 may, for example, be a layer made of a proton-conductive polymer and a carbon material. The proton-conductive polymer has a function to improve the adhesion with the catalyst layer, and the carbon material has a function to secure the proton conductivity between the gas diffusion layer and the catalyst layer.

Such a proton-conductive polymer is not particularly limited, and may be the same one as the proton-conductive polymer contained in the above-mentioned polymer electrolyte membrane 1-30 and catalyst layer. By providing an interlayer 1-84 containing particularly the same one as the proton-conductive polymer contained in the catalyst layer, it is possible to further increase the bond strength between the catalyst layer and the gas diffusion layer.

As the carbon material, carbon fiber is particularly preferred, and carbon nanofiber is particularly preferred since it is fine and has an electron conductivity. Carbon nanofiber may, for example, be a vapor-grown carbon fiber, carbon nanotube (single wall, double wall, muiltiwail or cup-laminated type) or the like.

The fiber diameter of the carbon fiber is preferably from 50 to 200 nm, and the fiber length is preferably from 1 to 50 μm. By using such carbon fiber, it entangles with an electron-conductive material (platinum or a platinum alloy, and a carbon carrier) contained in the catalyst layer at the interface between the interlayer 1-84 and the catalyst layer to form a new electroconductive path in addition to an electroconductive path by a point contact with the electroconductive material, whereby the electron conductivity of the catalyst layer will be improved. Further, such carbon fiber is likely to be entangled to form void spaces at the time of applying a coating fluid containing the carbon fiber, whereby such void spaces will function as a gas channel.

The ratio of the carbon material to the proton-conductive polymer (carbon material/proton-conductive polymer) is preferably from 1/0.1 to 1/5 (mass ratio), more preferably from 1/0.2 to 1/1. Within such a range, the dispersibility of the carbon material, the adhesion between the interlayer 1-84 and the gas diffusion layer, and the gas diffusing property and water-discharging property of the interlayer 1-84 will be good.

The thickness of the interlayer 1-84 is preferably from 2 to 20 μm. Within such a range, the adhesion between the interlayer 84 and the gas diffusion layer will be good, and the contact resistance between the gas diffusion layer and the catalyst layer can be made sufficiently low, and the membrane/electrode assembly 1-1 can be made thin.

In the polymer electrolyte fuel cell, water (water vapor) will be formed in the catalyst layer on the cathode side, such water will be discharged out of the system via the gas diffusion layer disposed adjacent to the catalyst layer. By providing an interlayer 1-84 composed mainly of carbon fiber between the catalyst layer and the gas diffusion layer, water is readily transferred by a capillary phenomenon from the catalyst layer to the interlayer 1-84, whereby a flooding problem during the operation of the polymer electrolyte fuel cell may readily be solved.

<Process for Producing Membrane/Electrode Assembly for Polymer Electrolyte Fuel Cells>

The process for producing a membrane/electrode assembly 1-1 of the present invention is a process of bonding the first catalyst layer 1-12 formed on the first gas diffusion layer 1-14 with the above polymer electrolyte membrane 1-30, or a process of bonding the first catalyst layer 1-12 formed on the polymer electrolyte membrane 1-30 with the first gas diffusion layer 1-14.

Specifically, the following processes may be mentioned as the process for producing a membrane/electrode assembly 1.

(1-I) A process of bonding the first catalyst layer 1-12 formed on the first gas diffusion layer 1-14 and the second catalyst layer 1-22 formed on the second gas diffusion layer 1-24, with the polymer electrolyte membrane 1-30, respectively (1-II) A process of bonding the first catalyst layer 1-12 and the second catalyst layer 1-22 formed respectively on the polymer electrolyte membrane 1-30 with the first gas diffusion layer 1-14 and the second gas diffusion layer 1-24, respectively

[Process (1-I)]

Figure 3:
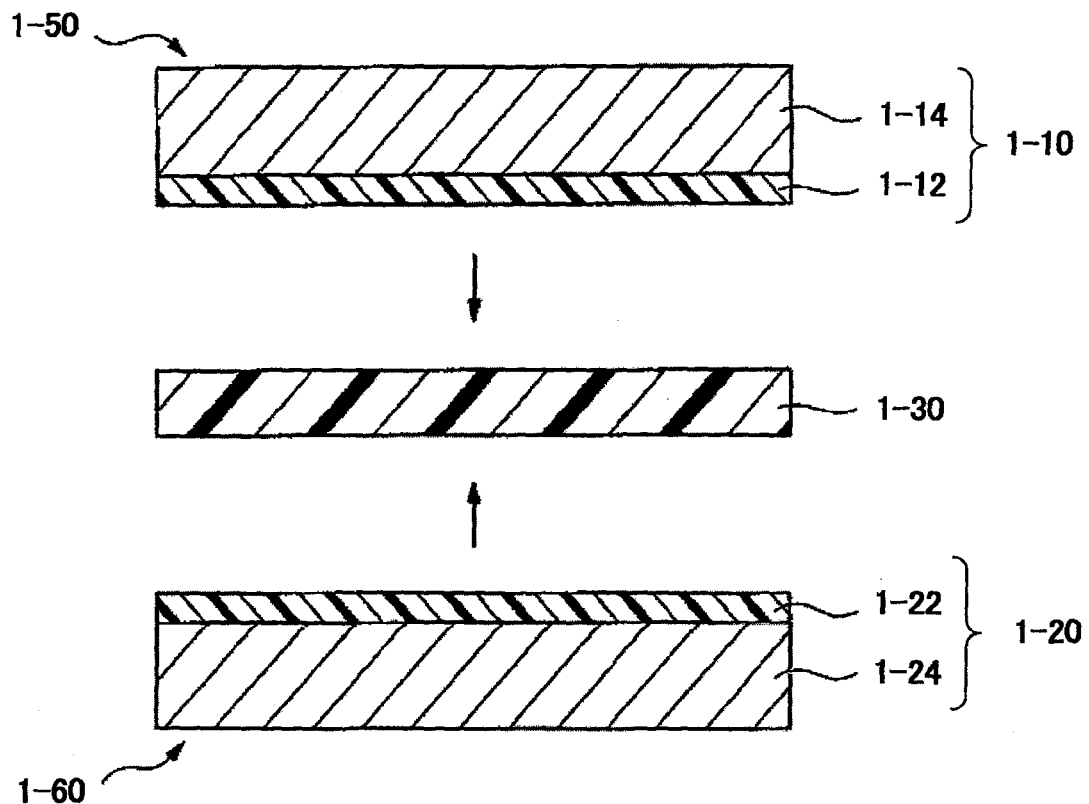
FIG. 3 is a schematic cross-sectional view illustrating one step in the process for producing a membrane/electrode assembly for polymer electrolyte fuel cells of the present invention.

The Process (1-I) may, for example, be a process having the following Steps (1-I-1) to (1-I-4). This process will be described with reference to FIG. 3.

(1-I-1) Step of forming a polymer electrolyte membrane 1-30 on the surface of a separately prepared substrate (hereinafter referred to as a "release substrate")

(1-I-2) Step of preparing a first intermediate 1-50 (i.e. first electrode 1-10) comprising a first gas diffusion layer 1-14 and a first catalyst layer 1-12

(1-I-3) Step of preparing a second intermediate 1-60 (i.e. second electrode 1-20) comprising a second gas diffusion layer 1-24 and a second catalyst layer 1-22

(1-I-4) Step of bonding the first intermediate 1-50, the polymer electrolyte membrane 1-30 and the second intermediate 1-60 so that the first catalyst layer 1-12 is located between the first gas diffusion layer 1-14 and the polymer electrolyte membrane 1-30, and the second catalyst layer 1-22 is located between the second gas diffusion layer 1-24 and the polymer electrolyte membrane 1-30, to obtain a membrane/electrode assembly 1-1

Step (1-I-1):

The polymer electrolyte membrane 1-30 can be formed by applying a liquid composition containing the proton-conductive polymer on the surface of the release substrate, followed by drying. Particularly, the polymer electrolyte membrane 1-30 is preferably formed by casting the liquid composition having the proton-conductive polymer dispersed in a dispersing medium, on the surface of the release substrate, and it is more preferably formed by further carrying out heat treatment after the casting. It is thereby possible to readily obtain a polymer electrolyte membrane 1-30 which is thin and has a uniform thickness.

As the release substrate, a resin film may be mentioned.

The material for the resin film may, for example, be a non-fluoropolymer such as polyethylene terephthalate, polyethylene, polypropylene or polyimide; or a fluororesin such as polytetrafluoroethylene, an ethylene/tetrafluoroethylene copolymer (ETFE), an ethylene/hexafluoropropylene copolymer, a tetrafluoroethylene/perfluoro(alkyl vinyl ether) copolymer or a polyvinylidene fluoride.

The non-fluororesin film is preferably surface-treated with a release agent.

The liquid composition is prepared by dissolving the proton-conductive polymer in a solvent, or by dispersing it in a dispersion medium.

The liquid composition is preferably a dispersion having the proton-conductive polymer dispersed in a dispersion medium.

The dispersion medium is preferably a dispersion medium containing an organic solvent having a hydroxyl group and water.

The organic solvent having a hydroxyl group is preferably an alcohol having from 1 to 4 carbon atoms in its main chain, such as methanol, ethanol, n-propanol, isopropanol, tert-butanol or n-butanol. One type of such an organic solvent having a hydroxyl group may be used alone, or more than one type may be used as mixed.

The dispersion medium may contain a fluorinated solvent.

The fluorinated solvent may, for example, be the following compounds.

Hydrofluorocarbon: 2H-perrfluoropropane, 1H,4H-perfluorobutane, 2H,3H-perfluoropetane, 3H,4H-perfluoro(2-methylpentane), 2H,5H-perfluorohexane, 3H-perfluoro(2-methylpentane), etc.

Fluorocarbon: perfluoro(1,2-dimethylcyclobutane), perfluorooctane, perfluoroheptane, perfluorohexane, etc.

Hydrochlorofluorocarbon: 1,1-dichloro-1-fluoroethane, 1,1,1-trifluoro-2,2-dichloroethane, 3,3-dichloro-1,1,1,2,2-pentafluoropropane, 1,3-dichloro-1,1,2,2,3-pentafluoropropane, etc.

Fluoroether: 1H,4H,4H-perfluoro(3-oxapentane), 3-methoxy-1,1,1,2,3,3-hexafluoropropane, etc.

Fluorinated alcohol: 2,2,2-trifluoroethanol, 2,2,3,3,3-pentafluoro-1-propanol, 1,1,1,3,3,3-hexafluoro-2-propanol, etc.

Further, in a case where the proton-conductive polymer is a hydrocarbon polymer, the solvent may, for example, be N,N-dimethylformamide, dimethylsulfoxide, methylene chloride, chloroform, carbon tetrachloride, 1,1,1-trichloroethane, 1,1,2-trichloroethane, trichloroethylene or tetrachloroethylene.

The method for preparing the coating fluid for the electrolyte membrane may, for example, be a method of exerting shearing to the proton-conductive polymer in a solvent under atmospheric pressure or in a closed condition by means of e.g. an autoclave.

The preparation temperature is preferably from 0 to 250° C., more preferably from 20 to 150° C. If necessary, shearing by e.g. ultrasonic waves may be imparted.

The solid content concentration of the coating fluid for the electrolyte membrane is preferably from 15 to 30 mass %, more preferably from 20 to 30 mass %.

By adjusting the solid content concentration of the coating fluid to be within such a range, the coating fluid will have a proper viscosity and can be applied uniformly, and the coating film thereby formed will be free from cracking.

The proportion of the organic solvent having a hydroxyl group in the liquid composition is preferably from 1 to 90 mass %, more preferably from 1 to 60 mass %, in the dispersion medium (100 mass %).

The proportion of water in the liquid composition is preferably from 10 to 99 mass %, more preferably from 40 to 99 mass %, in the dispersion medium (100 mass %). By increasing the proportion of water, it is possible to improve the dispersibility of the proton-conductive polymer in the dispersion medium.

The proportion of the proton-conductive polymer in the liquid composition is preferably from 1 to 50 mass %, more preferably from 3 to 30 mass %, in the liquid composition (100 mass %).

The method for preparing the liquid composition may, for example, be a method of exerting shearing to the proton-conductive polymer in a dispersion medium under atmospheric pressure or in a closed condition by means of e.g. an autoclave.

The preparation temperature is preferably from 0 to 250° C., more preferably from 20 to 150° C. If necessary, shearing by ultrasonic waves may be imparted.

The coating method is not particularly limited, and a batch method or a continuous method may be mentioned.

The batch method may, for example, be a bar coating method, a spin coating method or a screen printing method.

The continuous method may, for example, be a post measuring method or a preliminary measuring method. The post measuring method is a method wherein an excess coating fluid is applied, and then, the coating fluid is removed to obtain a prescribed film thickness. The preliminarily measuring method is a method wherein the coating fluid is applied in an amount required to obtain a predetermined film thickness.

The post-measuring method may, for example, be an air doctor coating method, a blade coating method, a rod coating method, a knife coating method, a squeeze coating method, an impregnation coating method or a comma coating method.

The preliminary measuring method may, for example, be a die-coating method, a reverse roll coating method, a transfer roll coating method, a gravure coating method, a kiss roll coating method, a cast coating method, a spray coating method, a curtain coating method, a calendar coating method or an extrusion coating method.

In order to form a uniform polymer electrolyte membrane 1-30, a screen printing method or a die-coating method is preferred and in consideration of economical efficiency, a die coating method of continuous type is more preferred.

The temperature for drying after applying the coating fluid for the electrolyte membrane is preferably from 70 to 170° C. After applying and drying or at the same time as drying the coating fluid for the electrolyte membrane, anneal treatment may be carried out. The temperature for the anneal treatment is preferably from 100 to 250° C., more preferably from 130 to 220° C. The optimum temperature for the anneal treatment varies depending upon the polymer constituting the polymer electrolyte membrane 1-30, and it is preferred to carry out anneal treatment at a temperature higher than the glass transition temperature (Tg) of the polymer and not higher than (Tg+100)° C. By forming a catalyst layer 1-12 on the polymer electrolyte membrane 1-30 having anneal treatment carried out within the above temperature range, it is possible to obtain a membrane/electrode assembly 1 with a high output power.

The time for anneal treatment is preferably from 5 minutes to 3 hours, particularly preferably from 10 minutes to 1 hour. When the time for anneal treatment is at least 5 minutes, the above effects can easily be obtainable. When the time for anneal treatment is at most 3 hours, the productivity will be improved.

Further, if the membrane/electrode assembly 1 is used for a long time, the output power decreases due to deterioration of the polymer electrolyte membrane 1-30. Such deterioration is considered to be attributable to formation of a peroxide. Therefore, it is also preferred to add a inhibitor to inhibit formation of a peroxide to the polymer electrolyte membrane 1-30. Such an inhibitor is preferably incorporated in the coating fluid for the electrolyte membrane.

Step (1-I-2):

The method for forming the first catalyst layer 1-12 on the first gas diffusion layer 1-14 is not particularly limited. A method for forming it by applying a coating fluid for forming a first catalyst layer containing an electrode catalyst and a proton-conductive polymer on the first gas diffusion layer 1-14, followed by drying, is preferred, and more preferred is a method of forming it by applying and drying the coating fluid for forming such a catalyst layer, followed by heat treatment.

It is thereby possible to bond the first gas diffusion layer 1-14 and the first catalyst layer 1-12 with a high bond strength, whereby deformation of the polymer electrolyte membrane 1-30 can be suppressed, and the effects of the present invention will be obtainable more easily.

As the first gas diffusion layer 1-14, an electrically conductive material such as carbon fiber woven fabric, carbon paper or carbon felt may be used as it is.

In a case where the first gas diffusion layer 1-14 has, on its surface, a porous layer (surface-treated layer) composed mainly of carbon, such a porous layer is preferably disposed on the first catalyst layer 1-12 side.

The coating fluid for forming the first catalyst layer is a dispersion having the electrode catalyst and the proton-conductive polymer dispersed in a dispersion medium.

The dispersion medium may be the same one as the dispersion medium in the above-mentioned liquid composition.

The coating fluid for forming the catalyst layer can be prepared, for example, by mixing the above-mentioned liquid composition with a dispersion of the electrode catalyst.

The viscosity of the coating fluid for forming the catalyst layer varies depending upon the method for forming the first catalyst layer 1-12, and it may be a dispersion having a viscosity of about a few tens cP or may be a paste-like dispersion having a viscosity of about 20,000 cP.

Further, the coating fluid for forming the catalyst layer may contain a thickening agent to adjust the viscosity. Such a thickening agent may, for example, be ethylcellulose, methylcellulose, a cellosolve type thickening agent, or a fluorinated solvent (such as pentafluoropropanol or flon).

The coating method is not particularly limited, and the same method as the coating method for the liquid composition in the case of the above polymer electrolyte membrane 1-30 may be employed.

The drying temperature is preferably from 70 to 170° C.

The heat treatment temperature is preferably from 130 to 220° C. If the temperature for heat treatment is too low, depending upon the type of the proton-conductive polymer, the polymer skeleton will not be stabilized, and the water content tends to be higher than the usual water content. Further, if the temperature for heat treatment is too high, the thermal decomposition of ionic groups is likely to take place, and the water content tends to be lower than the usual water content. However, depending upon the temperature for heat treatment, the carbon carrier of the catalyst is likely to be decomposed by oxidation. Accordingly, the heat treatment is preferably carried out in nitrogen atmosphere or in an environment under reduced pressure or having oxygen in the catalyst layer reduced under a pressure of e.g. pressing. Further, in order to suppress the decomposition by oxidation, a carbon carrier graphitized by e.g. heat treatment may be used as a carbon carrier.

Step (1-I-3):

The method of forming the second catalyst layer 1-22 on the second gas diffusion layer 1-24 is not particularly limited. A method of forming it by applying a coating fluid for forming a second catalyst layer containing an electrode catalyst and a proton-conducive polymer on the second gas diffusion layer 1-24, followed by drying, is preferred, and more preferred is a method of forming it by applying and drying the coating fluid for forming the catalyst layer, followed by heat treatment.

It is thereby possible to bond the second gas diffusion layer 1-24 and the second catalyst layer 1-22 with a high bond strength, whereby deformation of the polymer electrolyte membrane 1-30 can be suppressed, and the effects of the present invention can be more readily obtainable.

A specific preparation method may be the same preparation method as in Step (1-I-2) except that in Step (1-I-2), the coating fluid for forming the first catalyst layer is changed to the coating fluid for forming the second catalyst layer.

Step (1-I-4):

The bonding method may, for example be, a hot pressing method, hot roll pressing or ultrasonic wave fusion, and a hot pressing method is preferred from the viewpoint of the in-plane uniformity.

The temperature of the pressing plate in the pressing machine is preferably from 100 to 150° C., and the pressing pressure is preferably from 0.5 to 2.0 MPa.

[Process (1-II)]

Figure 4:
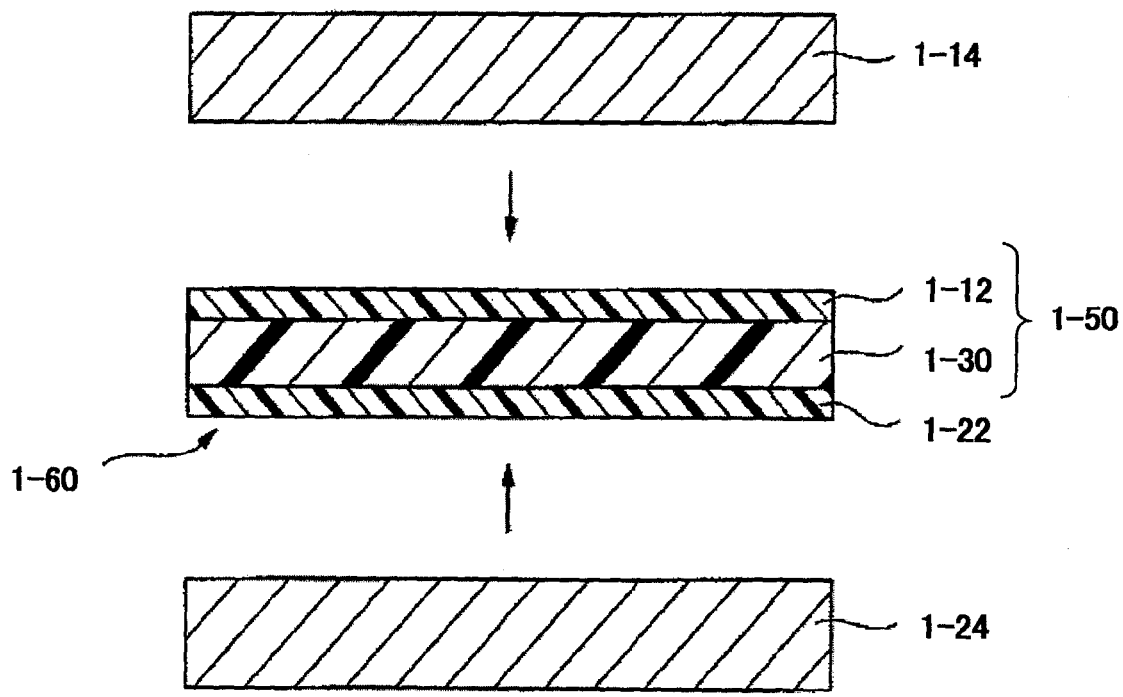
FIG. 4 is a schematic cross-sectional view illustrating one step in the process for producing a membrane/electrode assembly for polymer electrolyte fuel cells of the present invention.

The Process (1-II) may, for example, be a process having the following Steps (1-II-1) to (1-II-4). This process will be described with reference to FIG. 4.

(1-II-1) Step of forming a polymer electrolyte membrane 1-30 on the surface of a separately prepared release substrate (1-II-2) Step of forming a first catalyst layer 1-12 on one side of the polymer electrolyte membrane 1-30 to prepare a first intermediate comprising the polymer electrolyte membrane 1-30 and the first catalyst layer 1-12

(1-II-3) Step of releasing the release substrate from the first intermediate 1-50 and forming a second catalyst layer 1-22 on the side of the polymer electrolyte membrane 1-30 opposite to the side of the first catalyst layer 1-12 to prepare a second intermediate 1-60 comprising the first catalyst layer 1-12, the polymer electrolyte membrane 1-30 and the second catalyst layer 1-22

(1-II-4) Step of bonding the first gas diffusion layer 1-14, the second intermediate 1-60 and the second gas diffusion layer 1-24 so that the first catalyst layer 1-12 is located between the first gas diffusion layer 1-14 and the polymer electrolyte membrane 1-30, and the second catalyst layer 1-20 is located between the second gas diffusion layer 1-24 and the polymer electrolyte membrane 1-30, to obtain a membrane/electrode assembly 1-1

Step (1-II-1):

This step may be carried out in the same manner as in Step (1-I-1).

Step (1-II-2):

The method of forming the first catalyst layer 1-12 on one side of the polymer electrolyte membrane 1-30 is not particularly limited, and for example, it may be formed by the following method.

1) A method of applying the coating fluid for forming the first catalyst layer on a suitable release substrate, followed by drying and heat treatment and then by transferring it on the polymer electrolyte membrane 1-30.

2) A method of applying the coating fluid for forming the first catalyst layer on the polymer electrolyte membrane 1-30, followed by drying and heat treatment.

In the above two methods, the drying temperature and the temperature for heat treatment after the application of the coating fluid for forming the first catalyst layer, and conditions, may be the same temperatures and conditions as in Step (1-I-2).

Especially, the method 2) is preferred, since the solid electrolyte membrane 1-30 and the first catalyst layer 1-12 can thereby be bonded with a high bond strength, whereby deformation of the polymer electrolyte membrane 1-30 can be suppressed, and the effects of the present invention can more readily be obtainable.

Step (1-II-3):

The second intermediate 1-60 is prepared by releasing the release substrate from the first intermediate 1-50 and forming a second catalyst layer 1-22 on the side of the polymer electrolyte membrane 1-30 opposite to the side of the first catalyst layer 1-12.

The method and conditions for forming the second catalyst layer 1-22 on the surface of the polymer electrolyte membrane 1-30 may be the same method and conditions as in Step (1-II-2) except that in Step (1-II-2), the coating fluid for forming the first catalyst layer is changed to the coating fluid for forming the second catalyst layer.

Further, in a case where the method 1) is employed in Step (1-II-2), without via the first intermediate 1-50, the release substrate may be released from the polymer electrolyte membrane 1-30, and the first catalyst layer 1-12 and the second catalyst layer 1-22 may be simultaneously transferred to the respective surfaces of the polymer electrolyte membrane 1-30 to directly prepare the second intermediate 1-60.

Otherwise, in Step (1-II-2), the second catalyst layer 1-22 may preliminarily be formed on one side of the polymer electrolyte membrane 1-30, and in Step (1-II-3), the first catalyst layer 1-12 may subsequently formed on the side of the polymer electrolyte membrane 1-30 opposite to the side of the second catalyst layer 1-22.

Step (1-II-4):

The method for preparing the first gas diffusion layer 1-14 and the second gas diffusion layer 1-24 may be the same method and conditions as in Step (1-I-2).

Further, the bonding method and conditions may be the same method and conditions as in Step (1-I-4).

Further, in the membrane/electrode assembly to be produced by the process of the present invention, an interlayer 1-84 may be provided between the gas diffusion layer and the catalyst layer as shown in FIG. 2 in order to improve the adhesion between the gas diffusion layer and the catalyst layer by increasing the bond strength between them. Particularly, it is preferred to provide such an interlayer 1-84 at the time of bonding the gas diffusion layer and the catalyst layer by e.g. hot pressing.

The membrane/electrode assembly shown in FIG. 2 can be produced by using a laminate comprising the gas diffusion layer and the interlayer 84, which is preliminarily formed by providing the interlayer 1-84 on the surface of the gas diffusion layer on the catalyst layer side in the above-mentioned Production Process ((1-I-2), (1-I-3) or (1-II-4)).

The interlayer 1-84 may be formed, for example, by applying a coating fluid for forming an interlayer prepared by mixing carbon particles or carbon fiber with the above-mentioned liquid composition, on the gas diffusion layer, followed by drying.

<Polymer Electrolyte Fuel Cell>

Figure 5:
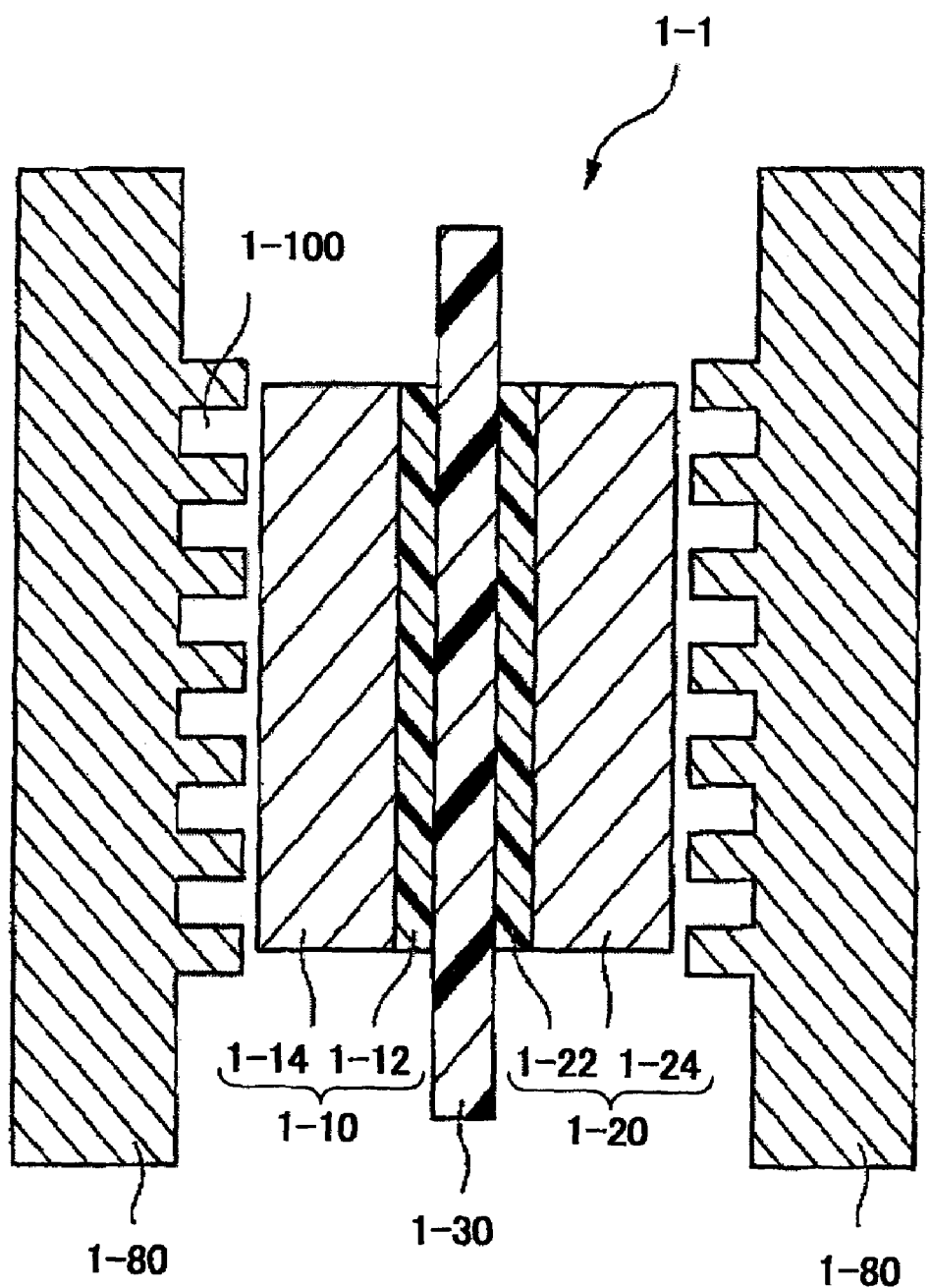
FIG. 5 is a schematic cross-sectional view illustrating an embodiment of a polymer electrolyte fuel cell employing the membrane/electrode assembly for polymer electrolyte fuel cells of the present invention.

By disposing a separator 1-80 having e.g. a groove 1-100 formed to constitute a gas channel, on each side of the membrane/electrode assembly 1-1 of the present invention, a polymer electrolyte fuel cell as shown in FIG. 5 is obtainable.

The separator 1-80 may, for example, be separators made of various electrically conductive materials, such as a separator made of a metal, a separator made of carbon, a separator made of a material having graphite and a resin mixed, etc.

In the polymer electrolyte fuel cell, power generation is carried out by supplying a gas containing oxygen to the cathode and a gas containing hydrogen to the anode. Further, the membrane/electrode assembly 1-1 of the present invention is applicable to a methanol fuel cell whereby the power generation is carried out by supplying methanol to the anode.

Second Embodiment

<Membrane/Electrode Assembly for Polymer Electrolyte Fuel Cells>

Figure 6:
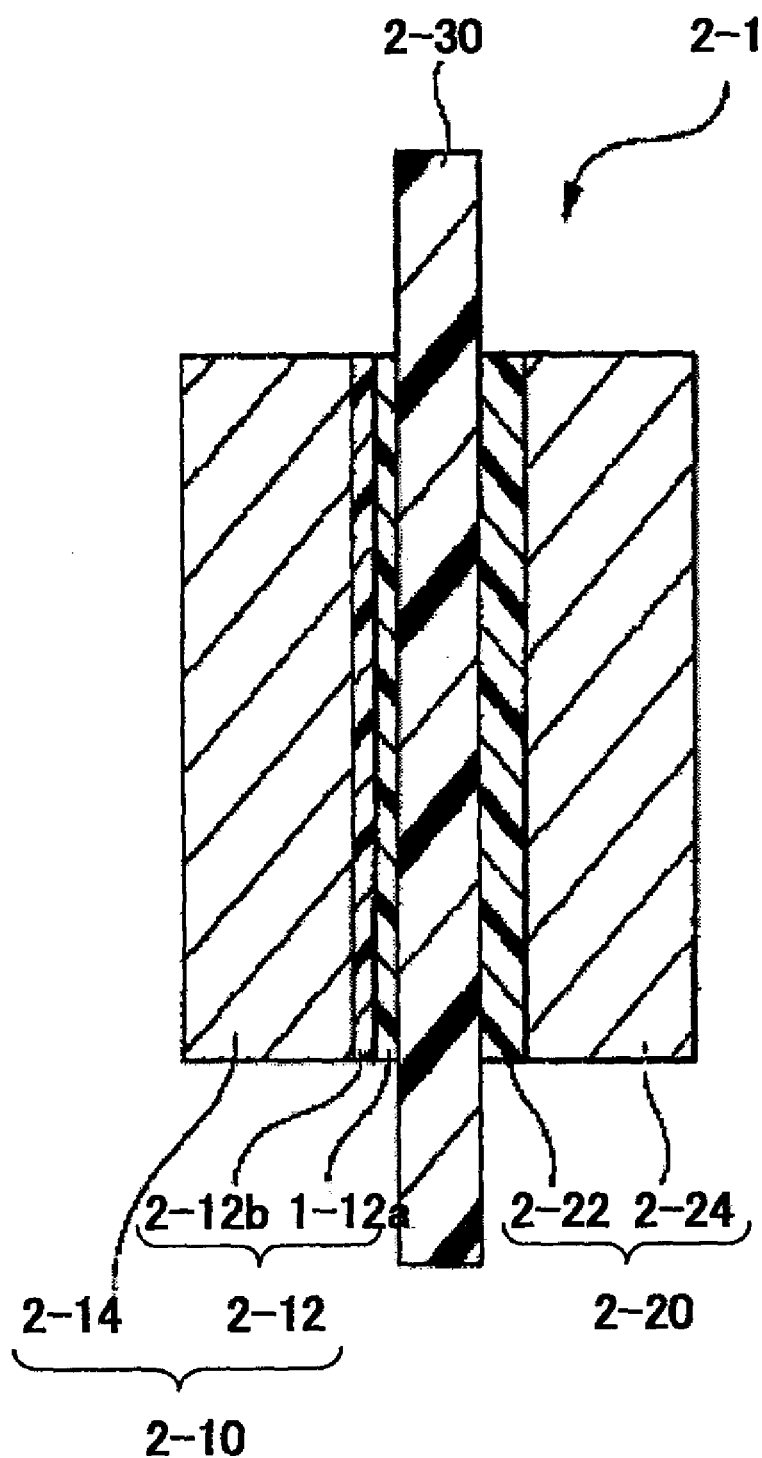
FIG. 6 is a schematic cross-sectional view illustrating one embodiment of the membrane/electrode assembly for polymer electrolyte fuel cells.

FIG. 6 is a schematic cross-sectional view illustrating an example of the second embodiment of the membrane/electrode assembly for polymer electrolyte fuel cells (hereinafter referred to as the membrane/electrode assembly).

The membrane/electrode assembly 2-1 comprises a cathode 2-10 having a catalyst layer 2-12 and a gas diffusion layer 2-14, an anode 2-20 having a catalyst layer 2-22 and a gas diffusion layer 2-24, and a polymer electrolyte membrane 2-30 disposed between the cathode 2-10 and the anode 2-20 In a state in contact with the catalyst layer 2-12 and the catalyst layer 2-22.

In the membrane/electrode assembly 2-1, the 90° peel strength at least one of the interface between the anode 2-20 and the polymer electrolyte membrane 2-30 and the interface between the cathode 2-10 and the polymer electrolyte membrane 2-30, is at least 0.03 N/cm, preferably at least 0.1 N/cm, more preferably at least 0.13 N/cm. The 90° peel strength at each of the interface between the anode 2-20 and the polymer electrolyte membrane 2-30 and the interface between the cathode 2-10 and the polymer electrolyte membrane 2-30 may be at least 0.03 N/cm. When the 90° peel strength is at least 0.03 N/cm, the polymer electrolyte membrane 2-30 and the catalyst layer 2-12 or 2-22 tend to be hardly peeled during the operation of the fuel cell, whereby the power generation performance will be stable.

(Catalyst Layer on Cathode Side)

As shown in FIG. 6, the catalyst layer 2-12 is a layer having layer A 2-12a containing a proton-conductive polymer having an ion exchange capacity of X meq/g dry resin, which is in contact with the polymer electrolyte membrane 2-30, and layer B 2-12b containing a proton-conductive polymer having an ion exchange capacity of Y meq/g dry resin, which is in contact with the gas diffusion layer 2-14. Said X and Y satisfy the following formulae (a) to (c) simultaneously.

$$1.5 < X \leq 2.0 \qquad (a)$$

$$0.9 < Y \leq 1.5 \qquad (b)$$

$$0.18 \leq (X-Y) \qquad (c)$$

Formula (a):

The ion exchange capacity X of the proton-conductive polymer contained in the layer A 2-12a is more than 1.5 meq/g dry resin and at most 2.0 meq/g dry resin, preferably from 1.5 to 1.8 meq/g dry resin. When X is more than 1.5 meq/g dry resin, the electrical resistance of the catalyst layer 2-12 will be lowered, and the layer has many reaction sites, whereby a function to mainly perform the electrode reaction may be provided, and a high output power densification of the fuel cell can be attained to improve the power generation performance. On the other hand, when X is at most 2.0 meq/g dry resin, excess wetting of the catalyst layer 2-12 can be avoided, such being desirable.

The ion exchange capacity of the proton-conductive polymer can be determined by the following method.

The method wherein the proton-conductive precursor polymer is hydrolyzed by immersing it in sodium hydroxide solution with a predetermined concentration containing water and methanol as solvents, and such a solution is subjected to back titration to obtain the ion exchange capacity.

Formula (b):

The ion exchange capacity Y of the proton-conductive polymer contained in the layer B 2-12b is more than 0.9 meq/g dry resin and at most 1.5 meq/g dry resin, preferably from 1.0 to 1.4 meq/g dry resin. When Y is more than 0.9 meq/g dry resin, the electrical resistance of the catalyst layer 12 will be reduced, whereby the power generation performance will be improved. On the other hand, when Y is at most 1.5 meq/g dry resin, excess wetting of the catalyst layer 2-12 can be avoided, such being desirable.

Formula (c):

The difference (X−Y) between the ion exchange capacity X and the ion exchange capacity Y is at least 0.18 meq/g dry resin, preferably from 0.18 to 1.0 meq/g dry resin, more preferably from 0.3 to 0.8 meq/g dry resin.

When the difference (X−Y) is at least 0.18 meq/g dry resin, the functions of the layer A 2-12a and the layer B 2-12b can be clearly distinguished. Namely, in the catalyst layer region in the vicinity of the polymer electrolyte membrane 2-30 where the accumulated amount of the water formed by the reaction is little, by disposing the layer A 2-12a containing the proton-conductive polymer having a high ion exchange capacity, the layer A 2-12a can be efficiently made to be a high water content state. Further, the layer A 2-12a has many reaction sites, whereby a function to mainly carry out the electrode reaction can be provided, and high output power densification of the fuel cell can be attained. In the catalyst layer region in the vicinity of the gas diffusion layer 2-14 where the accumulated amount of water formed by the reaction is large, by disposing the layer B 2-12b containing the proton-conductive polymer having a low ion exchange capacity, the layer B 2-12b may be made to be a low water content state, whereby excess cooling of formed water can be avoided, and a function to efficiently discharge water formed by the reaction or proton-accompanying water out of the system can be obtained, whereby flooding may be prevented.

The catalyst layer 2-12 is a layer containing an electrode catalyst and a proton-conductive polymer.

The materials constituting the catalyst layer 2-12 may be the same as used in the catalyst layer 1-12, and the thickness of the catalyst layer 2-12 may be made to be the same as the catalyst layer 1-12.

The thickness of the layer A 2-12a is preferably from 1 to 15 μm, more preferably from 2 to 10 μm, further preferably from 3 to 8 μm.

When the thickness of the layer A 2-12a is at least 1 μm, the proton can sufficiently spread, whereby the power generation performance will be improved. On the other hand, when the thickness of the layer A 2-12a is at most 15 μm, swelling of the proton-conductive polymer contained in the catalyst layer 2-12 is suppressed, whereby deformation of the catalyst layer 2-12 will be suppressed, and a good power generation performance can be readily obtainable.

The thickness of the layer B 2-12b is preferably from 1 to 15 μm, more preferably from 2 to 10 μm, further preferably from 3 to 8 μm.

When the thickness of the layer B 2-12b is at least 1 μm, the mechanical strength of the catalyst layer 2-12 will be high, whereby deformation of the catalyst layer 12 will be suppressed, and a good power generation performance will readily be obtainable. On the other hand, when the thickness of the layer B 2-12b is at most 15 μm, the electrical resistance of the catalyst layer 2-12 will be reduced, whereby the power generation performance will be improved.

(Catalyst Layer on Anode Side)

As shown in FIG. 6, the catalyst layer 2-22 may be a single layer, or may have the same layered structure as the catalyst layer 2-12.

In the electrode catalyst, the platinum alloy for the anode 2-20 is preferably an alloy containing platinum and ruthenium from such a viewpoint that the activities of the electrode catalyst are stabilized even in a case where a gas containing carbon monoxide is supplied.

The ion exchange capacity of the proton-conductive polymer is usually preferably from 0.5 to 2.0 meq/g dry resin, particular preferably from 0.8 to 1.5 meq/g dry resin, from the viewpoint of the proton conductivity and gas permeability.

(Gas Diffusion Layer)

The gas diffusion layer 2-14 and the gas diffusion layer 2-24 (which may generally be referred to as a gas diffusion layer) are a layer having a gas diffusing substrate.

The gas diffusing substrate is a porous substrate having proton conductivity. Such a gas diffusing substrate may, for example, be carbon cloth, carbon paper or carbon felt.

The gas diffusing substrate is preferably treated for water repellency with a polytetrafluoroethylene, or a mixture of a polytetrafluoroethylene with carbon black.

The thickness of the gas diffusion layer is more preferably from 100 to 400 μm, further preferably from 140 to 350 μm.

(Polymer Electrolyte Membrane)

The polymer electrolyte membrane 2-30 is a membrane containing a proton-conductive polymer. The proton-conductive polymer contained in the polymer electrolyte membrane 2-30 may be the same one as the proton-conductive polymer in the catalyst layer.

The thickness of the polymer electrolyte membrane 2-30 is preferably at most 50 μm, more preferably from 3 to 40 μm, particularly preferably from 5 to 30 μm. By adjusting the thickness of the polymer electrolyte membrane 2-30 to be at most 50 μm, the polymer electrolyte membrane 2-30 may be readily made to be a dried state, whereby deterioration of the characteristics of the polymer electrolyte fuel cell can be suppressed. When the thickness of the electrolyte membrane 2-30 is made to be at least 3 μm, short-circuiting may be avoided.

The polymer electrolyte membrane 2-30 may contain a reinforcing material.

The reinforcing material may, for example, be a porous body, fiber, woven fabric or non-woven fabric. The material for the reinforcing material may, for example, be a polytetrafluoroethylene, a tetrafluoroethylene/hexafluoropropylene copolymer, a tetrafluoroethylene/perfluoro(alkyl vinyl ether) copolymer, a polyethylene, a polypropylene or a polyphenylene sulfide.

In the membrane/electrode assembly 2-1 as described above, the catalyst layer 2-12 of the cathode has the layer A 2-12a containing a proton-conductive polymer having an ion exchange capacity of more than 1.5 meq/g dry resin, whereby the proton conductivity of the catalyst layer 2-12 becomes higher than before, and a high power generation performance can be obtained.

If the ion exchange capacity of the proton-conductive polymer is increased, the water content tends to be high, and along with the operation of the polymer electrolyte fuel cell, the proton-conductive polymer tends to swell, and the catalyst layer 2-12 tends to be deformed and is likely to be peeled from the polymer electrolyte membrane 2-30. However, with the membrane/electrode assembly 2-1, the catalyst layer 2-12 and the polymer electrolyte membrane 2-30 are scarcely peeled for the following reasons.

In the membrane/electrode assembly 2-1, the 90° peel strength at the interface between at least one of the cathode 2-10 and the anode 2-20, and the polymer electrolyte membrane 2-30 is made to be at least 0.03 N/cm, preferably at least 0.1 N/cm, whereby the cathode 2-10 or the anode 2-20 and the polymer electrolyte membrane 2-30 are firmly bonded. Thus, deformation of the polymer electrolyte membrane 2-30 is suppressed, and even if the proton-conductive polymer contained in the catalyst layer 2-12 swells, deformation of the cathode 2-10 is suppressed by the polymer electrolyte membrane 2-30, whereby no peeling will take place between the cathode 2-10 and the polymer electrolyte membrane 2-30.

Thus, by the membrane/electrode assembly 2-1 of the present invention, a high power generation performance can be obtained stably within a wide temperature range of from high temperature to low temperature in an environment covering from high humidity to low humidity.

Figure 7:
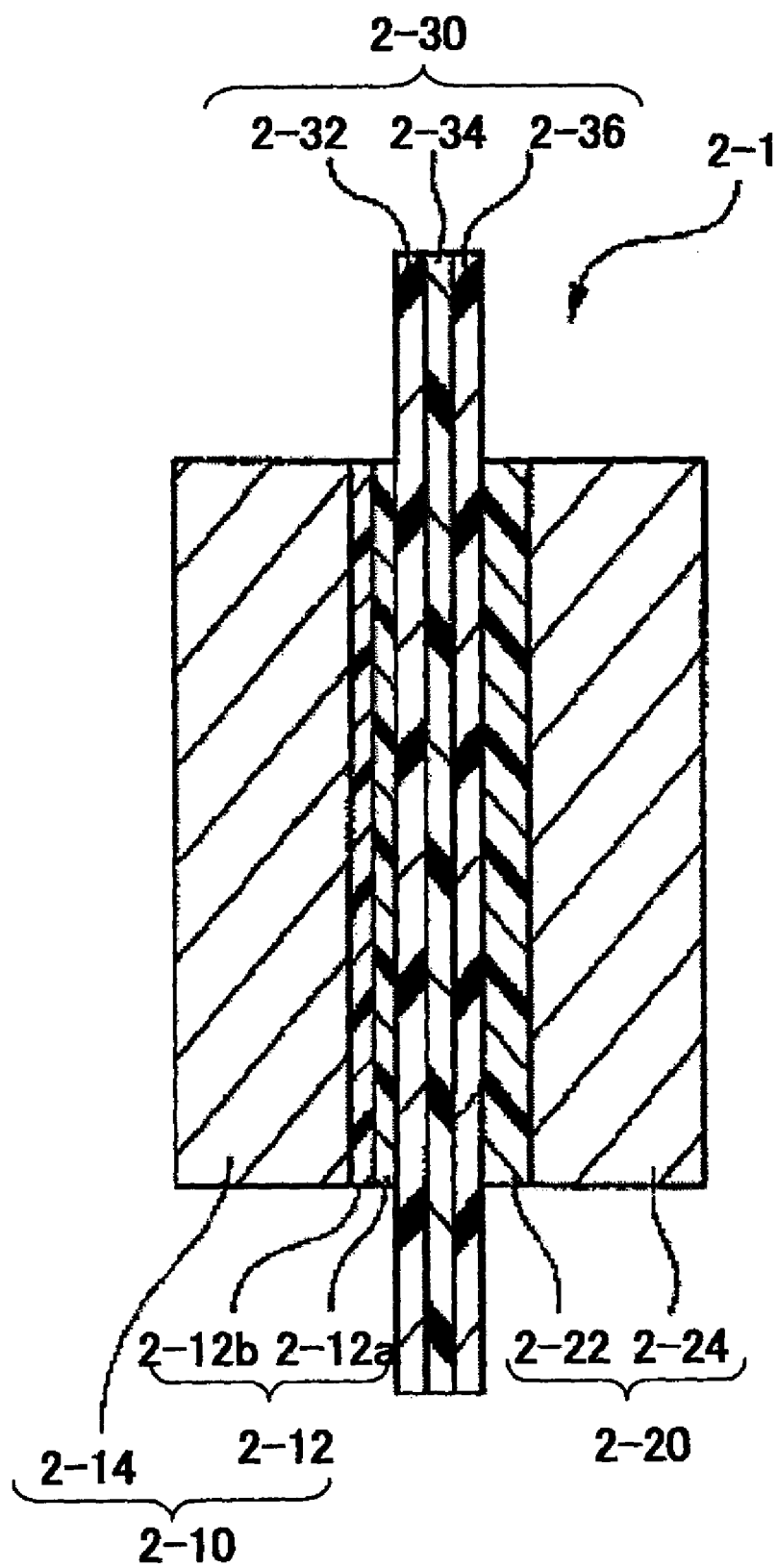
FIG. 7 is a schematic cross-sectional view illustrating another embodiment of the membrane/electrode assembly for polymer electrolyte fuel cells.

Further, the membrane/electrode assembly of the second embodiment is not limited to the membrane/electrode assembly 2-1 as shown in FIG. 6, and it may be one wherein the polymer electrolyte membrane 2-30 is at least double-layered, as shown in FIG. 7.

In the membrane/electrode assembly 2-1 shown in FIG. 7, the polymer electrolyte membrane 2-30 is a membrane having a layer Ma 2-32 in contact with a cathode 2-10, a layer Mc 2-36 in contact with an anode 2-20 and a layer Mb 2-34 located between the layer Ma 2-32 and the layer Mc 2-36.

The ion exchange capacity of the proton-conductive polymer contained in the layer Ma 2-32 and the layer Mc 2-36 is preferably higher than the ion exchange capacity of the proton-conductive polymer contained in the layer Mb 2-34, since the proton conductivity is thereby improved.

Further, also in the membrane/electrode assembly of the second embodiment, the gas diffusion layer may have an interlayer 1-84 as in the first embodiment on the surface of the gas diffusing substrate on the catalyst layer side. By disposing a carbon layer, the gas diffusing property of the surface of the catalyst layer will be improved, and the power generation performance of the polymer electrolyte fuel cell will be substantially improved.

<Process for Producing Membrane/Electrode Assembly for Polymer Electrolyte Fuel Cells>

The following processes may specifically be mentioned as the process for producing the membrane/electrode assembly 2-1.

(2-I) A process comprising a step of forming a polymer electrolyte membrane 2-30 and a step of applying a coating fluid for a catalyst layer on one side of the polymer electrolyte membrane 2-30 to form a catalyst layer 2-12.

(2-II) A process comprising a step of forming a polymer electrolyte membrane 2-30 and a step of applying a coating fluid for a catalyst layer on one side of the polymer electrolyte membrane 2-30 to form a catalyst layer 2-22.

(2-III) A process comprising a step of forming a polymer electrolyte fuel cell 2-30, and a step of applying a coating fluid for a catalyst layer on each side of the polymer electrolyte membrane 2-30 to form a catalyst layer 2-12 and a catalyst layer 2-22 on the respective sides.

[Process (2-I)]

Figure 8:
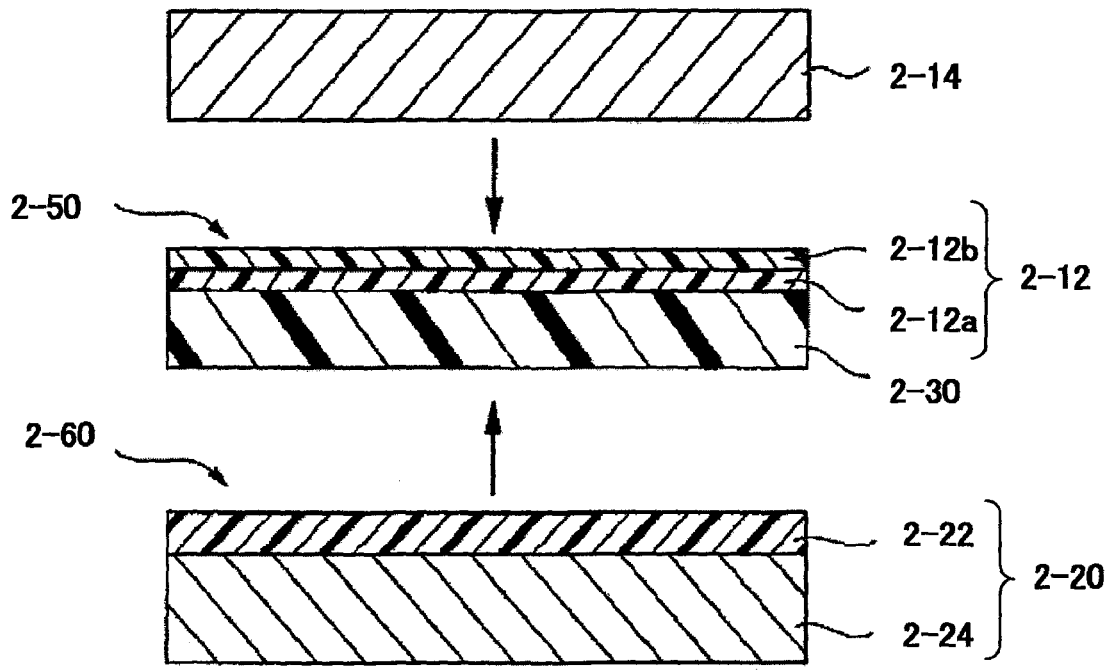
FIG. 8 is a schematic cross-sectional view illustrating one step in the process for producing a membrane/electrode assembly for polymer electrolyte fuel cells of the present invention.

The Process (2-I) may, for example, be a process comprising Steps (2-I-1) to (2-I-4). This process will be described with reference to FIG. 8.

(2-I-1) Step of forming a polymer electrolyte membrane 2-30 on the surface of a separately prepared substrate (hereinafter referred to as a "release substrate")

(2-I-2) Step of applying a coating fluid for a catalyst layer on one side of the polymer electrolyte membrane 2-30 to prepare a first intermediate 2-50 comprising the polymer electrolyte membrane 2-30 and the catalyst layer 2-12

(2-I-3) Step of preparing a second intermediate 2-60 (i.e. anode 2-20) comprising a gas diffusion layer 2-24 and a catalyst layer 2-22

(2-I-4) Step of releasing the release substrate from the first intermediate 2-50, and then bonding the gas diffusion layer 2-14, the first intermediate 2-50 and the second intermediate 2-60, so that the catalyst layer 2-12 is located between the gas diffusion layer 2-14 and the polymer electrolyte membrane 2-30, and the catalyst layer 2-22 is located between the gas diffusion layer 2-24 and the polymer electrolyte membrane 2-30, to obtain a membrane/electrode assembly 2-1.

Step (2-I-1):
The polymer electrolyte membrane 2-30 may be formed in the same manner as in Step (1-I-1).

Step (2-I-2):
The first intermediate 2-50 is prepared by applying a coating fluid containing a proton-conductive polymer having an ion exchange capacity of at least X meq/g dry resin on the surface of the polymer electrolyte membrane 2-30, followed by drying to form a layer A 2-12a, and then applying a coating fluid containing a proton-conductive polymer having an ion exchange capacity of less than Y meq/g dry resin on the coating film of layer A 2-12a, followed by drying to form a coating film to form a layer B 2-12b, thereby to form a catalyst layer 2-12.

The coating fluid for a cathode catalyst layer is prepared by dispersing an electrode catalyst in a solvent and dissolving or dispersing a proton-conductive polymer in the solvent.

The solvent may be the same one as the solvent in the above-mentioned coating fluid for an electrolyte membrane.

The coating fluid for a cathode catalyst layer preferably contains a solvent having an effect to dissolve the proton-conductive polymer as a solvent. The solvent having an effect to dissolve the proton-conductive polymer may, for example, be an alcohol or a fluorinated solvent, particularly preferably ethanol, n-propanol or isopropanol.

The proportion of the solvent having an effect to dissolve the proton-conductive polymer in the coating fluid for a cathode catalyst layer (100 mass %) is preferably at least 5 mass %, more preferably at least 30 mass %. Further, the entire solvent may be a solvent having an effect to dissolve the proton-conductive polymer. When the proportion of such a solvent is at least 5 mass %, the peel strength at the interface between the polymer electrolyte membrane 2-30 and the catalyst layer 2-12 will be increased.

When the coating fluid for the catalyst layer is applied on the surface of the polymer electrolyte membrane 2-30, if the coating fluid for the catalyst layer contains the solvent having an effect to dissolve the proton-conductive polymer, a part of the surface of the polymer electrolyte membrane 2-30 will be dissolved by the effect of the solvent and bonded with an electrolyte in the catalyst layer 2-12. As a result, the bond strength between the polymer electrolyte membrane 2-30 and the catalyst layer 2-12 will be sufficiently high.

The solid content concentration of the coating fluid for the cathode catalyst layer is preferably from 4 to 15 mass %, more preferably from 8 to 12 mass %.

By adjusting the solid content concentration of the coating fluid to be within such a range, the coating fluid will have a suitable viscosity and can be uniformly applied, and the coating film thereby formed will be free from cracking.

The coating method may, for example, be the same method as in Step (2-I-1).

After applying the coating fluid for the cathode catalyst layer on the surface of the polymer electrolyte membrane 2-30, the applied fluid is dried to form a catalyst layer 2-12. The drying temperature is preferably from 70 to 150° C.

Further, it is preferred to carry out heat treatment after drying in order to improve the bond strength between the polymer electrolyte membrane 2-30 and the catalyst layer 2-12 and to stabilize the proton-conductive polymer.

The temperature for such heat treatment is preferably from 100 to 200° C., more preferably from 110 to 170° C., although it may depends also on the type of the proton-conductive polymer. When the temperature for the heat treatment is at least the lower limit value, increase of the water content of the proton-conductive polymer can be suppressed, and the gas diffusion performance in the catalyst layer will be improved, and deformation of the polymer electrolyte membrane 2-30 is less likely to take place, whereby the power generation performance will be improved. Further, the bond strength between the polymer electrolyte membrane 2-30 and the catalyst layer 2-12 will be increased. When the temperature for the heat treatment is at most the upper limit value, ionic groups of the proto-conducive polymer are less likely to be thermally decomposed, and the proton conductivity will be improved, whereby the power generation performance will be improved.

However, if the temperature for the heat treatment exceeds 170° C., depending upon the type of the catalyst, the carbon carrier is likely to be oxidized and decomposed. Accordingly, the heat treatment in such a case is preferably carried out in a nitrogen atmosphere or in an environment where oxygen in the catalyst layer 2-12 is reduced under reduced pressure or under a pressure by e.g. pressing.

Further, in order to suppress the decomposition by oxidation, a carbon carrier graphitized by e.g. heat treatment may be employed as the carbon carrier.

Step (2-I-3):

The second intermediate 2-60 is prepared by applying a coating fluid for an anode catalyst layer on the surface of the gas diffusion layer 2-24 to form a catalyst layer 2-22.

As the gas diffusion layer 2-24, a gas-diffusing substrate such as carbon paper, carbon cloth or carbon felt may be used as it is. As the case requires, the gas diffusing substrate may be treated for water repellency by means of a solution or dispersion containing a water repellent fluororesin. By such water repellent treatment, it is possible to avoid suppression of gas diffusion by clogging pores formed in the gas diffusion layer by e.g. water formed in the catalyst layer. In such a case, it is more preferred to treat the surface of the gas diffusion layer with a dispersion containing a water repellent fluororesin and an electrically conductive carbon such as carbon black, from the viewpoint of the proton conductivity of the membrane/electrode assembly. The water repellent fluororesin may, for example, be a polytetrafluoroethylene. Here, the surface-treated side of the gas diffusion layer is disposed on the catalyst layer side.

The coating fluid for an anode catalyst layer is prepared by dispersing an electrode catalyst in a solvent and dissolving or dispersing a proton-conductive polymer in the solvent.

The solvent may be the same one as the solvent in the coating fluid for a cathode catalyst layer.

The solid content concentration in the coating fluid for an anode catalyst layer is preferably within the same range as the solid content concentration in the coating fluid for a cathode catalyst layer.

The coating method may be the same method as in Step (2-I-1).

After applying the coating fluid for an anode catalyst layer on the surface of the gas diffusion layer 2-24, the applied fluid is dried to form a catalyst layer 22. The drying temperature is preferably from 70 to 170° C.

Step (2-I-4):

The gas diffusion layer 2-14 may be the same one as the gas diffusion layer 2-24.

The bonding method may, for example, be a hot pressing method, hot roll pressing or ultrasonic wave fusion, and from the viewpoint of the in-plane uniformity, a hot pressing method is preferred. The temperature of the pressing plate in the pressing machine is preferably from 100 to 200° C.

The pressing pressure is preferably from 0.5 to 4 MPa.

[Process (2-II)]

Figure 9:
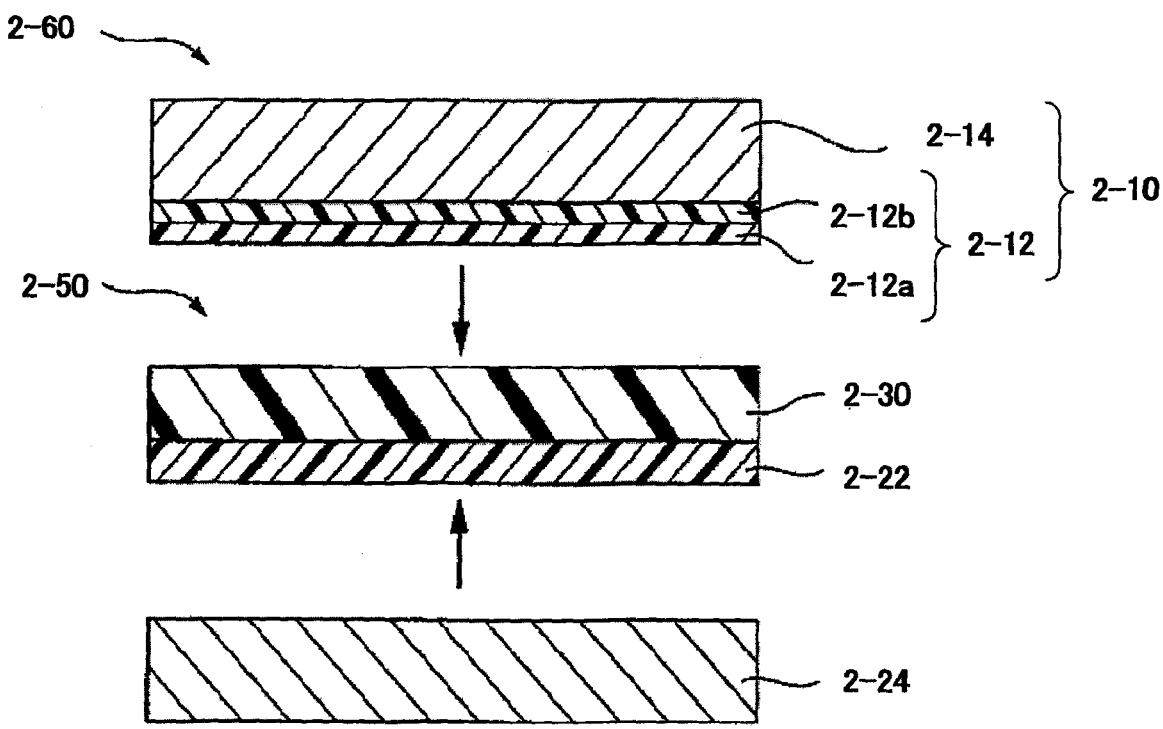
FIG. 9 is a schematic cross-sectional view illustrating one step in the process for producing a membrane/electrode assembly for polymer electrolyte fuel cells of the present invention.

The Process (2-II) may, for example, be a process comprising Steps (2-II-1) to (2-II-4). This process will be described with reference to FIG. 9.

(2-II-1) Step of forming a polymer electrolyte membrane 2-30 on the surface of a release substrate (2-II-2) Step of applying a coating fluid for a catalyst layer on one side of the polymer electrolyte membrane 2-30 to prepare a first intermediate 2-50 comprising the polymer electrolyte membrane 2-30 and the catalyst layer 2-22.

(2-II-3) Step of preparing a second intermediate 2-60 (i.e. cathode 2-10) comprising a gas diffusion layer 2-14 and a catalyst layer 2-12

(2-II-4) Step of peeling the release substrate from the first intermediate 2-50, and then the gas diffusion layer 2-24, the first intermediate 2-50 and the second intermediate 2-60 are bonded so that the catalyst layer 2-22 is located between the gas diffusion layer 2-24 and the polymer electrolyte membrane 2-30, and the catalyst layer 2-12 is located between the gas diffusion layer 2-14 and the polymer electrolyte membrane 2-30, to obtain a membrane/electrode assembly 2-1.

Step (2-II-1) may be carried out in the same manner as in Step (2-I-1).

Step (2-II-2):

The first intermediate 2-50 is prepared by applying a coating fluid for an anode catalyst layer on the surface of the polymer electrolyte membrane 2-30 to form a catalyst layer 2-22.

The specific method and conditions may be the same method and conditions as in Step (2-I-2) except that in Step (2-I-2), the coating fluid for a cathode catalyst layer is changed to the coating fluid for an anode catalyst layer.

Step (2-II-3):

The second intermediate 2-60 is prepared by applying a coating fluid for a cathode catalyst layer on the surface of the gas diffusion layer 2-14 to form a catalyst layer 2-12.

The specific method and conditions may be the same method and conditions as in Step (2-I-3) except that in Step (2-I-3), the coating fluid for an anode catalyst layer is changed to the coating fluid for a cathode catalyst layer.

Step (2-II-4):

Preparation of the gas diffusion layer 2-24, and the bonding method and conditions may be the same method and conditions as in Step (2-I-4).

[Process (2-III)]

Figure 10:
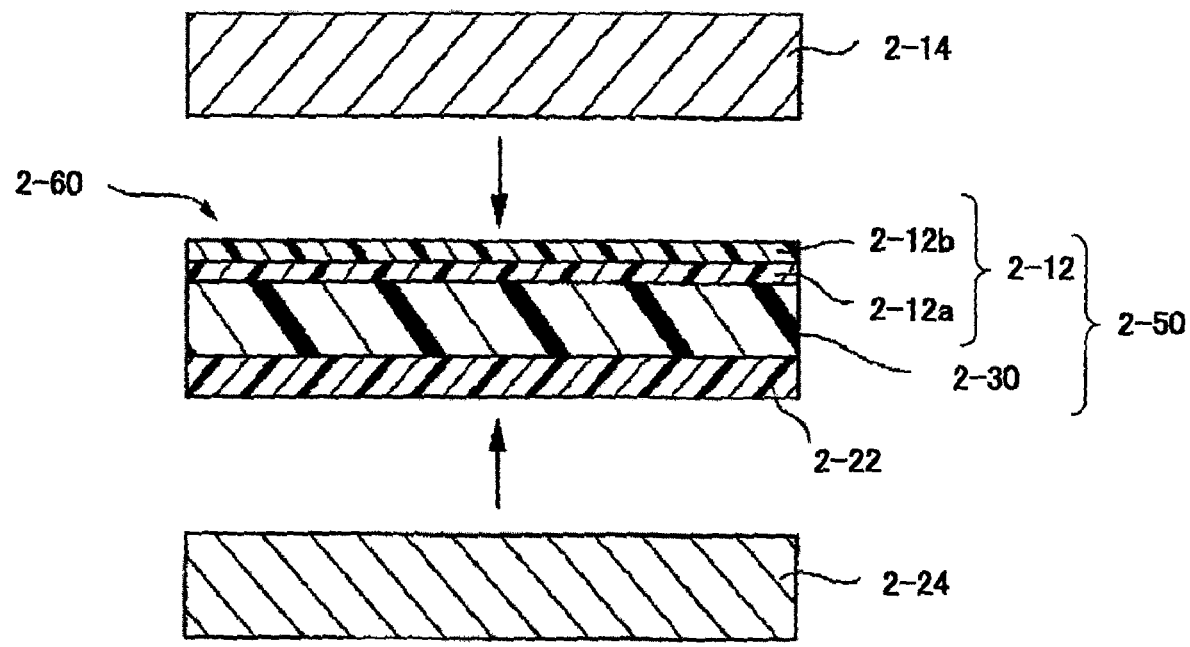
FIG. 10 is a schematic cross-sectional view illustrating one step in the process for producing a membrane/electrode assembly for polymer electrolyte fuel cells of the present invention.

The Process (2-III) may, for example, be a process comprising Steps (2-III-1) to (2-III-4). This process is described with reference to FIG. 10.

(2-III-1) Step of forming a polymer electrolyte membrane 2-30 on the surface of a release substrate (2-III-2) Step of coating a coating fluid for a catalyst layer on one side of the polymer electrolyte membrane 2-30 to prepare a first intermediate 2-50 comprising the polymer electrolyte membrane 2-30 and a catalyst layer 2-12

(2-III-3) Step of releasing the release substrate from the first intermediate 2-50, and applying a coating fluid for a catalyst layer on the surface of the polymer electrolyte membrane 2-30 on the opposite side of the catalyst layer 2-12 to prepare an intermediate 2-60 comprising the catalyst layer 2-12, the polymer electrolyte membrane 2-30 and a catalyst layer 2-22

(2-III-4) Step of bonding the gas diffusion layer 2-14, the second intermediate 2-60 and the gas diffusion layer 2-24 so that the catalyst layer 2-12 is located between the gas diffusion layer 2-14 and the polymer electrolyte membrane 2-30 and the catalyst layer 2-22 is located between the gas diffusion layer 2-24 and the polymer electrolyte membrane 2-30, to obtain a membrane/electrode assembly 2-1

Steps (2-III-1) to (2-III-2) may be carried out in the same manner as in Steps (2-I-1) to (2-I-2).

Step (2-III-3):

The second intermediate 2-60 is prepared by releasing the release substrate from the first intermediate 2-50 and applying a coating fluid for an anode catalyst layer on the surface of the polymer electrolyte membrane 2-30 to form a catalyst layer 2-22.

The specific method and conditions may be the same method and conditions as in Step (2-II-2).

Step (2-III-4):

The preparation of the gas diffusion layer 2-14 and the gas diffusion layer 2-24, and the bonding method and conditions may be the same method and conditions as in Step (2-I-4).

Further, in the Process (2-III), firstly, a catalyst layer 2-22 may be formed on one side of the polymer electrolyte membrane 2-30, and then a catalyst layer 2-12 may be formed on the surface of the polymer electrolyte membrane 2-30 on the opposite side of the catalyst layer 2-22.

By the process for producing the membrane/electrode assembly 2-1 as described above, a coating fluid for a catalyst layer is directly applied to at least one side of the polymer electrolyte membrane 2-30 to form a catalyst layer, whereby the anode 2-20 or cathode 2-10 can be firmly bonded to the polymer electrolyte membrane 2-30. Specifically, the 90° peel strength at least one of the interface between the anode 2-20 and the polymer electrolyte membrane 2-30 and the interface between the cathode 2-10 and the polymer electrolyte membrane 2-30 can be made to be at least 0.03 N/cm, preferably at least 0.1 N/cm. It is thereby possible to suppress deformation of the polymer electrolyte membrane 2-30, and even if the proton-conductive polymer contained in the catalyst layer 2-12 swells along the operation of the polymerelectrolyte fuel cell, deformation of the catalyst layer 2-12 will be suppressed by the polymer electrolyte membrane 2-30, and peeling between the polymer electrolyte membrane 2-30 and the cathode 2-10 will not take place, and sagging of the polymer electrolyte membrane 2-30 into the gas channel due to the curvature will not take place.

Thus, the membrane/electrode assembly 2-1 produced by the process of the present invention is capable of providing a high power generation performance stably within a wide temperature range of from high temperature to low temperature in an environment covering from high humidity to low humidity.

Further, in a case where a membrane/electrode assembly wherein the gas diffusion layer has a carbon layer on the surface of a gas diffusing substrate on the catalyst layer side, is to be produced, as a gas diffusion layer, one having a carbon layer formed on the surface of a gas diffusing substrate, may be used.

<Polymer Electrolyte Fuel Cell>

Figure 11:
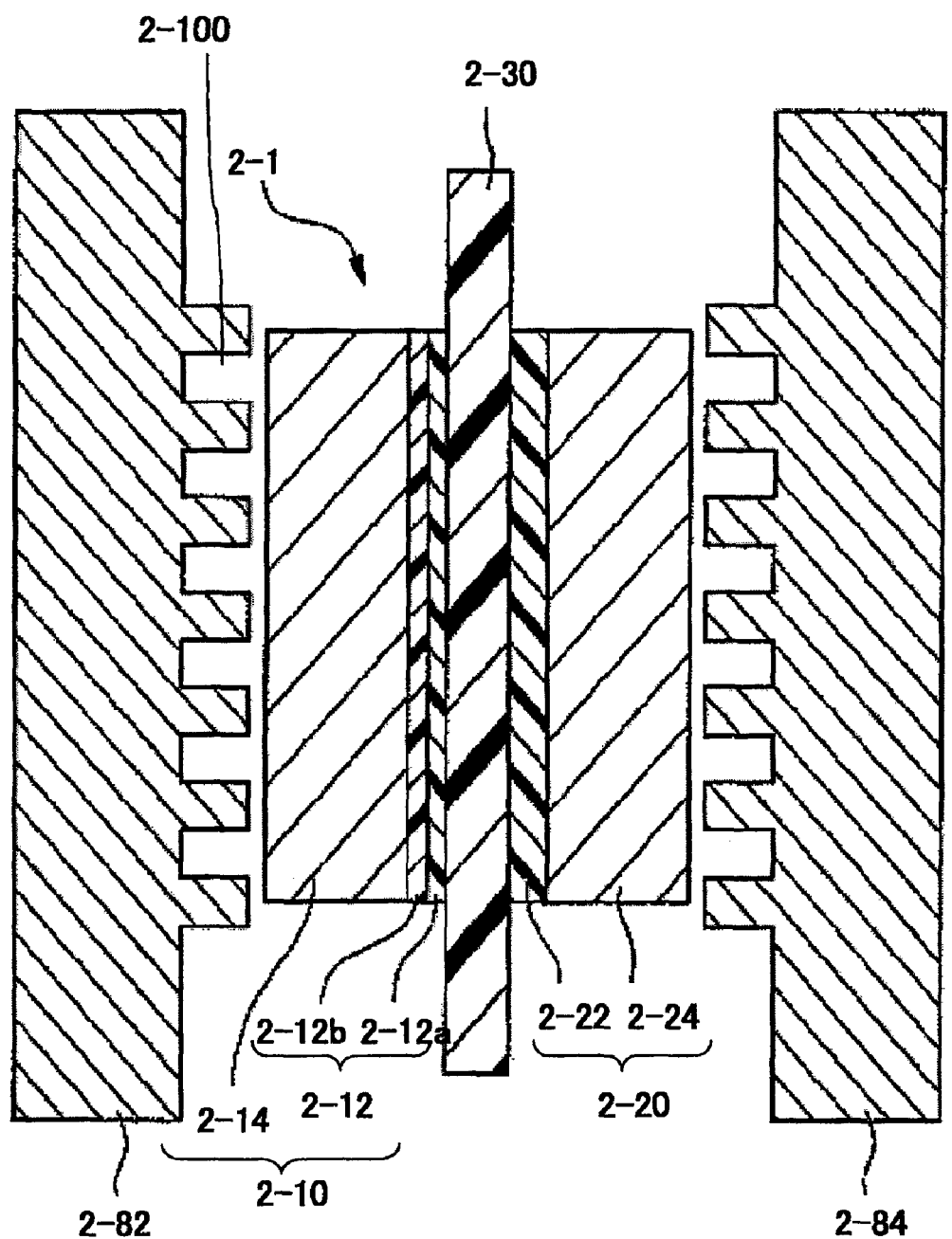
FIG. 11 is a schematic cross-sectional view illustrating one embodiment of a polymer electrolyte fuel cell.

A polymer electrolyte fuel cell as shown in FIG. 11 can be obtained by disposing, for example, separators 2-82 and 2-84 having grooves 2-100 formed to constitute gas channels, on both sides of the membrane/electrode assembly 2-1 of the present invention.

As the separators 2-82 and 2-84, separators made of various electrically conductive materials, such as separators made of metal, separators made of carbon or separators made of material having graphite and a resin mixed, may be mentioned.

With such a polymer electrolyte fuel cell, power generation is carried out by supplying a gas containing oxygen to the cathode 2-10 and a gas containing hydrogen to the anode 2-20. Further, the membrane-electrode assembly I of the present invention is applicable also to a methanol fuel cell, whereby power generation is carried out by supplying methanol to the anode 2-20.

Figure 12:
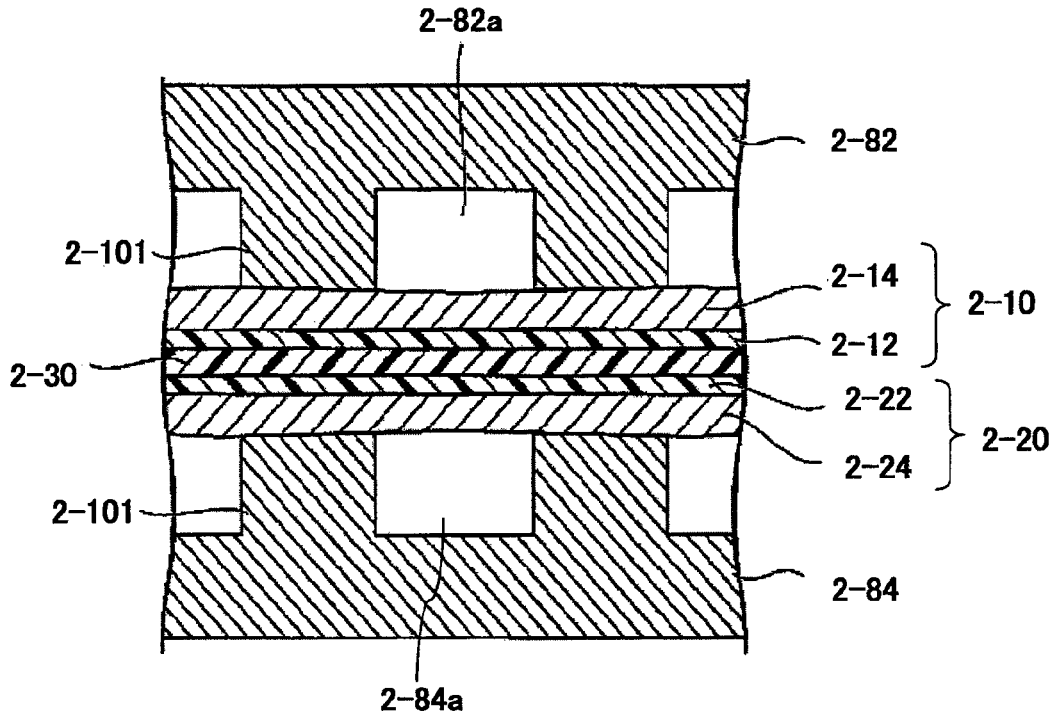
FIG. 12(A) is a partially cross-sectional view illustrating a polymer electrolyte fuel cell wherein a membrane/electrode assembly is sandwiched by two separators.
FIG. 12(B) is a cross-sectional view illustrating the state where the polymer electrolyte membrane and the catalyst layer are peeled, and the catalyst layer and the polymer electrolyte membrane undergo deformation during the operation of a polymer electrolyte fuel cell.
Figure 12:
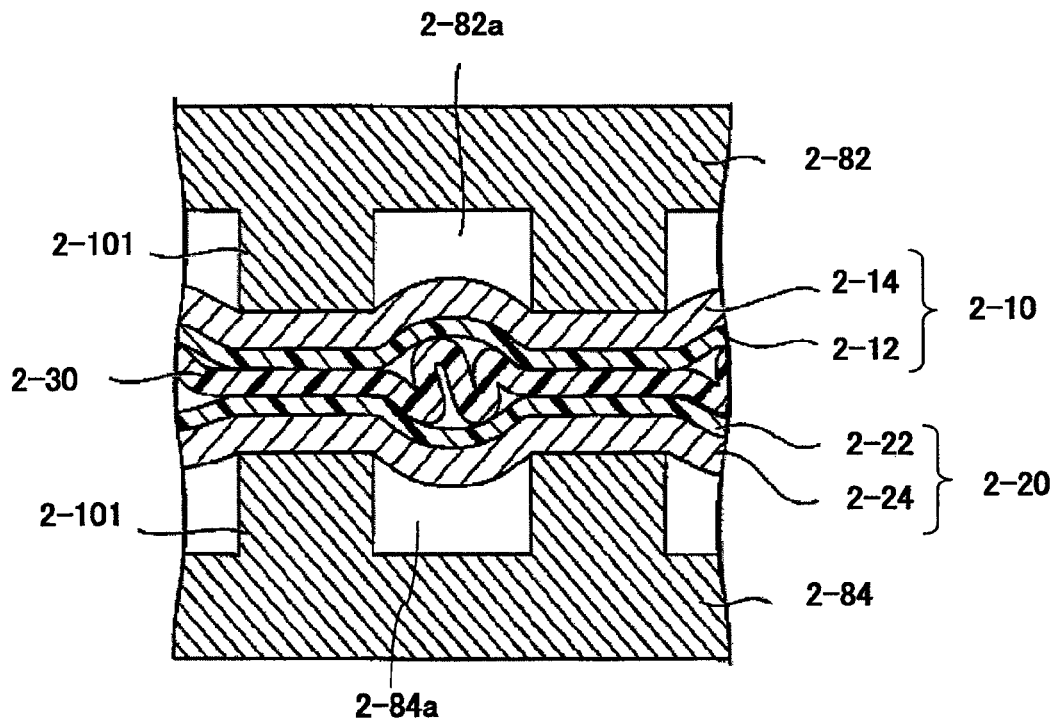

With reference to FIG. 12, the manner will be described wherein a catalyst layer and a polymer electrolyte membrane undergo deformation when the polymer electrolyte membrane and the catalyst layer are peeled during the operation of the polymer electrolyte fuel cell. FIG. 12(A) is a partially cross-sectional view illustrating a polymer electrolyte fuel cell having a membrane/electrode assembly sandwiched between two separators.

In a case where a polymer electrolyte membrane 2-30 is not sufficiently bonded to either a catalyst layer 2-12 or a catalyst layer 2-22, the situation will be as shown in FIG. 12(B). That is, in the membrane/electrode assembly, the portions pressed by ribs of separators 2-82 and 2-84 are fixed, and accordingly, peeling between the polymer electrolyte membrane 2-30 and the catalyst layer is less likely to take place, but at the portions in contact with grooves 2-82a and 2-84a constituting gas channels, peeling between the polymer electrolyte membrane 2-30 and the catalyst layer will take place. And the water-absorbed polymer electrolyte membrane 2-30 undergoes substantial deformation at the portion peeled from the catalyst layer.

On the other hand, in a case where the polymer electrolyte membrane 2-30 is sufficiently bonded to at least the catalyst layer 2-12 of the cathode 2-10, it is possible to maintain the stabilized state as shown in FIG. 12(A). For example, in a case where the catalyst layers 2-12 and 2-22 are formed on the gas diffusion layers 2-14 and 2-24, respectively, without directly bonded to the polymer electrolyte membrane 2-30, and then bonded to the polymer electrolyte membrane 2-30 by e.g. hot pressing, the bond strength between the polymer electrolyte membrane 2-30 and the catalyst layer 2-12 or 2-22 is likely to be low, thus leading to the state as shown in FIG. 12(B) during the operation of the fuel cell.

Third Embodiment

Polymer Electrolyte Fuel Cell

Figure 13:
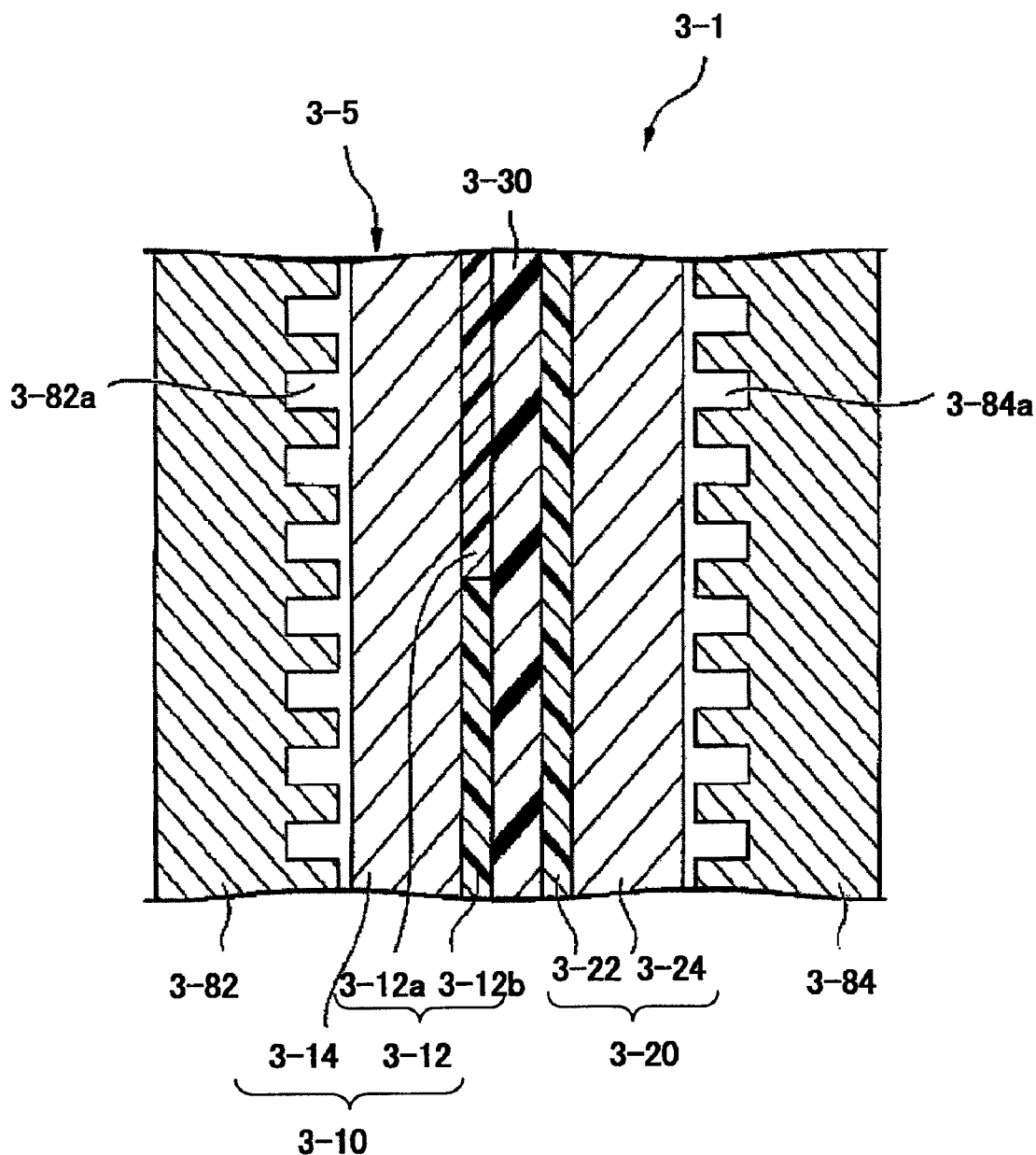
FIG. 13 is a schematic cross-sectional view illustrating another embodiment of a fuel cell.

FIG. 13 is a schematic cross-sectional view illustrating an embodiment of a polymer electrolyte fuel cell (hereinafter referred to as a fuel cell).

The fuel cell 3-1 comprises a membrane/electrode assembly 3-5 and separators 3-82 and 3-84 disposed on both sides of the membrane/electrode assembly 3-5.

(Separators)

On the Surfaces of the Separators 3-82 and 3-84 on the Membrane/Electrode Assembly 3-5 side, a channel 3-82a to supply a gas containing oxygen to the cathode 3-10 and a channel 3-84a to supply a fuel gas to the anode 3-20, are formed, respectively. Thus, in the fuel cell 3-1, a gas containing oxygen will flow in the channel 3-82a along the surface of the cathode 3-10, and a fuel gas will flow in the channel 3-84a along the surface of the anode 3-20.

Further, on the surfaces of the separators 3-82 and 3-84 on the side opposite to the membrane/electrode assembly 3-5 side, cooling water channel grooves (not shown) are usually formed, respectively.

As shown in FIG. 14(a) corresponding to FIG. 13, the separator 3-82 is provided with an inlet 3-82i to supply a gas containing oxygen and an outlet 3-82o to discharge the gas, and a channel 3-82a staggered in a jig-zag fashion in parallel with a side 3-82d of the separator 3-82, connected to the inlet 3-82 and the outlet 3-82o, is formed.

As the separator 3-82, separators made of various electrically conductive materials such as separators made of metal, separators made of carbon or separators made of material having graphite and a resin mixed, may be mentioned. The separator 3-84 is provided with an inlet to supply a fuel gas and an outlet to discharge the fuel gas. The shape and material for the channel may be the same as for the separator 3-82.

(Membrane/Electrode Assembly)

A membrane/electrode assembly 3-5 comprises a cathode 3-10 having a catalyst layer 3-12 and a gas diffusion layer 3-14, an anode 3-20 having a catalyst layer 3-22 and a gas diffusion layer 3-24, and a polymer electrolyte membrane 3-30 disposed between the cathode 3-10 and the anode 3-20 in a state in contact with the catalyst layer 3-12 and the catalyst layer 3-22.

In the membrane/electrode assembly 3-5, the 90° peel strength at least one of the interface between the anode 3-20 and the polymer electrolyte membrane 3-30 and the interface between the cathode 3-10 and the polymer electrolyte membrane 3-30 is at least 0.03 N/cm, preferably at least 0.1 N/cm, particularly preferably at least 0.13 N/cm. The 90° peel strength at both of the interface between the anode 3-20 and the polymer electrolyte membrane 3-30 and the interface between the cathode 3-10 and the polymer electrolyte membrane 3-30 may be at least 0.03 N/cm, preferably at least 0.1 N/cm. When the 90° peel strength is at least 0.03 N/cm, the polymer electrolyte membrane 30 and the catalyst layer 3-12 or the catalyst layer 3-22 tends to be scarcely peeled during the operation of the fuel cell 3-1, whereby the power generation performance can be obtained stably.

(Catalyst Layer on the Cathode Side)

As shown in FIG. 13, the catalyst layer 3-12 is a layer composed of two regions.

In correspondence with FIG. 13, as shown in FIG. 14(b) showing the correspondence relationship with the separator 3-82, the catalyst layer 3-12 is a layer divided by a line 3-15 into two regions in a direction perpendicular to a side 3-12d i.e. a region (A) 3-12a on the inlet 3-82i side and a region (B) 3-12b on the outlet 3-82o side, wherein the ion exchange capacity of the proton-conductive polymer contained in the region (A) 3-12a is made higher than the ion exchange capacity of the proton-conductive polymer contained in the region (B) 3-12b.

The areas of the region (A) 3-12a and the region (B) 3-12b may be the same or different. The proportion of the area of the region (A) 3-12a in the entire catalyst layer 3-12 is preferably at least 10%, more preferably from 20 to 70%, further preferably from 30 to 50%. As its ion exchange capacity becomes larger, the proton-conductive polymer contained in the electrode tends to absorb water and is likely to maintain the water. Further, the proton conductivity and gas solubility of the proton-conductive polymer tend to be high along with the increase of the ion exchange capacity. Therefore, when the area of the region (A) 3-12a close to the inlet 3-82i where the water vapor concentration in the reaction gas is low as compared with the vicinity of the outlet 3-82o, is at least 10%, a flooding phenomenon can be avoided, and a high power generation performance can readily be obtained.

The ion exchange capacity of the proton-conductive polymer contained in the region (A) 3-12a is preferably from 1.3 to 2.0 meq/g dry resin, more preferably from 1.5 to 1.8 meq/g dry resin. When the ion exchange capacity is at least 1.3 meq/g dry resin, the electrical resistance of the catalyst layer 12 is reduced, and the power generation performance is improved. On the other hand, when the ion exchange capacity is at most 2.0 meq/g dry resin, a flooding phenomenon can be avoided. If the ion exchange capacity exceeds 2.0 meq/g dry resin, a flooding phenomenon is likely to occur even in the region (A) 3-12a close to the inlet 82i where the water vapor concentration in the reaction gas is low as compared with the vicinity of the outlet 3-82o, and accordingly, the ion exchange capacity is preferably at most 2.0 meq/g dry resin.

The ion exchange capacity of the proton-conductive polymer contained in the region (B) 3-12b is preferably from 0.9 to 1.5 meq/g dry resin, more preferably from 1.0 to 1.4 meq/g dry resin. When the ion exchange capacity is at least 0.9 meq/g dry resin, the electrical resistance of the catalyst layer 3-12 is reduced, and the power generation performance is improved. On the other hand, when the ion exchange capacity is at most 1.5 meq/g dry resin, a flooding phenomenon can be avoided. In the region (B) 3-12b, the water concentration in oxygen formed and accumulated by the reaction from the upper stream (the inlet 3-82i of the channel 3-82a) is extremely high, and if the ion exchange capacity exceeds 1.5 meq/g dry resin, the amount of water maintained in the cathode 3-10 tends to be excessive, and a flooding phenomenon is likely to occur, whereby the cell performance is likely to be deteriorated. Accordingly, the ion exchange capacity is preferably at most 1.5 meq/g dry resin.

The difference in the ion exchange capacity between the proton-conductive polymer contained in the region (A) 3-12a and the proton-conductive polymer contained in the region (B) 3-12b is preferably at least 0.2 meq/g dry resin, more preferably from 0.4 to 0.8 meq/g dry resin.

When the difference in the ion exchange capacity is at least 0.2 meq/g dry resin, the in-plane distribution of water maintained in the cathode 3-10 will be more uniform, the flooding phenomenon can be avoided, and a high cell performance can be provided.

The ion exchange capacity of the proton-conductive polymer can be determined by the following method.

A method wherein a proton-conductive precursor polymer is hydrolyzed by immersing it in a sodium hydroxide solution having a predetermined concentration using water and methanol as solvents, and the solution is subjected to back titration to obtain the ion exchange capacity.

The catalyst layer 3-12 is a layer containing an electrode catalyst and a proton-conductive polymer.

The materials constituting the catalyst layer 3-12 may be the same ones as used for the catalyst layer 1-12, and the thickness of the catalyst layer 3-12 may be the same as the thickness of the catalyst layer 1-12.

(Catalyst Layer on the Anode Side)

As shown in FIG. 13, the catalyst layer 3-22 may be a layer composed of one region or a layer composed of two regions like the catalyst layer 3-12.

In the electrode catalyst, as a platinum alloy for the anode 3-20, an alloy containing platinum and ruthenium is preferred from the such a viewpoint that the activities of the electrode catalyst are stabilized even when a gas containing carbon monoxide is supplied.

The ion exchange capacity of the proton-conductive polymer contained in the catalyst layer 3-22 is usually preferably from 0.5 to 2.0 meq/g dry resin, particularly preferably from 0.8 to 1.5 meq/g dry resin, from the viewpoint of the proton conductivity and gas permeability.

(Gas Diffusion Layers)

The gas diffusion layer 3-14 and the gas diffusion layer 3-24 (which may hereinafter be referred to generally as a gas diffusion layer) may be the same ones as the gas diffusion layer 2-14 and the gas diffusion layer 2-24.

(Polymer Electrolyte Membrane)

The polymer electrolyte membrane 3-30 may be the same one as the polymer electrolyte membrane 2-30. The fuel cell 3-1 as described above, has the catalyst layer 3-12 wherein the ion exchange capacity of the proton-conductive polymer contained in the region (A) 3-12a is higher than the ion exchange capacity of the proton-conductive polymer contained in the region (B) 3-12b, whereby the in-plane distribution of water maintained in the cathode 3-10 will be more uniform, the flooding phenomenon can be avoided, the proton conductivity of the catalyst layer 3-12 will be high, and a good power generation performance can be obtained.

Further, by the fuel cell 3-1 of the present invention, as described for the second embodiment, deformation of the polymer electrolyte membrane 3-30 can be suppressed, and deformation of the cathode 3-10 can be suppressed by the polymer electrolyte membrane 3-30 even when the proton-conductive polymer contained in the catalyst layer 3-12 swells, whereby no peeling takes place between the cathode 3-10 and the polymer electrolyte membrane 3-30, and accordingly, a high power generation performance can be obtained stably within a wide temperature range of from high temperature to low temperature in an environment covering from high humidity to low humidity.

Figure 14:
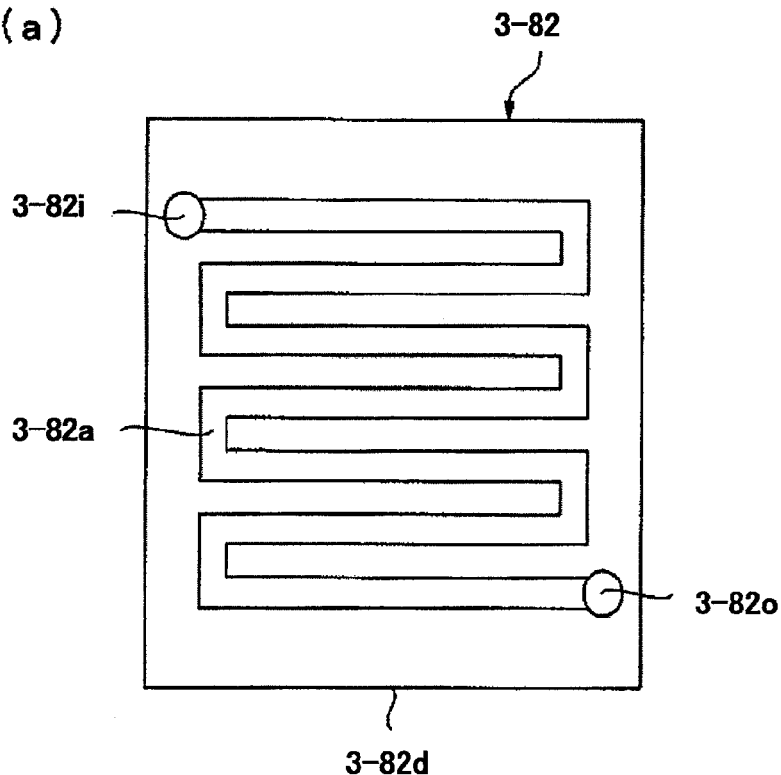
FIG. 14 illustrates an embodiment of a combination of a separator and a cathode.
Figure 14:
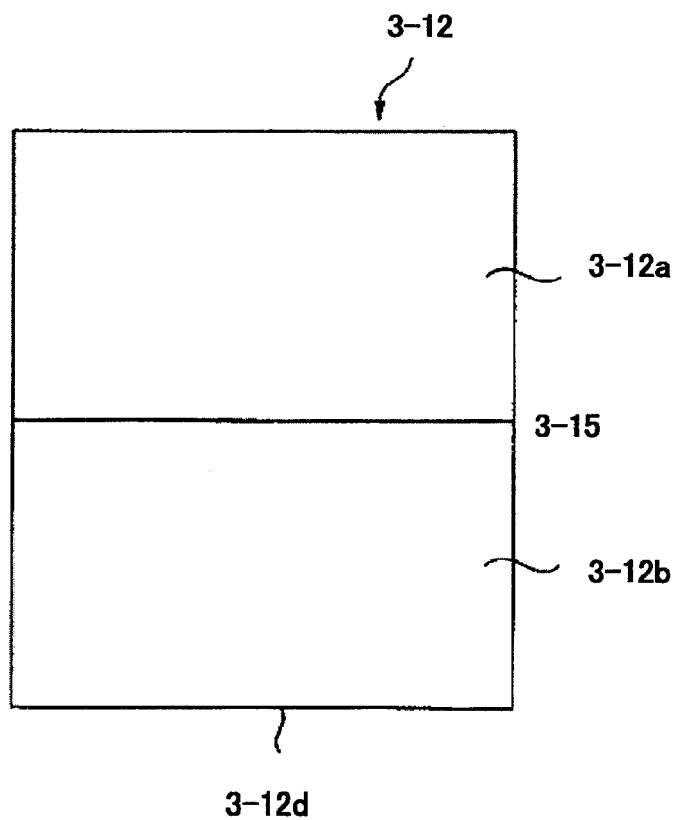
Figure 15:
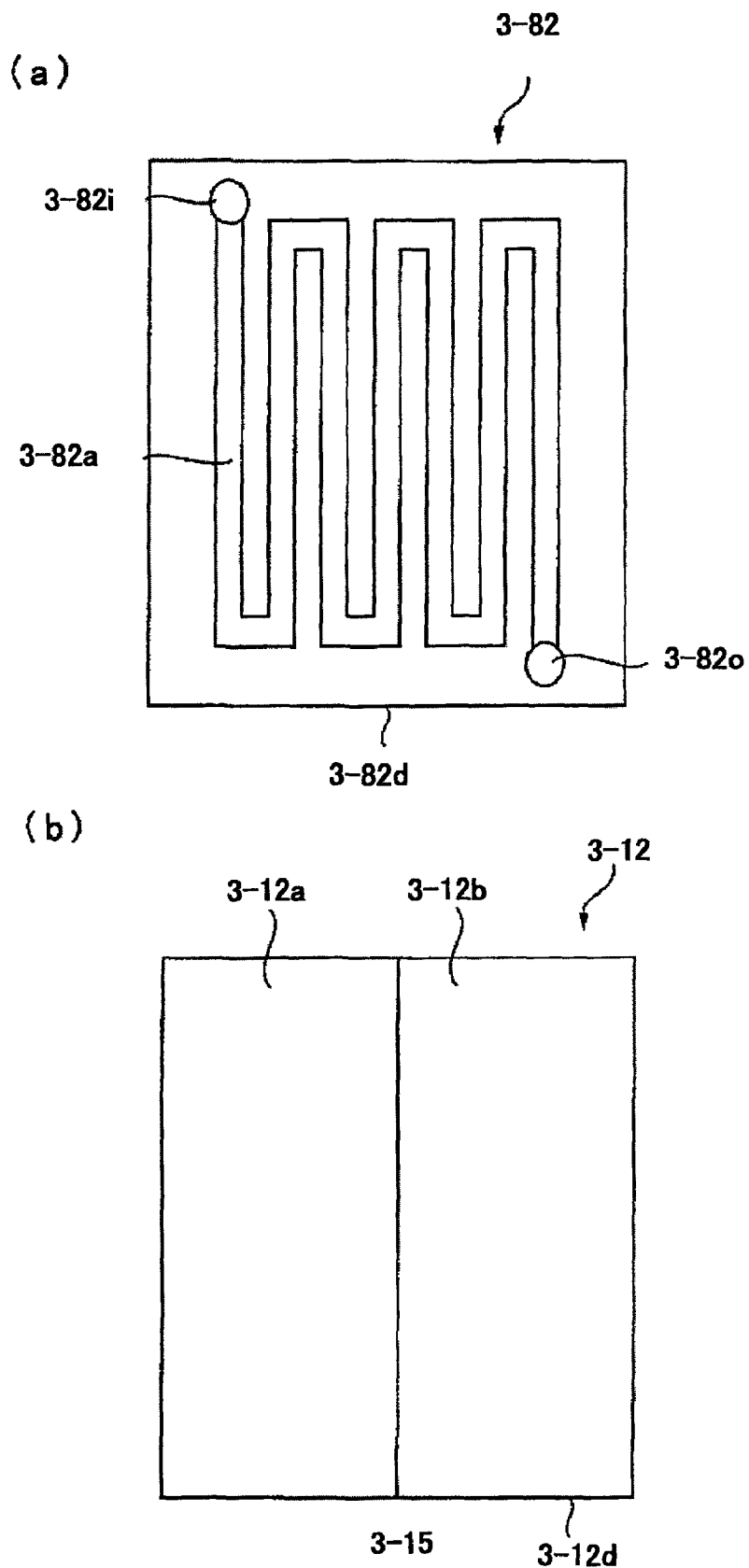
FIG. 15 illustrates another embodiment of a combination of a separator and a cathode.
Figure 16:
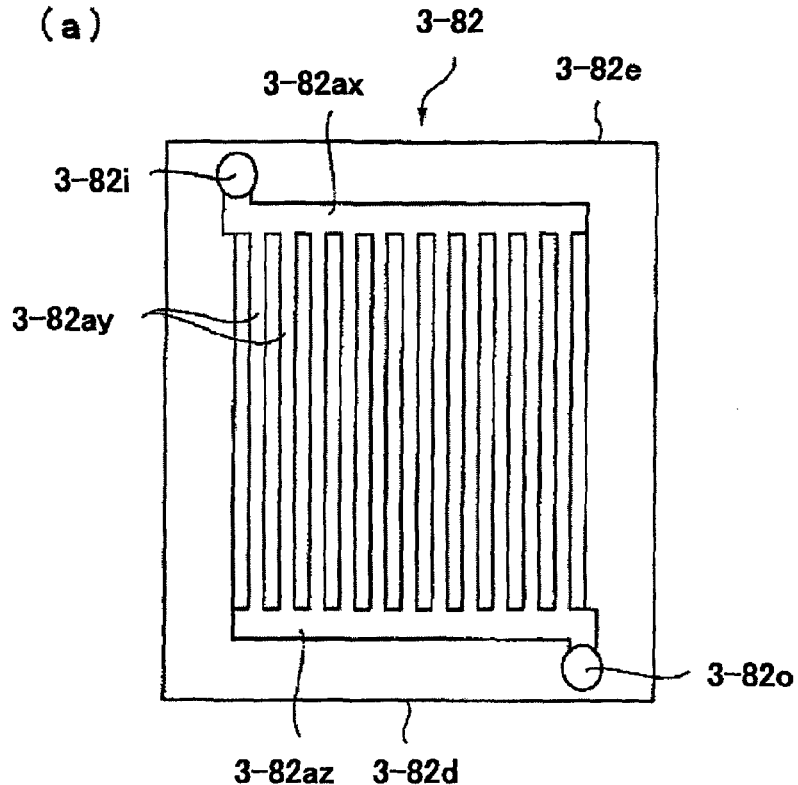
FIG. 16 illustrates another embodiment of a combination of a separator and a cathode.
Figure 16:
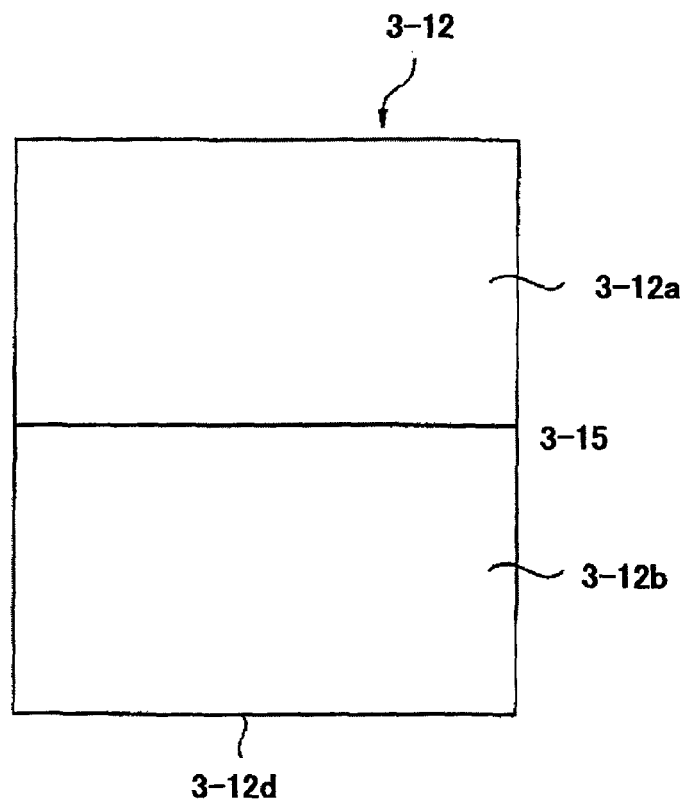
Figure 17:
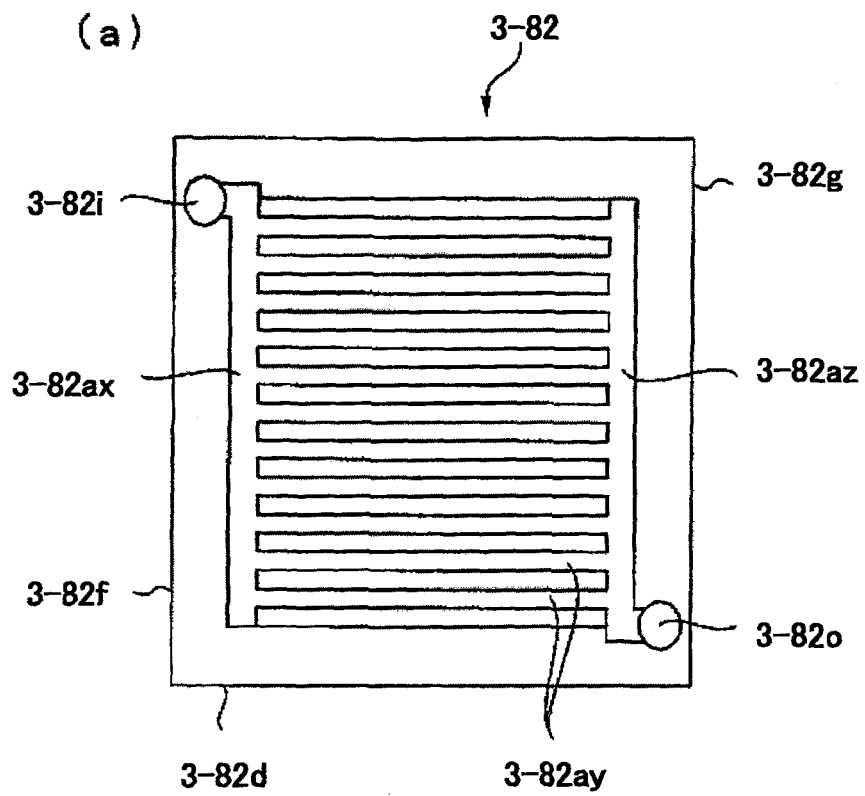
FIG. 17 illustrates another embodiment of a combination of a separator and a cathode.
Figure 17:
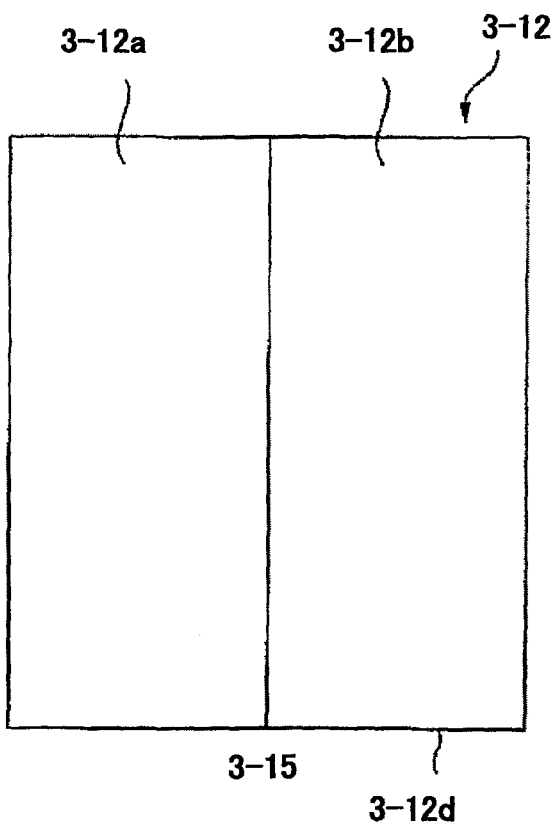

Further, the fuel cell of the third embodiment is not limited to the one having the combination of the separator and the cathode as shown in FIG. 14 and may be ones having such combinations as shown in FIGS. 15 to 17.

Combination in FIG. 15:

As shown in FIG. 15(*a*), in the separator 3-82, a channel 3-82a is formed which is staggered in a jig-zag fashion in a direction perpendicular to a side 3-82d and connected to an inlet 3-82i and an outlet 3-820.

As shown in FIG. 15(*b*), the catalyst layer 3-12 is a layer divided into two regions by a line 3-15 in a direction horizontal to a side 3-12d i.e. a region (A) 3-12a and a region (B) 3-12b, wherein the ion exchange capacity of the proton-conductive polymer contained in the region (A) 3-12a is made higher than the ion exchange capacity of the proton-conductive polymer contained in the region (B) 3-12b.

Combination in FIG. 16:

As shown in FIG. 16(*a*), in the separator 3-82, on the side of a side 3-82e opposing to a side 3-82d, a channel 3-82ax (manifold) connected to an inlet 3-82i is formed in a direction horizontal to the side 3-82d, and on the side of a side 3-82d, a channel 3-82az (manifold) connected to an outlet 3-82o is formed in a direction horizontal to the side 3-82d, and a channel 3-82a is formed wherein the channel 3-82ax and the channel 3-82az are connected by a plurality of channels 3-82ay formed in a direction perpendicular to the side 3-82d.

As shown in FIG. 16(*b*), the catalyst layer 3-12 is a layer divided into two regions by a line 3-15 in a direction perpendicular to the side 3-12d i.e. a region (A) 3-12a and a region (B) 3-12b, wherein the ion exchange capacity of the proton-conductive polymer contained in the region (A) 3-12a is made higher than the ion exchange capacity of the proton-conductive polymer contained in the region (B) 3-12b.

Combination in FIG. 17:

As shown in FIG. 17(*a*), in the separator 3-82, on the side of a side 3-82f crossing a side 3-82d and being close to an inlet 3-82i, a channel 3-82ax (manifold) connected to the inlet 3-82i is formed in a direction perpendicular to the side 3-82d, and on the side of a side 3-82g opposing to the side 3-82f, a channel 3-82az (manifold) connected to an outlet 3-82o is formed in a direction perpendicular to the side 3-82d, and a channel 3-82a is formed wherein the channel 3-82ax and the channel 3-82az are connected by a plurality of channels 3-82ay formed in a direction horizontal to the side 3-82d.

As shown in FIG. 17(*b*), the catalyst layer 3-12 is a layer divided into two regions by a line 3-15 in a direction horizontal to a side 3-12d i.e. a region (A) 3-12a and a region (B) 3-12b, wherein the ion exchange capacity of the proton-conductive polymer contained in the region (A) 3-12a is made higher than the ion exchange capacity of the proton-conductive polymer contained in the region (B) 3-12b.

Further, in the fuel cell of the present invention, the catalyst layer of the cathode is not limited to one having the regions (A) and (B).

The catalyst layer of the cathode is required only to be such that the ion exchange capacity of the proton-conductive polymer contained in the catalyst layer of the cathode in contact with the inlet of the channel is made higher than the ion exchange capacity of the proton-conductive polymer contained in the catalyst layer of the cathode in contact with the outlet of the channel.

For example, the ion exchange capacity of the proton-conductive polymer contained in the catalyst layer of the cathode may continuously or gradually be made small from the inlet side of the channel towards the outlet side of the channel. Specifically, the catalyst layer 3-12 shown in FIG. 14(*b*) may be made to be a layer composed of three regions by providing a region (C) between the region (A) 3-12a and the region (B) 3-12b. In such a case, the ion exchange capacities of the proton-conductive polymers contained in the respective regions are made to be gradually small in the order of the region (A) 3-12a, the region (C) and the region (B) 3-12b. Further, the catalyst layer 3-12 may be made to be a layer composed of many regions, wherein the ion exchange capacities of proton-conductive polymers contained in the respective regions are made to be gradually small from the region (A) 3-12a towards the region (B).

Figure 18:
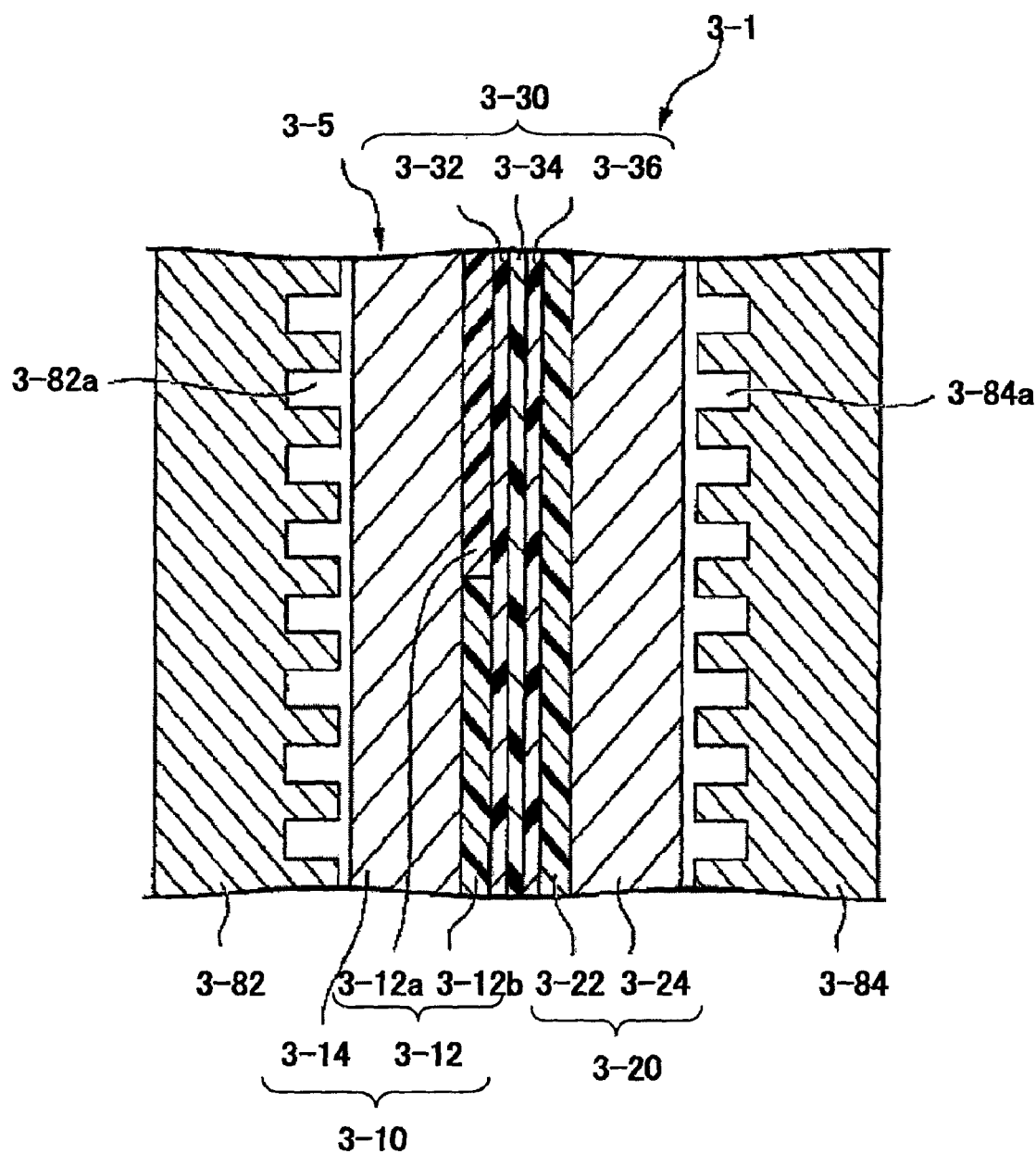
FIG. 18 is a schematic cross-sectional view illustrating another embodiment of a fuel cell.

Further, the fuel cell of the present invention is not limited to the fuel cell 3-1 shown in FIG. 13 and may be one wherein the polymer electrolyte membrane 3-30 is composed of two or more layers as shown in FIG. 18.

In the fuel cell 3-1 shown in FIG. 18, the polymer electrolyte membrane 3-30 is a membrane comprising a layer Ma 3-32 in contact with a cathode 3-10, a layer Mc 3-36 in contact with an anode 3-20 and a layer Mb 3-35 located between the layer Ma 3-32 and the layer Mc 3-36.

The ion exchange capacities of the proton-conductive polymers contained in the layer Ma 3-32 and the layer Mc 3-36 are preferably higher than the ion exchange capacity of the proton-conductive polymer contained in the layer Mb 3-34, since the proton conductivity is thereby improved.

Further, in the fuel cell of the present invention, the gas diffusion layer may have a carbon layer on the surface on the catalyst layer side of the gas diffusing substrate. By disposing such a carbon layer, the gas diffusing property of the surface of the catalyst layer will be improved, and the power generation performance of the fuel cell will be substantially improved.

The carbon layer is a layer containing carbon and a fluoropolymer.

The carbon is preferably carbon nanofiber having a fiber diameter of from 1 to 1,000 nm and a fiber length of at most 1,000 μm.

The fluoropolymer may, for example, be a polytetrafluoroethylene.

Further, in the fuel cell of the present invention, the separator may be one having a structure of a gas diffusing material such as a mesh or a porous body and having no grooves. In such a case, a gas containing oxygen or a fuel gas may be supplied to the gas diffusion layer via such a gas diffusing material.

<Process for Producing Polymer Electrolyte Fuel Cell>

The fuel cell 3-1 can be produced by preparing a membrane/electrode assembly 3-5 and disposing separators 3-82 and 3-84 having channels 3-82a and 3-84a formed, on both sides of the membrane/electrode assembly 3-5.

Specifically, the following processes may be mentioned as the process for preparing the membrane/electrode assembly 3-5.

(3-I) A process comprising a step of forming a polymer electrolyte membrane 3-30, and a step of applying a coating fluid for a catalyst layer on one side of the polymer electrolyte membrane 3-30 to form a catalyst layer 3-12

(3-II) A process comprising a step of forming a polymer electrolyte membrane 3-30, and a step of applying a coating fluid for a catalyst layer on one side of the polymer electrolyte membrane 3-30 to form a catalyst layer 3-22.

(3-III) A process comprising a step of forming a polymer electrolyte membrane 3-30, and a step of applying a coating fluid for a catalyst on each side of the polymer electrolyte membrane 3-30 to form a catalyst layer 3-12 and a catalyst layer 3-22 on the respective surfaces.

[Process (3-I)]

Figure 19:
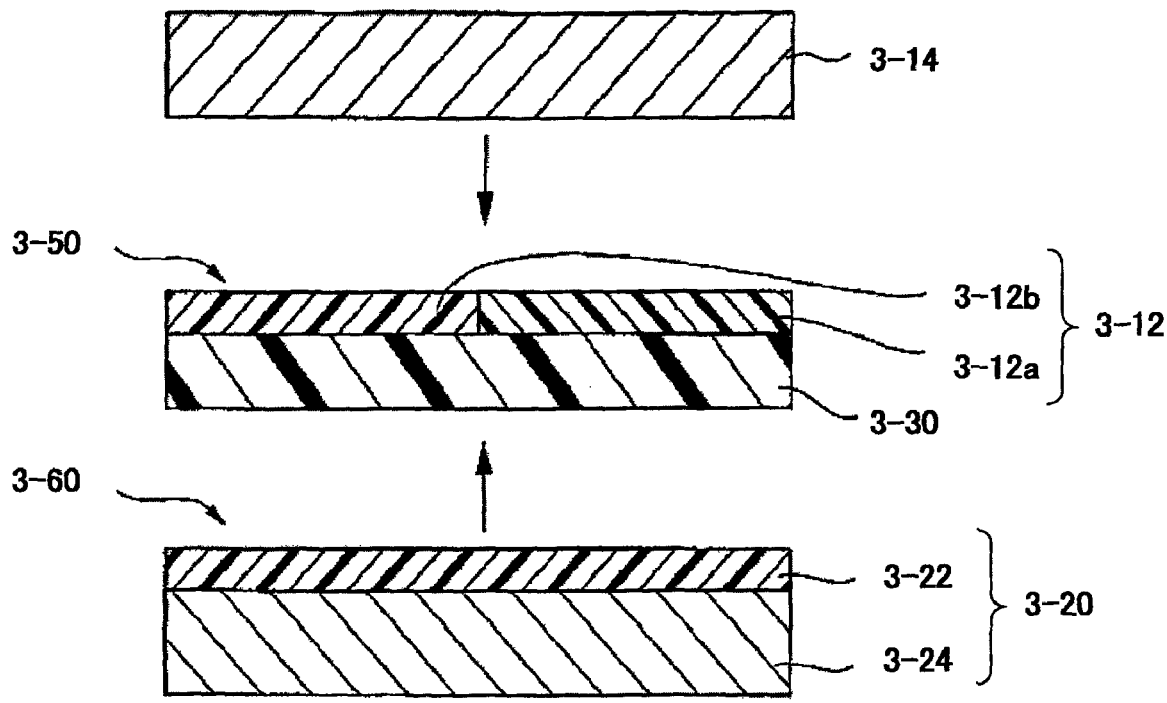
FIG. 19 is a schematic cross-sectional view illustrating one step in the process for producing a membrane/electrode assembly.

The Process (3-I) may, for example, be a process comprising Steps (3-I-1) to (3-I-4). This process will be described with reference to FIG. 19.

(3-I-1) Step of forming a polymer electrolyte membrane 30 on the surface of a separately prepared substrate (hereinafter referred to as a "release substrate")

(3-I-2) Step of applying a coating fluid for a catalyst layer on one side of the polymer electrolyte membrane 3-30 to form a first intermediate 3-50 comprising the polymer electrolyte membrane 3-30 and a catalyst layer 3-12

(3-I-3) Step of preparing a second intermediate 3-60 (i.e. an anode 3-20) comprising a gas diffusion layer 3-24 and a catalyst layer 3-22

(3-I-4) Step of releasing the release substrate from the first intermediate 3-50 and bonding the gas diffusion layer 3-14, the first intermediate 3-50 and the second intermediate 3-60 so that the catalyst layer 3-12 is located between the gas diffusion layer 3-14 and the polymer electrolyte membrane 3-30, and the catalyst layer 3-22 is located between the gas diffusion layer 3-24 and the polymer electrolyte membrane 3-30

Step (3-I-1):

The Step (3-I-1) may be carried out in the same manner as in Step (1-I-1).

Step (3-I-2):

The first intermediate 3-50 is formed by applying a coating fluid for a cathode catalyst layer for the region (A) 3-12a on the surface of the polymer electrolyte membrane 3-30, followed by drying to form a coating film which will be catalyst layer for the region (A) 3-12a, and then applying a coating fluid for a cathode catalyst layer for the region (B) 3-12b, followed by drying to form a coating film which will be a catalyst layer for the region (B) 3-12b, thereby to form a catalyst layer 3-12.

The coating fluid for a cathode catalyst layer can be prepared in the same manner as the coating fluid for a cathode catalyst layer in Step (2-I-2).

The coating method, drying method and heat treatment method may be the same methods as in Step (2-I-2).

Step (3-I-3):

The Step (3-I-3) may be carried out in the same manner as Step (2-I-3).

Step (3-I-4):

The Step (3-I-4) may be carried out in the same manner as Step (2-I-4).

[(Process (3-II)]

Figure 20:
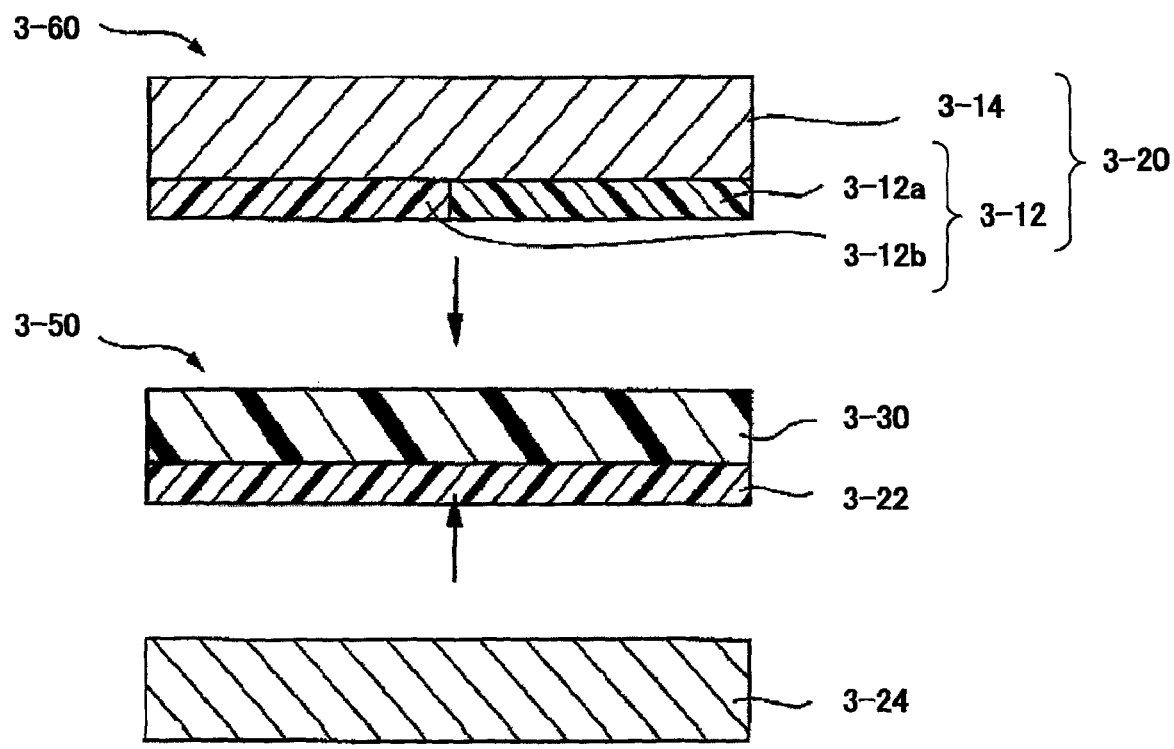
FIG. 20 is a schematic cross-sectional view illustrating one step in the process for producing a membrane/electrode assembly.

The process (3-II) may, for example, be a process comprising steps (3-II-1) to (3-II-4). This process will be described with reference to FIG. 20.

(3-II-1) Step of forming a polymer electrolyte membrane 3-30 on the surface of a release substrate (3-II-2) Step of applying a coating fluid for a catalyst layer on one side of the polymer electrolyte membrane 3-30 to prepare a first intermediate 3-50 comprising the polymer electrolyte membrane 3-30 and a catalyst layer 3-22

(3-II-3) Step of preparing a second intermediate 3-60 (i.e. a cathode 3-10) comprising a gas diffusion layer 3-14 and a catalyst layer 3-12

(3-II-4) Step of releasing the release substrate from the first intermediate 3-50 and then bonding the gas diffusion layer 3-24, the first intermediate 3-50 and the second intermediate 3-60 so that the catalyst layer 3-22 is located between the gas diffusion layer 3-24 and the polymer electrolyte membrane 3-30, and the catalyst layer 3-12 is located between the gas diffusion layer 3-14 and the polymer electrolyte membrane 3-30, to obtain a membrane/electrode assembly 3-1

The Step (3-II-1) may be carried out in the same manner as Step (1-I-1).

Step (3-II-2):

The first intermediate 3-50 is prepared by applying a coating fluid for an anode catalyst layer on the surface of the polymer electrolyte membrane 3-30 to form a catalyst layer 3-22.

The specific method and conditions may be the same method and conditions as in Step (3-I-2) except that in Step (3-I-2), the coating fluid for a cathode catalyst layer is changed to a coating fluid for an anode catalyst layer.

Step (3-II-3):

The second intermediate 3-60 is prepared by applying a coating fluid for a cathode catalyst layer on the surface of the gas diffusion layer 3-14 to form a catalyst layer 3-12.

The specific method and conditions may be the same method and conditions as in Step (3-I-3) except that in Step (3-I-3), the coating fluid for an anode catalyst layer is changed to a coating fluid for a cathode catalyst layer.

Step (3-II-4):

The preparation, bonding method and conditions for the gas diffusion layer 3-24 may be the same method and conditions as in Step (3-I-4).

[Process (3-III)]

Figure 21:
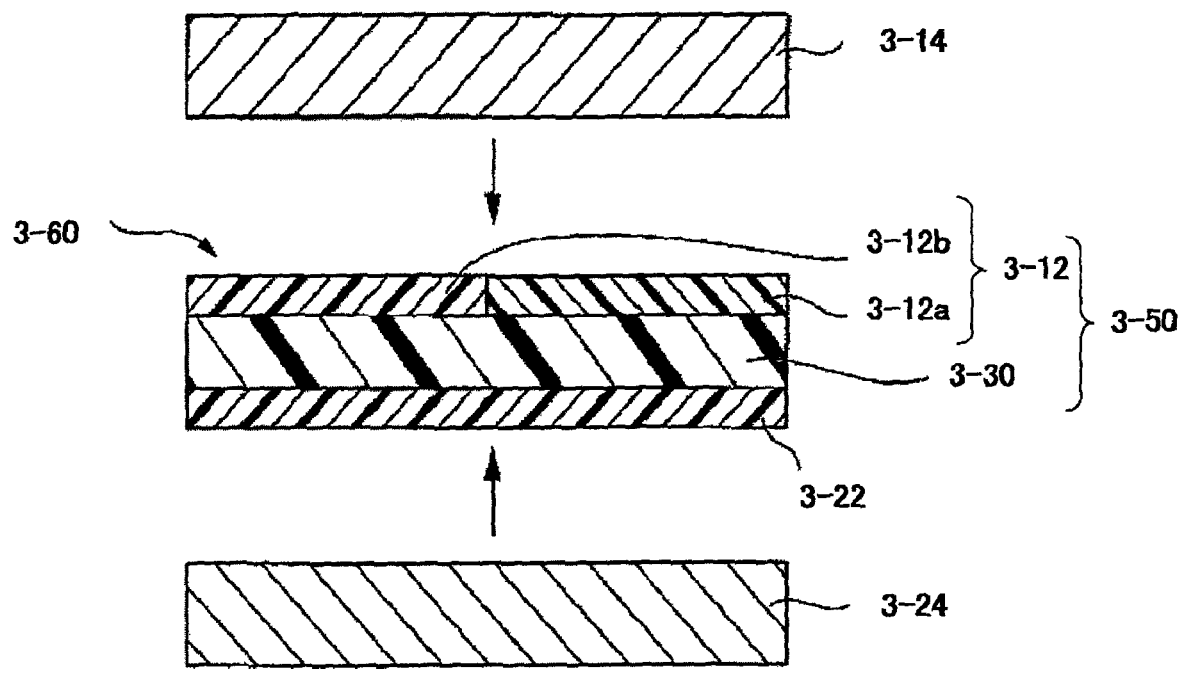
FIG. 21 is a schematic cross-sectional view illustrating one step in the process for producing a membrane/electrode assembly.

The Process (3-III) may, for example, be a process comprising Steps (3-III-1) to (3-III-4). This process will be described with reference to FIG. 21.

(3-III-1) Step of forming a polymer electrolyte membrane 3-30 on the surface of a release substrate (3-III-2) Step of applying a coating fluid for a catalyst layer on one side of the polymer electrolyte membrane 3-30 to prepare a first intermediate 3-50 comprising the polymer electrolyte membrane 3-30 and a catalyst layer 3-12

(3-III-3) Step of releasing the release substrate from the first intermediate 3-50 and applying a coating fluid for a catalyst on the side of the polymer electrolyte membrane 3-30 opposite to the side of the catalyst layer 3-12 to prepare a second intermediate 3-60 comprising the catalyst layer 3-12, the polymer electrolyte membrane 3-30 and the catalyst layer 3-22

(3-III-4) Step of bonding the gas diffusion layer 3-14, the second intermediate 3-60 and the gas diffusion layer 3-24, so that the catalyst layer 3-12 is located between the gas diffusion layer 3-14 and the polymer electrolyte membrane 3-30, and the catalyst layer 3-22 is located between the gas diffusion layer 3-24 and the polymer electrolyte membrane 3-30, to obtain a membrane/electrode assembly 3-5.

The Steps (3-III-1) to (3-III-2) may be carried out in the same manner as Steps (3-I-1) to (3-I-2).

Step (3-III-3):

The second intermediate 3-60 is prepared by releasing the release substrate from the first intermediate 3-50, and applying a coating fluid for an anode catalyst layer on the entire surface of the polymer electrolyte membrane 3-30 to form a catalyst layer 3-22.

The specific method and conditions may be the same method and conditions as in Step (3-II-2).

Step (3-III-4):

The preparation, bonding method and conditions for the gas diffusion layer 3-14 and the gas diffusion layer 3-24 may be the same method and conditions as in Step (3-I-4).

Further, in the Process (3-III), firstly, a catalyst layer 3-22 may be formed on one side of the polymer electrolyte membrane 3-30, and then, a catalyst layer 3-12 may be formed on the side of the polymer electrolyte membrane 3-30 opposite to the side of the catalyst layer 3-22.

By the process for producing a fuel cell 3-1 as described above, at the time of preparing a membrane/electrode assembly 3-5, two types of coating fluids for a cathode catalyst layer or coating fluids for an anode catalyst layer are applied directly on at least one side of the polymer electrolyte membrane 3-30 to form a catalyst layer, whereby the cathode 3-10 or the anode 3-20 can firmly be bonded to the polymer electrolyte membrane 3-30. Specifically, the 90° peel strength at least one of the interface between the cathode 3-10 and the polymer electrolyte membrane 3-30 and the intermediate between the anode 3-20 and the polymer electrolyte membrane 3-30 can be made to be at least 0.03 N/cm, preferably at least 0.1 N/cm. It is thereby possible to suppress deformation of the polymer electrolyte membrane 3-30, whereby deformation of the catalyst layer 3-12 can be suppressed by the polymer electrolyte membrane 3-30 even if the proton-conductive polymer contained in the catalyst layer 3-20 swells, whereby peeling of the polymer electrolyte membrane 3-30 and the cathode 3-10 can be avoided, and sagging of the polymer electrolyte membrane 3-30 into the gas channel due to curvature may be avoided.

Therefore, the fuel cell 3-1 produced by the process for producing a fuel cell of the present invention can provide a high power generation performance stably within a wide temperature range of from high temperature to low temperature in an environment covering from high humidity to low humidity.

In a case where a fuel cell wherein the catalyst layer of the cathode has a layer composed of three or more regions, is to be produced, coating fluids for cathode catalyst layers containing proton-conductive polymers different in the ion exchange capacity are prepared in a number corresponding to the number of regions and may be applied so that the ion exchange capacities of the proton-conductive polymers contained in the respective regions will decrease from the inlet side towards the outlet side of the channel.

Further, in a case where a fuel cell wherein the gas diffusion layer has a carbon layer on the surface of the gas diffusing substrate on the catalyst layer side, is to be prepared, as such a gas diffusion layer, one having a carbon layer formed on the surface of the gas diffusing substrate may be employed.

[90° Peeling Test]

The 90° peel strength may, for example, be measured by the following four types of methods depending upon the process for producing the membrane/electrode assembly. That is, in a case where a catalyst layer is formed on a polymer electrolyte membrane and then the catalyst layer and a gas diffusion layer are bonded, 90° peeling test (I-1) and 90° peeling test (I-2) are carried out, and in a case where a catalyst layer is formed on a gas diffusion layer, and then the catalyst layer and a polymer electrolyte membrane are bonded, 90° peeling test (II-1) and 90° peeling test (II-2) are carried out.

In the present invention, when "the 90° peel strength between a polymer electrolyte membrane and a gas diffusion layer" is measured by 90° peeling test (I-1) and 90° peeling test (II-1), the 90° peel strength at the interface where peeling takes place first among the interface between the polymer electrolyte membrane and the catalyst layer and the interface between the gas diffusion layer and the catalyst layer, is taken as "the 90° peel strength between a polymer electrolyte membrane and a gas diffusion layer".

Now, with reference to FIGS. 22, 23, 24 and 25, 90° peeling test (I-1), 90° peeling test (I-2), 90° peeling test (II-1) and 90° peeling test (II-2) will be described.

Figure 22:
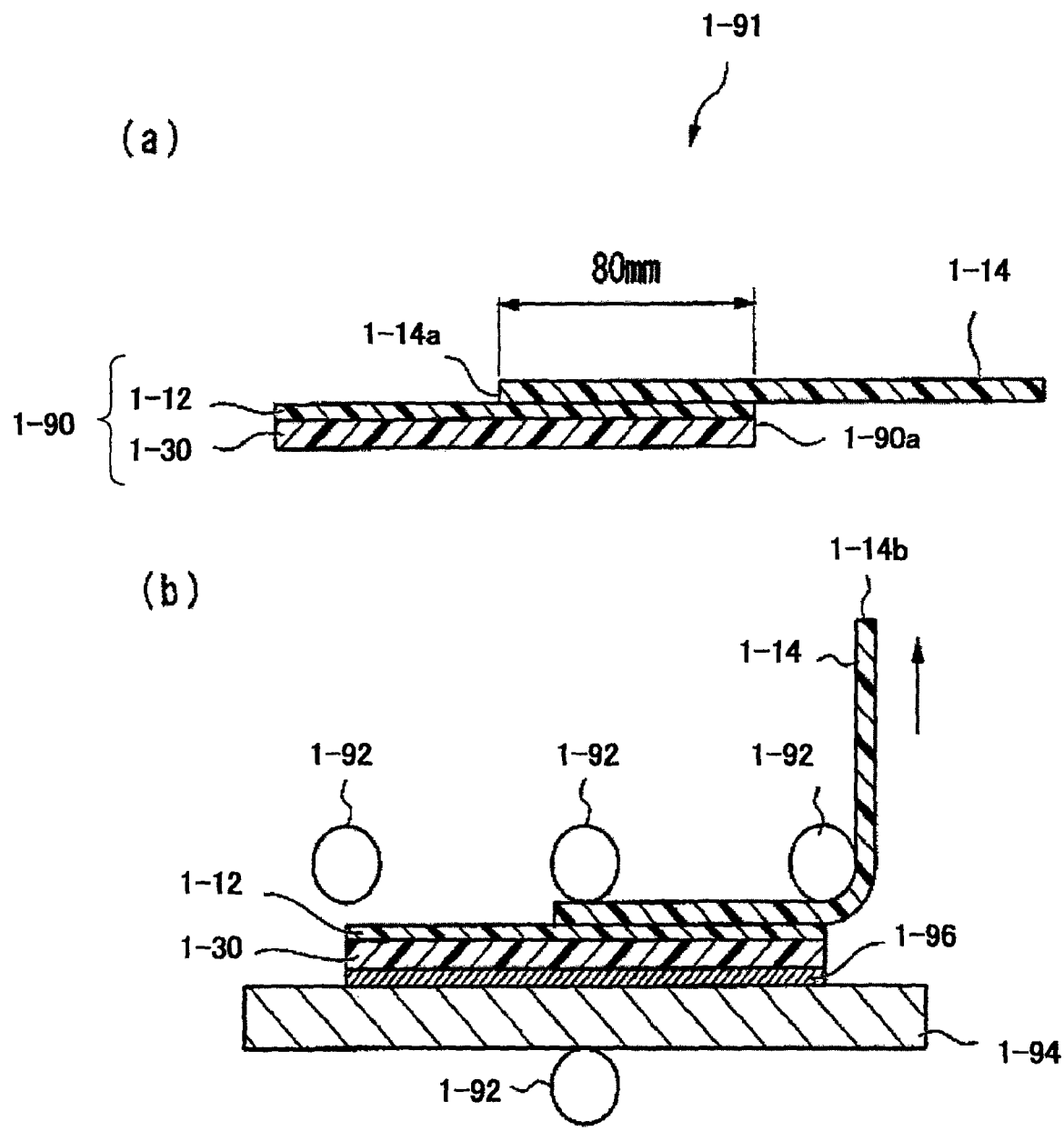
FIG. 22(a) is a diagrammatic view illustrating a test piece to be used for 90° peeling test (I-1)
FIG. 22(b) is a diagrammatic view illustrating an apparatus for the 90° peeling test (I-1).
Figure 23:
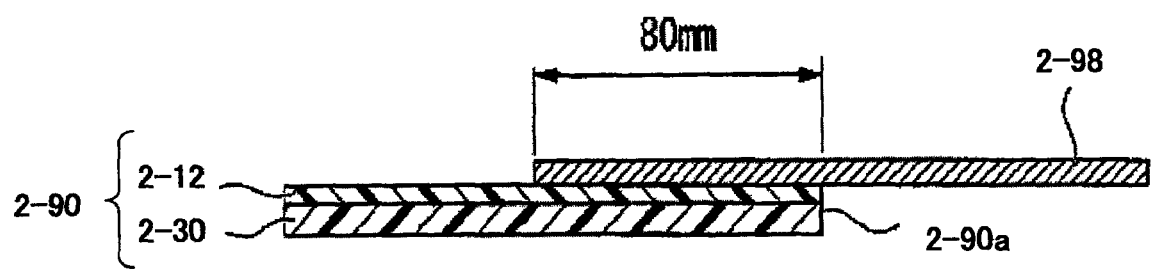
FIG. 23(a) is a diagrammatic view illustrating a test piece to be used for 90° peeling test (I-2)
FIG. 23(b) is a diagrammatic view illustrating an apparatus for the 90° peeling test (I-2).
Figure 23:
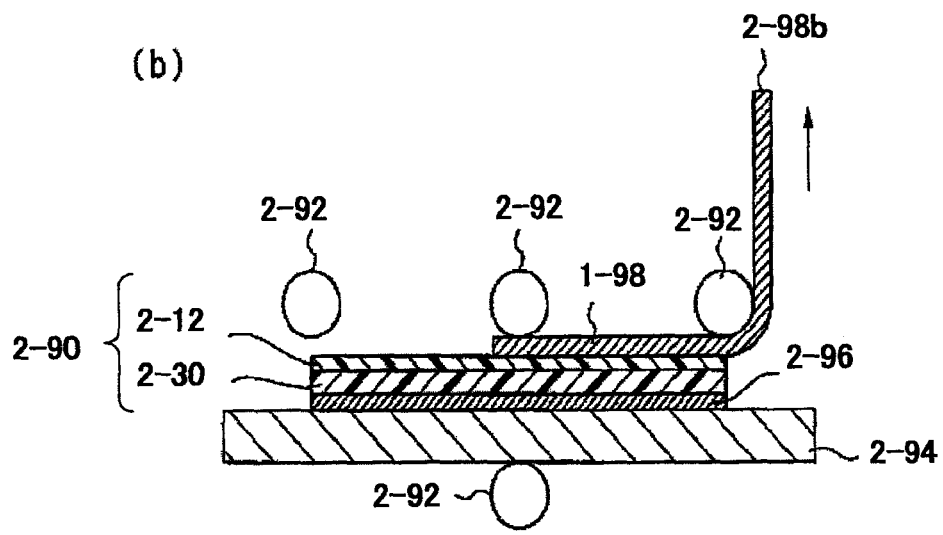
Figure 24:
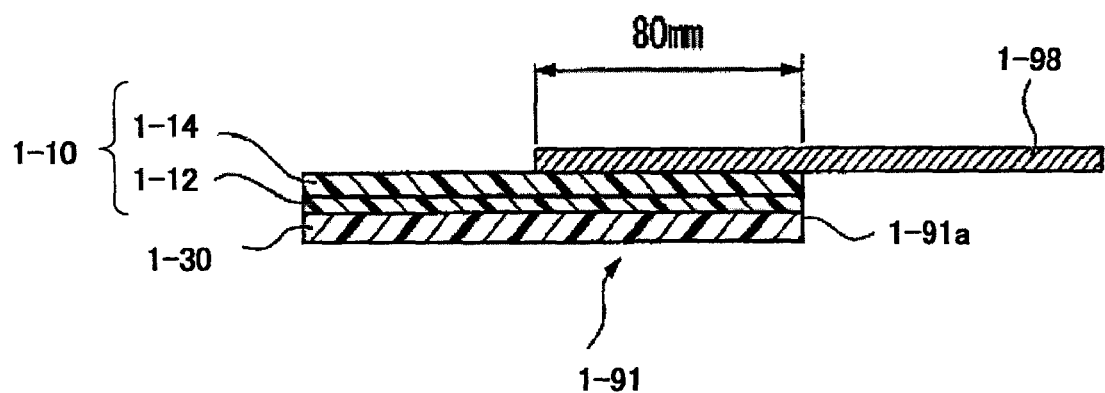
FIG. 24(a) is a diagrammatic view illustrating a test piece to be used for 90° peeling test (II-1)
FIG. 24(b) is a diagrammatic view illustrating an apparatus for the 90° peeling test (II-1).
Figure 24:
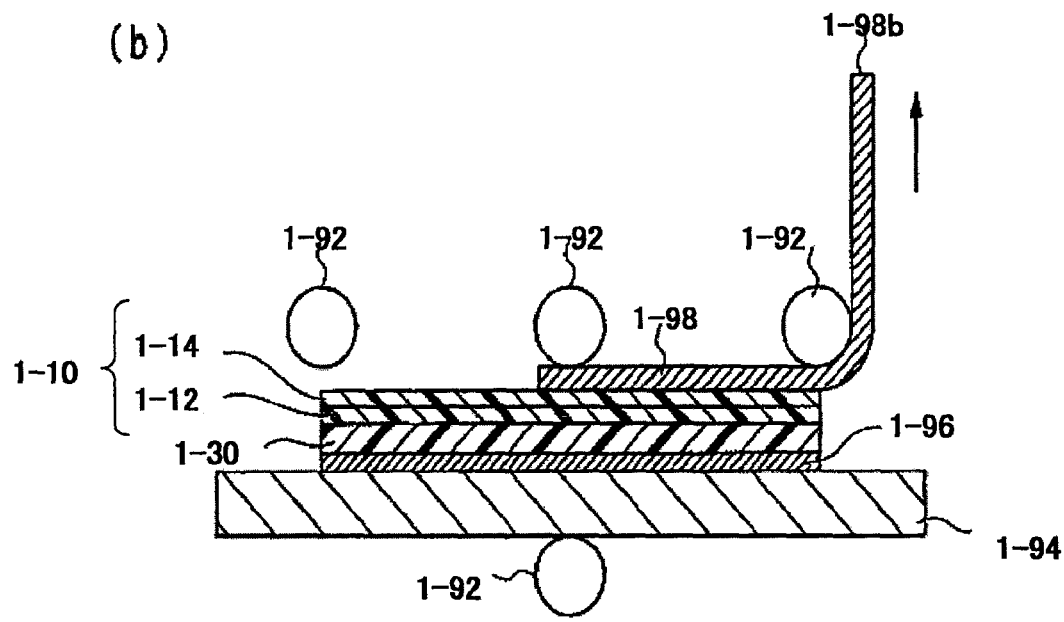

90° Peeling Test (I-1):

(Procedure 1) As shown in FIG. 22(*a*), a first catalyst layer 1-12 (or 1-22) is formed on one side of a polymer electrolyte membrane 1-30 to prepare a test piece 1-90 comprising the polymer electrolyte membrane 1-30 and the catalyst layer 1-12 (or 1-22).

(Procedure 2) A 80 mm portion in a longitudinal direction from the terminal end 1-90a of the test piece 1-90 and a 80 mm portion in a longitudinal direction from the terminal end 1-14a (or 1-24a) of a gas diffusion layer 1-14 (or 1-24) are bonded so that the first catalyst layer 1-12 (or 1-22) is located between the gas diffusion layer 1-14 (or 1-24) and the polymer electrolyte membrane 1-30, to prepare a test piece 1-91 of 20 mm in width×220 mm in length.

(Procedure 3) As shown in FIG. 22(b), the entire surface of the polymer electrolyte membrane 1-30 on the side opposite to the catalyst 1-12 (or 1-22) side is bonded to an aluminum plate 1-94 of 25 mm in width×150 mm in length×3 mm in thickness by means of a double-sided adhesive tape 1-96, and the non-bonded side terminal end 1-14b (or 1-24b) of the gas diffusion layer 1-14 (or 1-24) was pinched by a sample attaching portion of a tensile tester (not shown) via a roller 1-92 made of stainless steel and having a diameter of 6 mm.

Here, as the double-sided adhesive tape 1-96, one having an adhesive strength sufficiently higher than either one of the peel strength at the interface between the gas diffusion layer 1-14 (or 1-24) of the test piece 1-91 and the catalyst layer 1-12 (or 1-22) and the peel strength at the interface between the catalyst layer 1-12 (or 1-22) and the polymer electrolyte membrane 1-30, is used.

(Procedure 4) The pinched terminal end 1-14b (or 1-24b) is pulled at a rate of 50 mm/min in a direction perpendicular (as shown by an arrow) to the polymer electrolyte membrane 1-30, whereby the peel strength at the interface where peeling takes place first among the interface between the polymer electrolyte membrane 1-30 and the catalyst layer 1-12 (or 1-22) and the interface between the gas diffusion layer 1-14 (or 1-24) and the catalyst layer 1-12 (or 1-22), is measured.

90° Peeling test (I-1) is carried out with respect to three test pieces 1-91 prepared by the Procedures 1 and 2.

"The 90° peel strength" is determined in such a manner that the strength in peeling at the interface where peeling takes place first among the interface between the polymer electrolyte membrane 1-30 and the catalyst layer 1-12 (or 1-22) and the interface between the gas diffusion layer 1-14 (or 1-24) and the catalyst layer 1-12 (or 1-22), is measured via a load cell and recorded by a personal computer, and an average value is obtained with respect to a portion where the value of strength is stabilized among the measured strengths i.e. a portion excluding the values at the initiation and termination in the measurement of the peel strength, and such an average value is taken as peel strength, and an average value in peel strength of the three test pieces is calculated, and this average value is divided by the width of 20 mm of the test piece 1-91.

90° Peeling Test (I-2):

(Procedure 1) As shown in FIG. 23(a), a catalyst layer 2-12 (or 2-22) is formed on one side of a polymer electrolyte membrane 2-30 to prepare a test piece 2-90 of 20 mm in width×150 mm in length comprising the polymer electrolyte membrane 2-30 and the catalyst layer 2-12 (or 2-22).

(Procedure 2) As shown in FIG. 23(a), a single-sided adhesive tape 2-98 is bonded on the surface of the catalyst layer 2-12 (or 2-22) at a portion of 80 mm in a longitudinal direction from the terminal end 2-90a of the test piece 2-90.

Here, as the single-sided adhesive tape 2-98, one having an adhesive strength sufficiently higher than the peel strength between the polymer electrolyte membrane 2-30 and the catalyst layer 2-12 (or 2-22) is used.

(Procedure 3) As shown in FIG. 23(b), the entire surface of the test piece 2-90 on the side opposite to the catalyst layer 2-12 (or 2-22) side is bonded to an aluminum plate 2-94 of 25 mm in width×150 mm in length×3 mm in thickness by means of a double-sided adhesive tape 2-96. Here, as the double-sided adhesive tape 2-96, one having an adhesive strength sufficiently higher than the peel strength between the polymer electrolyte membrane 2-30 and the catalyst layer 2-12 (or 2-22) is used.

And, the terminal end 2-98b of the single-sided adhesive tape 2-98 is pinched by a sample attaching portion of a tensile tester (not shown) via a roller 2-92 made of stainless steel and having a diameter of 6 mm.

(Procedure 4) The pinched terminal end 2-98b is pulled at a rate of 50 mm/min in a direction vertical (as shown by an arrow) to the test piece 2-90, whereby the strength when the polymer electrolyte membrane 2-30 and the catalyst layer 2-12 (or 2-22) are peeled, is measured.

90° Peeling test (I-2) is carried out with respect to three test pieces 2-90 prepared by Procedure 1.

"The 90° peel strength" is determined in such a manner that the strength until the polymer electrolyte membrane 2-30 and the catalyst layer 2-12 (or 2-22) are peeled, is measured via a load cell and recorded by a personal computer, and an average value is obtained with respect to a portion where the value of strength is stabilized among the measured strengths, i.e. a portion excluding the values at the initiation and termination in the measurement of the peel strength, and such an average value is taken as peel strength, and an average value in peel strength of the three test pieces is calculated, and this average value is divided by the width of 20 mm of the test piece 2-90.

90° Peeling Test (II-1):

(Procedure 1) As shown in FIG. 24(a), a catalyst layer 1-12 (or 1-22) is formed on the surface of a gas diffusion layer 1-14 (or 1-24) to prepare an electrode 1-10 (or 1-20) comprising the gas diffusion layer 1-14 (or 1-24) and the catalyst layer 1-12 (or 1-22). Further, the electrode 1-10 (or 1-20) and a polymer electrolyte membrane 1-30 are bonded so that the catalyst layer 1-12 (or 1-22) is located between the gas diffusion layer 1-14 (or 1-24) and the polymer electrolyte membrane 1-30, to prepare a test piece 1-91 of 20 mm in width× 150 mm in length.

(Procedure 2) A single-sided adhesive tape 1-98 is bonded on the surface of the gas diffusion layer 1-14 at a portion of 80 mm in a longitudinal direction from the terminal end 1-91a of the test piece 1-91.

Here, as the single-sided adhesive tape 1-98, one having an adhesive strength sufficiently higher than the peel strength at the interface between the polymer electrolyte membrane 1-30 and the catalyst layer 1-12 (or 1-22) and the peel strength at the interface between the catalyst layer 1-12 (or 1-22) and the gas diffusion layer 1-14 (or 1-24), is used.

(Procedure 2) As shown in FIG. 24(b), the entire surface of the polymer electrolyte membrane 1-30 on the side opposite to the catalyst layer 1-12 (or 1-22) side is bonded to an aluminum plate 1-94 of 25 mm in width×150 mm in length×3 mm in thickness by means of a double-sided adhesive tape 1-96.

Here, as the double-sided adhesive tape 1-96, one having an adhesive strength sufficiently higher than the peel strength at the interface between the polymer electrolyte membrane 1-30 and the first catalyst layer 1-12 and the peel strength at the interface between the first catalyst layer 1-12 (or 1-22) and the first gas diffusion layer 1-14 (or 1-24), is used.

And, the terminal end 1-98b of the single-sided adhesive tape 1-98 is pinched by a sample attaching portion of a tensile tester (not shown) via a roller 1-92 made of stainless steel and having a diameter of 6 mm.

(Procedure 4) The pinched terminal end 1-98b is pulled at a rate of 50 mm/min in a direction vertical (as shown by an arrow) to the test piece 1-91, whereby the peel strength at the interface where peeling takes place first among the interface between the polymer electrolyte membrane 1-30 and the catalyst layer 1-12 (or 1-22) and the interface between the gas diffusion layer 1-14 (or 1-24) and the first catalyst layer 1-12 (or 1-22), is measured.

90° Peeling test (II-1) is carried out with respect to three test pieces 1-91 prepared by Procedure 1.

"The 90° peel strength" is determined in such a manner that the strength in peeling at the interface where peeling takes place first among the interface between the polymer electrolyte membrane 1-30 and the catalyst layer 1-12 (or 1-22) and the interface between the gas diffusion layer 1-14 (or 1-24) and the catalyst layer 1-12 (or 1-22), is measured via a load cell and recorded by a personal computer, and an average value is obtained with respect to a portion where the value of the strength is stabilized among the measured strengths, i.e. a portion excluding the values at the initiation and termination in the measurement of the peel strength, and such an average value is taken as peel strength, and an average value in peel strength of three test pieces is calculated, and this average value is divided by the width of 20 mm of the test piece 1-91.

In a case where the 90° peel strength is to be measured with respect to a membrane/electrode assembly 1-1 wherein a catalyst layer 1-12 (or 1-22) is already bonded to each of a polymer electrolyte membrane 1-30 and a gas diffusion layer 1-14 (or 1-24), the following measuring method may, for example, be used for the measurement.

Firstly, from the membrane/electrode assembly 1-1, a sample of 20 mm in width×200 mm in length is cut out, and the gas diffusion layer 1-24 (or 1-14) on the side not to be measured, is peeled. And, the surface on the side having the gas diffusion layer 1-24 (or 1-14) peeled, is bonded to an aluminum plate 1-94 by means of a double-sided adhesive tape 1-96.

Here, as the double-sided adhesive tape 1-96 to be used, one having an adhesive strength sufficiently higher than the peel strength at the interface between the polymer electrolyte membrane 1-30 and the catalyst layer 1-12 (or 1-22) and the peel strength at the interface between the catalyst layer 1-12 (or 1-22) and the gas diffusion layer 1-14 (or 1-24) of the sample, is used.

Then, a single-sided adhesive tape 1-98 is bonded to the surface of the gas diffusion layer 1-14 (or 1-24) in the same manner as in Procedure 2 in the 90° peeling test (II). Then, in accordance with Procedure 3 in the 90° peeling test (II), a terminal end 1-98b of the single-sided adhesive tape 1-98 is pinched by a sample attaching portion of a tensile tester. And, in accordance with Procedure 4 in the 90° peeling test (II), the pinched terminal end 1-98b is pulled at a rate of 50 mm/min in a direction vertical (as shown by an arrow) to the polymer electrolyte membrane 1-30, whereby the peel strength at the interface where peeling takes place first among the interface between the polymer electrolyte membrane 1-30 and the catalyst layer 1-12 (or 1-22) and the interface between the gas diffusion layer 1-14 (or 1-24) and the catalyst layer 1-12 (or 1-22), is measured.

Figure 25:
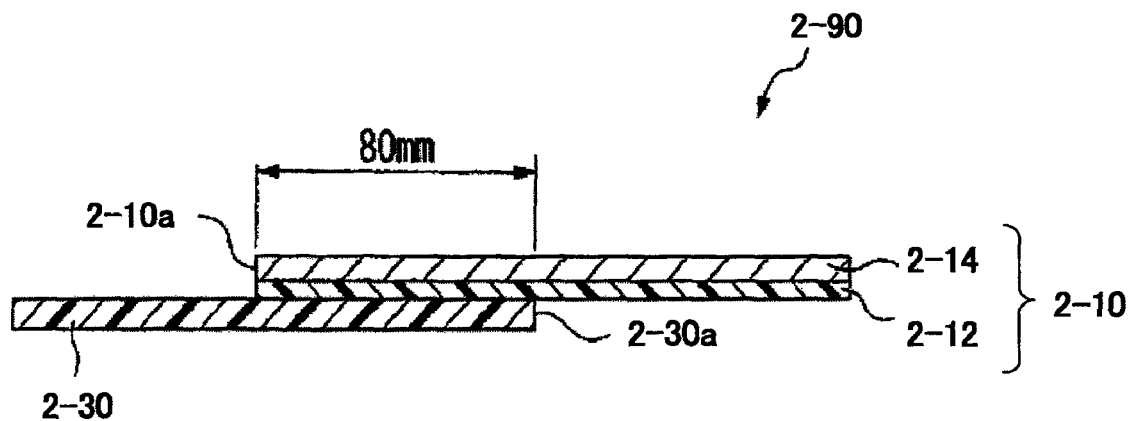
FIG. 25(a) is a diagrammatic view illustrating a test piece to be used for 90° peeling test (II-2)
FIG. 25(b) is a diagrammatic view illustrating an apparatus for the 90° peeling test (II-2).
Figure 25:
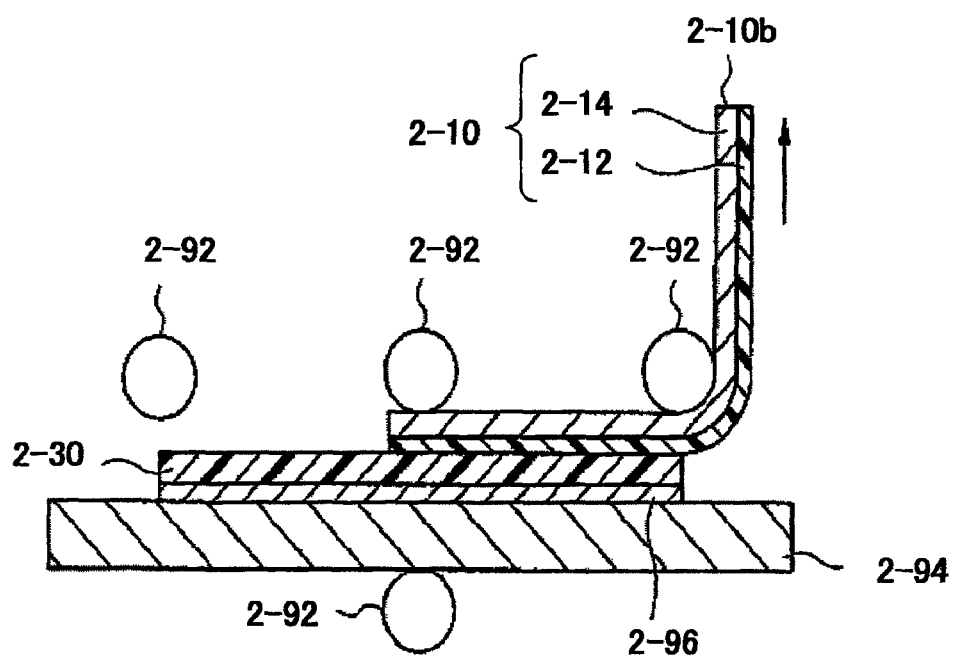

90° Peeling Test (II-2):

(Procedure 1) As shown in FIG. 25(*a*), a catalyst layer 2-12 (or 2-22) is formed on the surface of a gas diffusion layer 2-14 (or 2-24) to prepare a cathode 2-10 (or an anode 2-20) comprising the gas diffusion layer 2-14 (or 2-24) and the catalyst layer 2-12 (or 2-22).

(Procedure 2) A portion of 80 mm in a longitudinal direction from the terminal end 2-10a (or 2-20a) of the cathode 2-10 (or the anode 2-20) and a portion of 80 mm in a longitudinal direction from a terminal end 2-30a of a polymer electrolyte membrane 2-30 are bonded so that the catalyst layer 2-12 (or 2-22) is located between the gas diffusion layer 2-14 (or 2-24) and the polymer electrolyte membrane 2-30, to prepare a test piece 2-90 of 20 mm in width×220 mm in length.

(Procedure 3) As shown in FIG. 25(*b*), the entire surface of the polymer electrolyte membrane 2-30 on the side opposite to the cathode 2-10 (the anode 2-20) side is bonded to an aluminum plate 94 of 25 mm in width×150 mm in length×3 mm in thickness by means of a double-sided adhesive tape 2-96, and the non-bonded terminal end 2-10b (or 2-20b) of the cathode 2-10 (or the anode 2-20) is pinched by a sample attaching portion of a tensile tester (not shown) via a roller 2-92 made of stainless steel and having a diameter of 6 mm.

Here, as the double-sided adhesive tape 2-96, one having an adhesive strength sufficiently higher than the peel strength between the cathode 2-10 (or the anode 2-20) and the polymer electrolyte membrane 2-30 of the test piece 2-90, is used.

(Procedure 4) The pinched terminal end 2-10b (or 2-20) is pulled at a rate of 50 mm/min in a direction vertical (as shown by an arrow) to the polymer electrolyte membrane 2-30, whereby the strength at the time when the cathode 2-10 (or the anode 2-20) and the polymer electrolyte membrane 2-30 are peeled, is measured.

90° Peeling test (II-2) is carried out with respect to three test pieces 2-90 prepared by the Procedures 1 and 2.

"The 90° peel strength" is determined in such a manner that the strength until the cathode 2-10 (or the anode 2-20) and the polymer electrolyte membrane 2-30 are peeled, is measured via a load cell and recorded by a personal computer, and an average value is obtained with respect to a portion where the value of the strength is stabilized among the measured strengths, i.e. a portion excluding the values at the initiation and termination in the measurement of the peel strength, and such an average value is taken as peel strength, and an average value in peel strength of the three test pieces is calculated, and this average value is divided by the width of 20 mm of the test piece 2-90.

In a case where the above-described 90° peel strength is to be measured with respect to a membrane/electrode assembly 2-1, the following method may, for example, be used for the measurement.

Firstly, from the membrane/electrode assembly 2-1, a sample of 20 mm in width×200 mm in length is cut out, and the gas diffusion layer 2-24 (or 2-14) on the side not to be measured is peeled. And, the surface on the side having the gas diffusion layer 2-24 (or 2-14) peeled is bonded to an aluminum plate 2-94 by means of a double-sided adhesive tape 2-96.

Here, as the double-sided adhesive tape 2-96 to be used, one having an adhesive strength sufficiently higher than the peel strength between the cathode 2-10 (or the anode 2-20) and the polymer electrolyte membrane 2-30 of the sample, is used.

And, about 40 mm of the cathode 2-10 (or the anode 2-20) on the side to be measured is peeled from the terminal end 2-10b (or 2-20b) in a longitudinal direction, and in accordance with FIG. 25(*b*), the terminal end 2-10b (or 2-20b) is pinched by a sample attaching portion of a tensile tester.

Here, the about 40 mm portion peeled may be cut off, as the case requires.

And, the pinched terminal end 2-10b (or 2-20b) is pulled at a rate of 50 mm/min in a direction vertical (as shown by an arrow) to the polymer electrolyte membrane 2-30, whereby the strength when the cathode 2-10 (or the anode 2-20) and the polymer electrolyte membrane 2-30 are peeled, is measured.

EXAMPLES

Now, the present invention will be described in further detail with reference to Examples, but it should be understood that the present invention is by no means thereby restricted.

<1>

(Ion Exchange Capacity)

The ion exchange capacity of a proton-conductive polymer was determined by the following method.

A proton-conductive precursor polymer was hydrolyzed by immersing it in a sodium hydroxide solution having a predetermined concentration containing water and methanol as solvents, and the solution was subjected to back titration to obtain the ion exchange capacity.

(TQ Value)

The TQ value (unit: °C.) is an index for the molecular weight of a proton-conductive precursor polymer and is a temperature at which the amount of extrusion becomes 100 mm$^3$/sec when melt extrusion of a polymer is carried out under an extrusion pressure of 2.94 MPa by using a nozzle with a length of 1 mm and an inner diameter of 1 mm. The amount of the polymer extruded was measured by changing the temperature by using a flow tester CFT-500A (manufactured by Shimadzu Corporation), and the TQ value at which the amount of extrusion became 100 mm$^3$/sec was determined.

(Proton Conductivity)

The proton conductivity of a proton-conductive polymer was determined by the following method.

To a film of a proton-conductive polymer with a width of 5 mm, a substrate having four-prove electrodes disposed thereon with a distance of 5 mm was closely contacted, and the resistance of the film was measured at an alternating current of 10 kHz at a voltage of 1V under constant temperature and humidity conditions at a temperature of 80° C. with a relative humidity of 40% by a known four-prove method, and the proton conductivity was calculated from the results.

(Water Content)

The water content of a proton-conductive polymer was determined by the following method.

A proton-conductive polymer was immersed in warm water of 80° C. for 16 hours and then the proton-conductive polymer was cooled to room temperature together with the warm water. The proton-conductive polymer was taken out from the water, and water droplets attached on the surface were wiped off, and the mass of the polymer upon absorption of water was immediately measured. Then, the proton-conductive polymer was put in a glove box and left to stand for at least 24 hours in an atmosphere wherein dried nitrogen was circulated, to dry the polymer. And, the dried mass of the proton-conductive polymer was measured in the glove box. From the difference between the dry mass and the mass upon absorption of water of the proton-conductive polymer, the mass of water to be absorbed by the proton-conductive polymer upon absorption of water was determined. And, the water content of the proton-conductive polymer was determined by the following formula.

Water content=(mass of water absorbed by the proton-conductive polymer upon absorption of water/dry mass of the proton-conductive polymer)×100

[90° Peeling Test]

The 90° peel strength between a polymer electrolyte membrane and a gas diffusion layer of a cathode or anode was determined by carrying out the above-described 90° peeling test (I-1) or 90° peeling test (II-1) depending upon the process for producing the membrane/electrode assembly.

As a double-sided adhesive tape, NW-20 (tradename: NICETACK, manufactured by NICHIBAN) was used.

As a single-sided adhesive tape, a KAPTON adhesive tape (tradename: KAPTON adhesive tape No. 6564S #50, manufactured by Teraoka Seisakusho Co., Ltd.) was used.

As a tensile tester, RTE-1210 (tradename: Universal Tester (Tensilon), manufactured by ORIENTEC) was used.

[Dimensional Change of Gas Diffusion Layer]

The dimensional change of a gas diffusion layer was determined by the following Procedures 1 to 4.

(Procedure 1) With respect to a gas diffusion layer, after it was left for at least 16 hours in an atmosphere at a temperature of 25° C. under a relative humidity of 50%, its dimension (a) was measured.

(Procedure 2) Then, the gas diffusion layer was immersed for 16 hours in warm water at 80° C.

(Procedure 3) Thereafter, the gas diffusion layer was cooled to room temperature as immersed in warm water, whereupon it was taken out from water, and its dimension (b) was measured.

(Procedure 4) The dimensional change was calculated from the following formula.

Dimensional change (%)=[dimension (b)−dimension (a)]/dimension (a)×100

[Power Generation Characterstic]

A test for power generation characteristic was carried out by the following method.

A membrane/electrode assembly was assembled into a cell for power generation, and while the temperature of the membrane/electrode assembly was maintained at 80° C., hydrogen (utilization ratio: 50%) and air (utilization ratio: 50%) were pressurized to 200 kPa (absolute pressure) and supplied to an anode and a cathode, respectively. The humidities of the gases were such that hydrogen had a relative humidity of 50%, and the air had a relative humidity of 0%, and the cell voltage when the current density was 1.0 A/cm$^2$ was recorded.

[Moistening/Drying Cycle Test]

The moistening/drying cycle test was carried out by the following method in accordance with the method disclosed in the above-mentioned Non-Patent Document 1.

A membrane/electrode assembly was assembled into a cell for power generation (electrode area: 25 cm$^2$), and nitrogen was supplied at a rate of 1 L/min to the anode and the cathode, respectively, at a cell temperature of 80° C. At that time, the gas was supplied for 2 minutes by adjusting its humidity to a relative humidity of 150% at both the anode and the cathode and then it was supplied for 2 minutes by adjusting the humidity to a relative humidity of 0%, and this process was taken as one cycle and repeated. Every 100 cycles, a pressure difference was created between the anode and the cathode to judge the presence or absence of physical gas leakage. The point of time when gas leakage was observed and the gas crossover speed became at least 10 sccm, was judged to be the lifetime. The number of cycles at that point of time was taken as an index for the durability.

The number of cycles being less than 10,000 cycles was identified by X, at least 10,000 cycles to less than 20,000 cycles was identified by Δ and at least 20,000 cycles was identified by ○.

<Preparation (1) of Proton-Conductive Polymer>

Compound (m11) was prepared by the following synthetic route, and by using the compound (m11), a proton-conductive precursor polymer (copolymer A) was prepared.

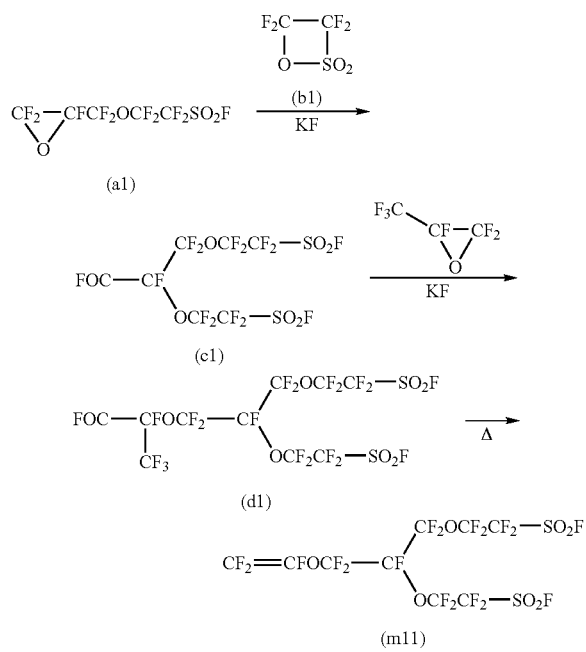

Preparation of Compound (a1):

Compound (a1) was prepared in the same manner as the method disclosed in Example 1 of JP-A-57-176973.

Preparation of Compound (c1):

To a 300 cm³ four-necked round bottom flask equipped with a Dimroth condenser, a thermometer, a dropping funnel and a glass rod with an agitating blade, 1.6 g of potassium fluoride (tradename: Chloro-Catch F, manufactured by MORITA CHEMICAL INDUSTRIES CO., LTD.) and 15.9 g of dimethoxyethane were put in a nitrogen atmosphere. Then, the round bottom flask was cooled in an ice bath, and 49.1 g of compound (b1) was added dropwise from the dropping funnel over a period of 32 minutes at an internal temperature of at most 10° C. After completion of the dropwise addition, 82.0 g of compound (a1) was added dropwise from the dropping funnel over a period of 15 minutes. Substantially no increase in the internal temperature was observed. After completion of the dropwise addition, the internal temperature was returned to room temperature, followed by stirring for about 90 minutes. The lower layer was recovered by a separatory funnel. The recovered amount was 127.6 g, and the gas chromatography (hereinafter referred to as GC) purity was 55%. The recovered liquid was put in a 200 cm³ four-necked round bottom flask, followed by distillation to obtain 97.7 g of compound (c1) as a fraction at a degree of vacuum of from 1.0 to 1.1 kPa (absolute pressure). The GC purity was 98%, and the yield was 80%.

Preparation of Compound (d1):

To a 200 cm³ autoclave made of stainless steel, 1.1 g of potassium fluoride (tradename: Chloro-Catch F, manufactured by MORITA CHEMICAL INDUSTRIES CO., LTD.) was put. After deaeration, 5.3 g of dimethoxyethane, 5.3 g of acetonitrile and 95.8 g of compound (c1) were put in the autoclave under reduced pressure.

Then, the autoclave was cooled in an ice bath, 27.2 g of hexafluoropropene oxide was added over a period of 27 minutes at an internal temperature of from 0 to 5° C., and the internal temperature was returned to room temperature with stirring, followed by stirring overnight. The lower layer was recovered by a separatory funnel. The recovered amount was 121.9 g, and the GC purity was 63%. The recovered liquid was subjected to distillation to obtain 72.0 g of compound (d1) as a fraction at a boiling point of 80 to 84° C./0.67 to 0.80 kPa (absolute pressure). The GC purity was 98%, and the yield was 56%.

Preparation of Compound (m11):

Using a stainless steel tube with an inner diameter of 1.6 cm, a U-tube with a length of 40 cm was prepared. One end of the U-tube was filled with glass wool, and the other end was filled with glass beads with a stainless steel sintered metal as a perforated plate to prepare a fluidized bed type reactor. A nitrogen gas was used as a fluidizing gas so that raw materials could be continuously supplied by a metering pump. The outlet gas was collected using a trap tube with liquid nitrogen.

The fluidized bed type reactor was put in a salt bath, and 34.6 g of compound (d1) was supplied to the fluidized bed type reactor over a period of 1.5 hours so that the molar ratio of compound (d1)/$N_2$ would be 1/20 while the reaction temperature was maintained at 340° C. After completion of the reaction, 27 g of a liquid was obtained by the liquid nitrogen trap. The GC purity was 84%. The liquid was subjected to distillation to obtain compound (m1) as a fraction at a boiling point of 69° C./0.40 kPa (absolute pressure). The GC purity was 98%.

$^{19}$F—NMR (282.7 MHz, solvent: $CDCl_3$, standard: $CFCl_3$) of compound (m11).

δ(ppm): 45.5(1F), 45.2(1F), −79.5(2F), −82.4(4F), −84.1 (2F), −112.4(2F), −112.6(2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9(1F).

Preparation of Proton-Conductive Precursor Polymer:

Into a 30 cm³ stainless steel autoclave, 9.84 g of compound (m11), 3.09 g of compound (3-1) as a solvent and 1.3 g of compound (4-1) as an initiator were put, followed by cooling with liquid nitrogen for deaeration.

$CClF_2CF_2CHClF$      (3-1)

$(CH_3)_2C(CN)N=NC(CH_3)_2(CN)$      (4-1)

The internal temperature was raised to 70° C., tetrafluoroethylene was introduced to the autoclave, and the pressure was adjusted at 1.31 MPaG (gauge pressure). Polymerization was carried out for 5.7 hours while the temperature and pressure were maintained constant. Then, the autoclave was cooled to terminate the polymerization, and the gas in the system was purged. The reaction liquid was diluted with compound (3-1), and compound (3-2) was added to coagulate the polymer, followed by filtration:

$CH_3CCl_2F$      (3-2).

The polymer was stirred in compound (3-1), and compound (3-2) was added to re-coagulate the polymer, followed by filtration. The polymer was dried under reduced pressure at 80° C. overnight, to obtain a proton-conductive precursor polymer (hereinafter referred to as copolymer A) which is a copolymer of tetrafluoroethylene with compound (m11). The yield of copolymer A was 1.2 g. The characteristics of copolymer A and copolymer A after carrying out the following treatment for acid-form are shown in Table 1.

<Preparation (2) of Proton-Conductive Polymer>

Tetrafluoroethylene ($CF_2=CF_2$) and compound (2-1) were copolymerized to obtain a proton-conductive precursor polymer (hereinafter referred to as copolymer B). The characteristics of copolymer B and copolymer B after carrying out the following treatment for acid form are shown in Table 1.

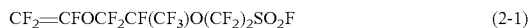

$$CF_2=CFOCF_2CF(CF_3)O(CF_2)_2SO_2F \quad (2\text{-}1)$$

TABLE 1

|  | Ion exchange capacity (meq·g$^{-1}$) | TQ (° C.) | Proton conductivity (S/cm) | Water content (%) |
|---|---|---|---|---|
| Copolymer A | 1.63 | 225 | 0.105 | 105 |
| Copolymer B | 1.10 | 220 | 0.04 | 66 |

<Preparation (1) of Liquid Composition>

To a polymer having copolymer A converted to acid form by the following treatment for acid-form, a mixed solvent of ethanol, water and 1-butanol (ethanol/water/1-butanol=35/50/15 by mass ratio) was added, and the solid content concentration was adjusted to 15 mass %, followed by stirring at 125° C. for 8 hours by using an autoclave. Thereafter, water was further added to adjust the solid content concentration to 9 mass % to prepare a liquid composition (hereinafter referred to as liquid composition SA) having the polymer dispersed in a dispersing medium. The composition of the dispersing medium was ethanol/water/1-butanol=21/70/9 (mass ratio).

[Treatment for Acid-Form]

Firstly, copolymer A was formed into a film having a thickness of from 100 to 200 μm by press molding at the TQ temperature of copolymer A.

Then, the film was immersed in an aqueous solution containing 30 mass % of dimethylsulfoxide and 15 mass % of potassium hydroxide at 80° C. for 16 hours to hydrolyze —$SO_2F$ groups in the film thereby to convert them to —$SO_3K$ groups.

Then, the film was immersed in a 3 mol/L hydrochloric acid aqueous solution at 50° C. for 2 hours. The hydrochloric acid aqueous solution was changed, and the same treatment was further repeated four times. The film was sufficiently washed with deionized water to obtain a film-form polymer having —$SO_3K$ groups in the film converted to sulfonic acid groups.

<Preparation (2) of Liquid Composition>

To a polymer having copolymer B converted to acid form by the above treatment for acid-form, a mixed solvent of ethanol and water (ethanol/water=40/60 by mass ratio) was added to adjust the solid content concentration to 25 mass %, followed by stirring at 110° C. for 8 hours by using an autoclave to prepare a liquid composition (hereinafter referred to as liquid composition SB).

<Preparation of Membrane/Electrode Assembly>

Example 1-1

By the above-mentioned Process (1-I), a membrane/electrode assembly was prepared.

Step (1-I-1):

Liquid composition SA was applied on a sheet (tradename: AFLEX 100N, manufactured by Asahi Glass Company, Limited; hereinafter referred to as ETFE sheet) made of an ethylene/tetrafluoroethylene copolymer having a thickness of 100 μm by a die coater and dried at 80° C. for 30 minutes and further subjected to heat treatment at 190° C. for 30 minutes to form a polymer electrolyte membrane (proton conductivity: 0.105 S/cm) having a thickness of 25 μm (hereinafter referred to as polymer electrolyte membrane MA25).

Step (1-I-2):

20 g of a catalyst having platinum supported in an amount of 50 mass % by mass ratio on a heat-treated carbon black powder, was added to 70 g of water and uniformly dispersed by applying ultrasonic waves for 10 minutes. To this dispersion, 80 of liquid composition SA was added, and 100 g of ethanol was further added to bring the solid content concentration to 10 mass % thereby to obtain a coating fluid for a catalyst layer (hereinafter referred to as coating fluid CA).

A gas diffusion layer was prepared which was made of carbon paper having its surface treated with a dispersion containing carbon black particles and polytetrafluoroethylene (tradename: H2315T10AC1, manufactured by NOK) (hereinafter referred to as the carbon paper).

The dimensional change of the gas diffusion layer was 1%. The results are shown in Table 2.

On the gas diffusion layer, coating fluid CA was applied by a die coater so that the amount of platinum would be 0.2 mg/cm$^2$ and dried for 15 minutes in a dryer at 80° C. and further subjected to heat treatment at 190° C. in a reduced pressure atmosphere (5 mmHg) to stabilize the proton-conductive polymer in the catalyst layer to form a catalyst layer, thereby to prepare a first intermediate.

Step (1-I-3):

A second intermediate was prepared in the same manner as in Step (1-2).

Step (1-I-4):

From the polymer electrolyte membrane MA25, the ETFE sheet was peeled.

The polymer electrolyte membrane MA25 was interposed between the first intermediate and the second intermediate so that on each of the cathode side and the anode side, a catalyst layer was located between a gas diffusion layer and a polymer electrolyte membrane, and this assembly was put in a pressing machine preliminarily heated at 140° C. and hot-pressed for 5 minutes under a pressing pressure of 1.5 MPa to obtain a membrane/electrode assembly having an electrode area of 25 cm$^2$.

With respect to the membrane/electrode assembly, the power generation characteristic and moistening/drying cycle tests were carried out. The results are shown in Table 2.

[Preparation of Test Piece for 90° Peeling Test]

A test piece was prepared in accordance with Procedures 1 and 2 in 90° peeling test (II-1).

Using the polymer electrolyte membrane MA25 and the first intermediate obtained in Example 1-1, the first intermediate and the polymer electrolyte membrane MA25 were bonded by the same method and conditions as in Step (1-I-4) in Example 1-1, so that a catalyst layer was located between the gas diffusion layer and the polymer electrolyte membrane MA25, to prepare a test piece of 20 mm in width×150 mm in length. With respect to this test piece, 90° peeling test (II-1) was carried out. The results are shown in Table 2.

Example 1-2

By the above-mentioned Process (1-I), a membrane/electrode assembly was prepared.

Step (1-I-1):

Liquid composition SB was applied on the ETFE sheet having a thickness of 100 μm by a die coater, then dried at 80° C. for 30 minutes and further subjected to heat treatment at 150° C. for 30 minutes to form a polymer electrolyte membrane (proton conductivity: 0.04 S/cm) having a thickness of 15 μm (hereinafter referred to as polymer electrolyte membrane MB15).

Steps (1-I-2) to (1-I-4):

A membrane/electrode assembly was obtained in the same manner as in Example 1-1 except that in Example 1-1, the polymer electrolyte membrane MA25 was changed to the polymer electrolyte membrane MB15.

With respect to the membrane/electrode assembly, the power generation characteristic and moistening/drying cycle tests were carried out. The results are shown in Table 2.

[Preparation of Test Piece for 90° Peeling Test]

A test piece was prepared in accordance with Procedures 1 and 2 in 90° C. peeling test (II-1).

That is, the test piece was prepared in the same manner as in Example 1-1 except that in Example 1-1, the polymer electrolyte membrane MA25 was changed to the polymer electrolyte membrane MB15. With respect to this test piece, 90° peeling test (II-1) was carried out. The results are shown in Table 2.

Example 1-3

By the above-described Process (1-II), a membrane/electrode assembly was prepared.

Step (1-II-1):

The polymer electrolyte membrane MA25 was prepared in the same manner as in Example 1-1.

Steps (1-II-2) to (1-II-3):

The coating fluid CA was prepared in the same manner as in Example 1-1.

The coating fluid CA was applied on a separately prepared ETFE sheet by a die coater so that the amount of platinum would be 0.2 mg/cm$^2$, then dried for 15 minutes in a dryer at 80° C. and further subjected to heat treatment at 190° C. in a reduced pressure atmosphere (5 mmHg) to stabilize the proton-conductive polymer in the catalyst layer, thereby to form two catalyst layers (hereinafter referred to as catalyst layers EA).

From the polymer electrolyte membrane MA25, the ETFE sheet was peeled.

The polymer electrolyte membrane MA25 was interposed between the two catalyst layers EA, and this assembly was hot-pressed under conditions of a pressing temperature of 140° C., a pressing time of 5 minutes and a pressure of 1.5 MPa to bond the catalyst layers to both sides of the polymer electrolyte membrane MA25, respectively.

From the catalyst layer, the ETFE sheet was peeled to prepare a second intermediate (membrane/catalyst layer assembly) having an electrode area of 25 cm$^2$.

Step (1-II-4):

To 20 g of vapor-grown carbon fiber (tradename: VGCF-H, manufactured by Showa Denko K.K.; fiber diameter: about 150 nm, fiber length: 10 to 20 μm), 27 g of ethanol and 153 g of distilled water were added and thoroughly stirred. To this mixture, 140 g of liquid composition SB was added, followed by thorough stirring and further by mixing and pulverization by means of a homogenizer to prepare a coating fluid FB for forming an interlayer.

On the surface of carbon paper prepared in the same manner as in Example 1-1, the coating fluid FB for forming an interlayer was applied by a die coater so that the amount of the solid content would be 0.8 mg/cm$^2$ and dried for 15 minutes in a dryer at 80° C., thereby to prepare two sheets of a laminate having an interlayer formed on the surface of the carbon paper (hereinafter referred to as gas diffusion layer GDB).

The second intermediate was interposed between the two gas diffusion layers GDB so that on each of the cathode side and the anode side, the interlayer was located between the gas diffusion layer GDB and the catalyst layer, and this assembly was hot-pressed under conditions of a pressing temperature of 130° C., a pressing time of 2 minutes and a pressure of 3 MPa to obtain a membrane/electrode assembly having an electrode area of 25 cm$^2$.

With respect to the membrane/electrode assembly, the power generation characteristic and moistening/drying cycle tests were carried out. The results are shown in Table 2.

[Preparation of Test Piece for 90° Peeling Test]

A test piece was prepared in accordance with Procedures 1 and 2 in 90° peeling test (I-1).

Using the polymer electrolyte membrane MA25, catalyst layer and gas diffusion layer GDB obtained in Example 1-3, the catalyst layer was bonded to one side of the polymer electrolyte membrane MA25 by the same method and conditions as in Steps (1-II-2) to (1-II-3) in Example 1-3 to prepare a test piece 90.

A portion of 80 mm in a longitudinal direction from the terminal end of the test piece 90 and a portion of 80 mm in a longitudinal direction from the terminal end of the gas diffusion layer GDB were bonded so that the catalyst layer was located between the gas diffusion layer GDB and the polymer electrolyte membrane MA25 to prepare a test piece of 20 mm in width×220 mm in length. With respect to this test piece, 90° peeling test (I-1) was carried out. The results are shown in Table 2.

Example 1-4

By the above-described process (1-II), a membrane/electrode assembly was prepared.

Step (1-II-1):

The polymer electrolyte membrane MA25 was formed in the same manner as in Example 1-1.

Step (1-II-2):

The coating fluid CA was prepared in the same manner as in Example 1-1.

The coating fluid CA was applied on one side of the polymer electrolyte membrane MA25 by a die coater so that the amount of platinum would be 0.2 mg/cm$^2$, then dried for 15 minutes in a drier at 80° C. and further subjected to heat treatment at 190° C. in a reduced pressure atmosphere (5 mmHg) to form a catalyst layer by stabilizing the proton-conductive polymer in the catalyst layer thereby to prepare a first intermediate.

Step (1-II-3):

From the first intermediate, the ETFE sheet was peeled.

A catalyst layer was formed on the side of the polymer electrolyte membrane opposite to the catalyst layer side by the same temperature and conditions as in Step (1-II-2) to prepare a second intermediate (membrane/catalyst layer assembly).

Step (1-II-4):

In the same manner as in Example 1-3, the two gas diffusion layers GDB and the second intermediate were bonded to obtain a membrane/electrode assembly.

With respect to the membrane/electrode assembly, the power generation characteristic and moistening/drying cycle tests were carried out. The results are shown in Table 2.

[Preparation of Test Piece for 90° Peeling Test]

A test piece was prepared in accordance with Procedures 1 and 2 in 90° peeling test (I).

Using the first intermediate and gas diffusion layer GDB obtained in Example 1-4, a portion of 80 mm in a longitudinal direction from the terminal end of the first intermediate and a portion of 80 mm in a longitudinal direction from the terminal end of the gas diffusion layer GDB were bonded so that the catalyst layer was located between the gas diffusion layer GDB and the polymer electrolyte membrane MA25, to prepare a test piece of 20 mm in width×220 mm in length. With respect to this test piece, 90° peeling test (I-1) was carried out. The results are shown in Table 2.

Example 1-5

By the above-described Process (1-II), a membrane/electrode assembly was prepared.

Steps (1-II-1) to (1-II-3):

A second intermediate (membrane/catalyst layer assembly) was prepared in the same manner as in Example 1-3.

Step (1-II-4):

Two sheets of a gas diffusion layer made of carbon paper were prepared in the same manner as in Example 1-1.

The second intermediate was interposed between the two gas diffusion layers, followed by bonding in the same manner as in Example 1-3 to obtain a membrane/electrode assembly.

With respect to the membrane/electrode assembly, the power generation characteristic and moistening/drying cycle tests were carried out. The results are shown in Table 2.

[Preparation of Test Piece for 90° Peeling Test]

A test piece was prepared in accordance with Procedures 1 and 2 in 90° peeling test (I-1).

That is, the test piece was prepared in the same manner as in Example 1-3 except that in Example 1-3, the gas diffusion layer GDB was changed to carbon paper only. With respect to this test piece, 90° peeling test (I-1) was carried out. The results are shown in Table 2.

Example 1-6

By the above-described Process (1-II), a membrane/electrode assembly was prepared.

Step (1-II-1):

The polymer electrolyte membrane MB15 was formed in the same manner as in Example 1-2.

Steps (1-II-2) to (1-II-4):

A membrane/electrode assembly was obtained in the same manner as in Example 1-5 except that in Example 1-5, the polymer electrolyte membrane MA25 was changed to the polymer electrolyte membrane MB15.

With respect to the membrane/electrode assembly, the power generation characteristic and moistening/drying cycle tests were carried out. The results are shown in Table 2.

[Preparation of Test Piece for 90° Peeling Test]

A test piece was prepared in accordance with Procedures 1 and 2 in 90° peeling test (I-1).

That is, the test piece was prepared in the same manner as in Example 1-5 except that in Example 1-5, the polymer electrolyte membrane MA25 was changed to the polymer electrolyte membrane MB15. With respect to this test piece, 90° peeling test (I-1) was carried out. The results are shown in Table 2.

TABLE 2

| Membrane/ electrode assembly | 90° Peel strength (N/cm) | Dimensional change of gas diffusion layer (%) | Power generation characteristic (V) | Moistening/ drying cycle test |
|---|---|---|---|---|
| Example 1-1 | 0.1 | 1 | 0.57 | ○ |
| Example 1-2 | 0.075 | 1 | 0.49 | ○ |
| Example 1-3 | 0.13 | 1 | 0.56 | ○ |
| Example 1-4 | 0.19 | 1 | 0.60 | ○ |
| Example 1-5 | 0.00 | 1 | 0.56 | X |
| Example 1-6 | 0.00 | 1 | 0.48 | Δ |

From the results in Table 2, it is evident that by using the membrane/electrode assembly of the present invention, it is possible to provide a high power generation performance even in a low humidity environment, and it is excellent in durability in an environment where moistening and drying are repeated.

<2>

In the following Examples, gas chromatography is represented by "GC". The GC purity represents the purity of a compound obtained from the peak area ratio in the GC analysis.

(Ion Exchange Capacity)

The ion exchange capacity was determined in the same manner as in the method for determining the ion exchange capacity in <1>.

(TQ Value)

The TQ value was determined in the same manner as in the method for determining the TQ value in <1>

[Power Generation Test]

Each membrane/electrode assembly is assembled into a cell for power generation, and hydrogen (utilization: 50%) and air (utilization ratio: 50%) are pressurized to 200 kPa (absolute pressure) and supplied to the anode and the cathode, respectively, while the temperature of the membrane/electrode assembly is maintained at 80° C. The humidities of the gases are adjusted so that both hydrogen and air have a relative humidity of 30% (low humidity condition) or both hydrogen and air have a relative humidity of 100% (high humidity condition), and the cell voltage at a current density of 1.0 A/cm$^2$ is recorded under each condition.

[Observation of Cross Section]

Each membrane/electrode assembly is sandwiched between separators 2-82 and 2-84 having channels 2-82a and 2-84a with a width of 1 mm provided at intervals of 1 mm, as shown in FIG. 12(A), and while the temperature is maintained at from 75 to 80° C., 500 cc of nitrogen gas with a humidified dew point temperature of 80° C. is supplied to channels 2-82a and 2-84a defined by the membrane/electrode assembly and the separators 2-82 and 2-84 for 1 minute. Thereafter, non-humidified nitrogen gas (a dew point temperature: lower than 0° C.) is supplied for 1 minute. Such treatments are alternately repeated, and the behavior of the fuel cell (the cross-sectional state of the membrane/electrode assembly) at that time is observed and evaluated by the following standards.

"No peeling": As shown in FIG. 12(A), the polymer electrolyte membrane 2-30 and the cathode 2-10 or the anode 2-20 are bonded without being peeled.

"Peeling observed": As shown in FIG. 12(B), the polymer electrolyte membrane 2-30 and the cathode 2-10 or the anode 2-20 are peeled.

"No sagging": As shown in FIG. 12(A), the polymer electrolyte membrane 2-30 is free from deformation.

"Sagging observed": As shown in FIG. 12(B), the polymer electrolyte membrane 2-30 is deformed.

[90° Peeling Test]

The above-described 90° peeling test (I-2) is carried out depending upon the process for producing a membrane/electrode assembly.

As a double-sided adhesive tape 96, NW-20 (tradename: NICETACK, manufactured by NICHIBAN) is used.

As a single-sided adhesive tape 98, a KAPTON adhesive tape (tradename: KAPTON adhesive tape No. 6564S #25, manufactured by Teraoka Seisakusho Co., Ltd.) is used.

As a tensile tester, RTE-1210 (tradename: Universal Tester (Tensilon), manufactured by ORIENTEC) is used.

Example 2-1

Compound (m11) was prepared in the same manner as in the method for preparing compound (m11) in <1>

Example 2-2

(i) Preparation of Proton-Conductive Precursor Polymer P1:

A proton-conductive precursor polymer P1 was obtained in the same manner as in the process for preparing copolymer A in <1>. The yield of the proton-conducive precursor P1 was 1.2 g, the ion exchange capacity was 1.63 meq/g dry resin, and the TQ value was 225° C.

(ii) Preparation of Film of Polymer Q1:

The proton-conductive precursor polymer P1 was treated by the following method to obtain a film of an acid-form proton-conductive polymer Q1.

Firstly, the proton-conductive precursor polymer P1 was formed into a film having a thickness of from 100 to 200 µm by press molding at the TQ temperature of the proton-conductive precursor polymer P1.

Then, the film was immersed in an aqueous solution containing 30 mass % of dimethylsulfoxide and 15 mass % of potassium hydroxide at 80° C. for 16 hours to hydrolyze —SO$_2$F groups in the film to convert them to —SO$_3$K groups.

Then, the film was immersed in a 3 mol/L hydrochloric acid aqueous solution at 50° C. for 2 hours. The hydrochloric acid aqueous solution was changed, and the same treatment was further repeated four times. The film was thoroughly washed with deionized water to obtain a proton-conductive polymer Q1 having —SO$_3$K groups in the film converted to sulfonic acid groups.

(iii) Preparation of Coating Fluid S1 for Electrolyte Membrane:

To the proton-conductive polymer Q1, a mixed solvent of ethanol, water and 1-butanol (ethanol/water/1-butanol=35/50/15 by mass ratio) was added to adjust the solid content concentration to 15 mass %, followed by stirring at 125° C. for 8 hours by means of an autoclave. Water was further added to adjust the solid content concentration to 9 mass %, to obtain a coating fluid S1 for electrolyte membrane having the proton-conductive polymer Q1 dispersed in a dispersing medium. The composition of the dispersing medium was ethanol/water/1-butanol=21/70/9 (mass ratio).

Example 2-3

(i) Preparation of Proton-Conductive Precursor Polymer F1:

Tetrafluoroethylene and compound (2-1) were copolymerized to obtain a proton-conductive precursor polymer F1. The ion exchange capacity of the proton-conductive precursor polymer F1 was 1.10 meq/g dry resin, and the TQ value was 230° C.

$$CF_2\!=\!CFOCF_2CF(CF_3)O(CF_2)_2SO_2F \qquad (2\text{-}1)$$

(ii) Preparation of Film of Polymer H1:

The proton-conductive precursor polymer F1 was subjected to treatment for acid-form in the same manner as the proton-conductive precursor polymer P1 in Example 2-2 to obtain a film of an acid-form polymer H1.

(iii) Preparation of Coating Fluid S2 for Electrolyte Membrane:

To the proton-conductive polymer H1, a mixed solvent of ethanol and water (ethanol/water=60/40 by weight ratio) was added to adjust the solid content concentration to 26 mass %, followed by stirring at 100° C. for 8 hours by means of an autoclave, to obtain a coating fluid S2 for electrolyte membrane having the proton-conductive polymer H1 dispersed in the dispersing medium.

Example 2-4

By the above-described Process (2-1), a membrane/electrode assembly 1 is prepared.

Step (2-I-1):

The coating fluid S2 for electrolyte membrane is applied on a sheet made of a copolymer of ethylene with tetrafluoroethylene (tradename: AFLEX 100N, manufactured by Asahi Glass Company, Limited, thickness: 100 µm, hereinafter referred to as ETFE sheet) by a die coater and dried. Thereafter, it is subjected to anneal treatment at 170° C. for 30 minutes to form a polymer electrolyte membrane having a thickness of 25 µm.

Step (2-I-2):

35 g of a catalyst having 40% of a platinum/cobalt alloy supported on a carbon carrier (specific surface area: 250 m$^2$/g) (platinum/cobalt=36/4 (by mass ratio)) is added to 226.5 g of distilled water followed by pulverization by means of an ultrasonic wave-applying device, and 37.5 g of ethanol is further added, followed by thorough stirring to prepare a dispersion (b0).

To the dispersion (b0), 210 g of a dispersion (hereinafter referred to as an ethanol dispersion of proton-conductive polymer Q1) having a solid content concentration of 10 mass %, having the proton-conductive polymer Q1 dispersed in ethanol, is added and thoroughly stirred to obtain a coating fluid (b11) for a cathode catalyst layer.

Further, to the dispersion (b1), 210 g of a dispersion (hereinafter referred to as an ethanol dispersion of proton-conductive polymer H1) having a solid content concentration of 10 mass %, having the proton-conductive polymer H1 dispersed in ethanol, is added and thoroughly stirred to obtain a coating fluid (b12) for a cathode catalyst layer.

The coating fluid (b11) for a cathode catalyst layer is applied on the surface of the above-mentioned polymer electrolyte membrane by a die coater so that the amount of platinum will be 0.2 mg/cm$^2$ and dried for 5 minutes in a dryer at 90° C. and further dried for 30 minutes in a dryer at 120° C. to form layer A. Then, on the layer A, the coating fluid (b12) for a cathode catalyst layer is applied by a die coater so that the amount of platinum will be 0.2 mg/cm$^2$, followed by drying for 5 minutes in a dryer at 90° C. and further by drying for 30 minutes in a dryer at 120° C. to form a layer B, thereby to prepare a first intermediate having a catalyst layer for a cathode formed on the surface of the polymer electrolyte membrane.

Step (2-I-3):

33 g of a catalyst (tradename: TEC61E54, manufactured by Tanaka Kikinzoku, supported amount of platinum/ruthenium alloy: 53 mass %) having a platinum/ruthenium alloy (platinum/ruthenium=31/22 (mass ratio)) supported on a carbon carrier (specific surface area: 800 m$^2$/g) was added to 227.5 g of distilled water and pulverized by means of an ultrasonic wave-applying device, and 117.5 g of ethanol was further added, followed by thorough stirring. To this mixture, 122.5 g of the ethanol dispersion of proton-conductive polymer H1 was added, followed by thorough stirring to obtain a coating fluid (a) for an anode catalyst layer.

A gas diffusion layer for an anode, made of carbon paper having its surface treated with a dispersion containing carbon black particles and polytetrafluoroethylene (tradename: H2315T10AC1, manufactured by NOK, hereinafter referred to as carbon paper (B)) is prepared.

On the surface of this gas diffusion layer, the coating fluid (a) for an anode catalyst layer is applied by a die coater so that the amount of platinum will be 0.2 mg/cm$^2$, followed by drying for 15 minutes in a dryer at 80° C. to prepare an anode having a catalyst layer formed on the surface of the gas diffusion layer.

Step (2-I-4):

Carbon paper (B) is prepared as a gas diffusion layer for a cathode.

From the first intermediate, the ETFE sheet is peeled.

The gas diffusion layer of a cathode, the first intermediate and an anode are laminated so that for each of the anode and the cathode, the catalyst layer is located between the gas diffusion layer and the polymer electrolyte membrane. This laminate is hot-pressed under conditions of a pressing temperature of 150° C., a pressing time of 5 minutes and a pressure of 3 MPa to bond a catalyst layer on each side of the polymer electrolyte membrane to obtain a membrane/electrode assembly. Further, heat treatment at 190° C. is applied to the membrane/electrode assembly in a nitrogen atmosphere to stabilize the proton-conductive polymer in the catalyst layer, thereby to obtain a membrane/electrode assembly having an electrode area of 25 cm$^2$.

With respect to the membrane/electrode assembly, the power generation test and observation of the cross section are carried out to obtain the results as shown in Table 3.

(Preparation of Test Piece)

A test piece is prepared in accordance with Procedure 1 in 90° peel test (I-2).

A test piece of 20 mm in width×150 mm in length is cut out from the first intermediate obtained in Steps (2-I-1) and (2-I-2).

With respect to this test piece, 90° C. peeling test (I-2) is carried out to obtain the results shown in Table 3.

Example 2-5

A polymer electrolyte membrane having a thickness of 25 μm is formed on an ETFE sheet in the same manner as in Example 2-4, and the coating fluid (b12) for a cathode catalyst layer is applied on this surface so that the amount of platinum will be 0.2 mg/cm$^2$, then dried for 5 minutes in a dryer at 90° C. and further dried for 30 minutes in a dryer at 120° C., to obtain a first intermediate having a catalyst layer of a cathode formed on the surface of the polymer electrolyte membrane.

An anode is prepared in the same manner as in Step (2-I-3) in Example 2-4.

Carbon paper (B) is prepared as a gas diffusion layer for a cathode.

From the first intermediate, the ETFE sheet is peeled.

The gas diffusion layer, the first intermediate and the anode are laminated so that for each of the cathode and the anode, a catalyst layer is located between a gas diffusion layer and a polymer electrolyte membrane. This assembly is put in a pressing machine preliminarily heated to 140° C. and hot-pressed for 1 minute under a pressing pressure of 1.5 MPa to obtain a membrane/electrode assembly having an electrode area of 25 cm$^2$.

With respect to the membrane/electrode assembly, the power generation test and observation of the cross section are carried out to obtain the results shown in Table 3.

(Preparation of Test Piece)

A test piece of 20 mm in width×150 mm in length is cut out from a first intermediate obtained in the same manner as in Example 2-5.

With respect to this test piece, 90° peeling test (I-2) is carried out to obtain the results as shown in Table 3.

Example 2-6

In the same manner as in Example 2-4, a polymer electrolyte membrane having a thickness of 25 μm is formed on an ETFE sheet, and the coating fluid (b11) for a cathode catalyst layer is applied on this surface by a die coater so that the amount of platinum will be 0.2 mg/cm$^2$, then dried for 5 minutes in a dryer at 90° C. and further dried for 30 minutes in a dryer at 120° C., to prepare a first intermediate having a catalyst layer of a cathode formed on the surface of the polymer electrolyte membrane.

Then, a membrane/electrode assembly is obtained in the same manner as in Steps (2-I-3) to (2-I-4) in Example 2-4.

With respect to the obtained membrane/electrode assembly, the power generation test and observation of the cross section are carried out to obtain the results as shown in Table 3.

(Preparation of Test Piece)

A test piece of 20 mm in width×150 mm in length is cut out from a first intermediate obtained in the same manner as in Example 2-6.

With respect to this test piece, 90° peeling test (I) is carried out to obtain the results as shown in Table 3.

TABLE 3

| | Cell voltage | | | |
| --- | --- | --- | --- | --- |
| | Anode (hydrogen) Relative humidity: 30% Cathode (air) Relative humidity: 30% | Anode (hydrogen) Relative humidity: 100% Cathode (air) Relative humidity: 100% | Cross-sectional state of membrane/electrode assembly | 90° peel strength |
| Example 2-4 | 0.645 V | 0.690 V | No peeling No sagging | 0.18 N/cm |
| Example 2-5 | 0.604 V | 0.674 V | Peeling observed Sagging observed | 0.08 N/cm |
| Example 2-6 | 0.635 V | 0.570 V | No peeling No sagging | 0.19 N/cm |

<3>

In the following Examples, gas chromatography is represented by "GC". The GC purity represents the purity of a compound obtained from the peak area ratio in the GC analysis.

(Ion Exchange Capacity)

The ion exchange capacity was determined in the same manner as the method for determining the ion exchange capacity in <1>.

(TQ Value)

The TQ value was determined in the same manner as the method for determining the TQ value in <1>.

[Power Generation Test]

The cell voltage is recorded in the same manner as in the heat generation test method in <2>.

[Observation of Cross Section]

The evaluation was carried out in the same manner as in "observation of cross section" in <2>.

[90° Peeling Test]

The above-mentioned 90° peeling test (I-2) is carried out in accordance with the process for preparing the membrane/electrode assembly 3-5.

As a double-sided adhesive tape 3-96, NW-20 (tradename: NICETACK, manufactured by NICHIBAN) is used.

As a single-sided adhesive tape 3-98, a KAPTON adhesive tape (tradename: KAPTON adhesive tape No. 6564S #25, manufactured by Teraoka Seisakusho Co., Ltd.) is used.

As a tensile tester, RTE-1210 (tradename: Universal Tester (Tensilon), manufactured by ORIENTEC) is used.

Example 3-1

Compound (m11) was prepared in the same manner as in the process for preparing compound (m11) in <1>.

Example 3-2

(i) Preparation of Proton-Conductive Precursor Polymer P1:

A proton-conductive precursor polymer P1 was obtained in the same manner as in the process for preparing copolymer A in <1>. The yield of the proton-conductive precursor polymer P1 was 1.2 g, the ion exchange capacity was 1.63 meq/g dry resin, and the TQ value was 225° C.

(ii) Preparation of Film of Proton-Conductive Polymer Q1:

A film of the proton-conductive polymer Q1 was obtained in the same manner as the production of the film of the proton-conductive polymer Q1 in <2>.

(iii) Preparation of Coating Fluid S1 for Electrolyte Membrane:

A coating fluid S1 for electrolyte membrane was obtained in the same manner as the preparation of the coating fluid S1 for electrolyte membrane in <2>.

Example 3-3

(i) Preparation of Proton-Conductive Precursor Polymer F1:

A proton-conductive precursor polymer F1 was obtained in the same manner as the preparation of the proton-conductive precursor polymer F1 in <2>.

(ii) Preparation of Film of Proton-Conductive Polymer H1:

A film of a proton-conductive polymer H1 was obtained in the same manner as the preparation of the film of the proton-conductive polymer H1 in <2>.

(iii) Preparation of Coating Fluid S2 for Electrolyte Membrane:

A coating fluid S2 for electrolyte membrane was obtained in the same manner as the preparation of the coating fluid S2 for electrolyte membrane in <2>.

Example 3-4

A membrane/electrode assembly 3-5 is prepared in the same manner as in the process (3-I) for preparing the membrane/electrode assembly 3-5.

Step (3-I-1):

A polymer electrolyte membrane having the entire thickness of 25 μm is formed in the same manner as in Step (2-I-1) in Example 2-4.

Step (3-I-2):

The coating fluid (b11) for a cathode catalyst layer and a coating fluid (b12) for a cathode catalyst layer are obtained in the same manner as in Step (2-I-2) in Example 2-4.

On the surface of a polymer electrolyte membrane, a catalyst layer 3-12 is formed which is divided into two regions as shown in FIG. 14(b) in a direction vertical to a side 3-12d by a line 3-15 i.e. a region (A) 3-12a and a region (B) 3-12b, thereby to prepare a first intermediate 3-50. That is, on the surface of a polymer electrolyte membrane 3-30, the coating fluid (b11) for a cathode catalyst layer is applied by a die coater so that the amount of platinum will be 0.2 mg/cm$^2$, then dried for 5 minutes in a dryer at 90° C. and further dried for 30 minutes in a dryer at 120° C. to form a coating film which will be a catalyst layer of the region (A) 3-12a. Then, the coating fluid (b12) for a cathode catalyst layer is applied by a die coater so that the amount of platinum will be 0.2 mg/cm$^2$, then dried for 5 minutes in a dryer at 90° C. and further dried for 30 minutes in a dryer at 120° C. to form a coating film which will be catalyst layer of the region (B) 3-12b, thereby to prepare a first intermediate having a catalyst layer formed on the surface of the polymer electrolyte membrane.

Step (3-I-3):

A gas diffusion layer for an anode made of carbon paper having its surface treated with a dispersion containing carbon black particles and polytetrafluoroethylene (tradename: H2315T10AC1, manufactured by NOK) (hereinafter referred to as carbon paper (B)), is prepared.

33 g of a catalyst (tradename: TEC61E54, manufactured by Tanaka Kikinzoku, supported amount of platinum ruthenium alloy: 53 mass %) having a platinum/ruthenium alloy (platinum/ruthenium=31/22 (mass ratio)) supported on a carbon carrier (specific surface area: 800 m$^2$/g) is added to 227.5 g of distilled water and pulverized by means of a ultrasonic wave applying device, and 117.5 g of ethanol is further added, followed by thorough stirring. To this mixture, 122.5 g of the ethanol dispersion of proton-conductive polymer H1 is added, followed by thorough stirring to obtain a coating fluid (a) for an anode catalyst layer.

The coating fluid (a) for an anode catalyst layer is applied on the surface of the gas diffusion layer by a die coater so that the amount of platinum will be 0.2 mg/cm$^2$, and dried for 15 minutes in a dryer at 80° C. to prepare an anode having a catalyst layer formed on the surface of the gas diffusion layer.

Step (3-I-4):

A membrane/electrode assembly having an electrode area of 25 cm$^2$ is obtained in the same manner as in Step (2-I-4) in Example 2-4.

With respect to the membrane/electrode assembly, the power generation test and observation of the cross section are carried out to obtain the results as shown in Table 4.

(Preparation of Test Piece)

A test piece is prepared in accordance with Procedure 1 in 90° peeling test (I-2).

A test piece of 20 mm in width×150 mm in length is cut out from the first intermediate obtained in Steps (3-I-1) and (3-I-2).

With respect to this test piece, 90° peeling test (I-2) is carried out to obtain the results as shown in Table 4.

Example 3-5

In the same manner as in Example 3-4, a polymer electrolyte membrane having a thickness of 25 μm is formed on an ETFE sheet.

Over the entire surface of the polymer electrolyte membrane, the coating fluid (b12) for a cathode catalyst layer is applied by a die coater so that the amount of platinum will be 0.2 mg/cm$^2$, then dried for 5 minutes in a dryer at 90° C. and further dried for 30 minutes in a dryer at 120° C. to prepare a first intermediate having a catalyst layer for a cathode formed on the surface of the polymer electrolyte membrane.

An anode is prepared in the same manner as in Step (3-I-3) in Example 3-4.

Carbon paper (B) is prepared as a gas diffusion layer for a cathode.

From the first intermediate 3-50, the ETFE sheet is peeled.

The gas diffusion layer, the first intermediate and the anode are laminated so that for each of the cathode and the anode, a catalyst layer is located between a gas diffusion layer and a polymer electrolyte membrane. This assembly is put in a pressing machine preliminarily heated to 140° C. and hot-pressed for 1 minute under a pressing pressure of 1.5 MPa to obtain a membrane/electrode assembly having an electrode area of 25 cm$^2$.

With respect to the membrane/electrode assembly, the power generation test and observation of the cross section are carried out to obtain the results as shown in Table 4.

(Preparation of Test Piece)

A test piece of 20 mm in width×150 mm in length is cut out from the first intermediate obtained in the same manner as in Example 3-5.

With respect to this test piece, 90° peeling test (I-2) is carried out to obtain the results as shown in Table 4.

Example 3-6

In the same manner as in Example 3-4, a polymer electrolyte membrane having a thickness of 25 μm is formed on an ETFE sheet.

Over the entire surface of the polymer electrolyte membrane 3-30, the coating fluid (b11) for a cathode catalyst layer is applied by a die coater so that the amount of platinum will be 0.2 mg/cm$^2$, then dried for 5 minutes in a dryer at 90° C. and further dried for 30 minutes in a dryer at 120° C. to prepare a first intermediate 3-50 having a catalyst layer for a cathode formed on the surface of the polymer electrolyte membrane.

Then, a membrane/electrode assembly 3-5 is obtained in the same manner as in Steps (3-I-3) to (3-I-4) in Example 3-4.

With respect to the membrane/electrode assembly 3-5, the power generation test and observation of the cross section are carried out to obtain the results as shown in Table 4.

(Preparation of Test Piece)

A test piece of 20 mm in width×150 mm in length is cut out from the first intermediate obtained in the same manner as in Example 3-6.

With respect to this test piece, 90° peeling test (I-2) is carried out to obtain the results as shown in Table 4.

TABLE 4

| | Cell voltage | | | |
| --- | --- | --- | --- | --- |
| | Anode (hydrogen) Relative humidity: 30% Cathode (air) Relative humidity: 30% | Anode (hydrogen) Relative humidity: 100% Cathode (air) Relative humidity: 100% | Cross-sectional state of membrane/electrode assembly | 90° peel strength |
| Example 3-4 | 0.645 V | 0.690 V | No peeling No sagging | 0.18 N/cm |
| Example 3-5 | 0.604 V | 0.674 V | Peeling observed Saggin observed | 0.08 N/cm |
| Example 3-6 | 0.635 V | 0.570 V | No peeling No sagging | 0.19 N/cm |

INDUSTRIAL APPLICABILITY

The membrane/electrode assembly of the present invention can provide a high power generation performance stably in various environments and thus is very useful for a polymer electrolyte fuel cell to be used for e.g. a power source for a mobile body such as an automobile, a dispersed power generation system or a household cogeneration system.

The fuel cell of the present invention can provide a high power generation performance stably in various environments and thus is very useful for a polymer electrolyte fuel cell to be used for e.g. a power source for a mobile body such as an automobile, a dispersed power generation system or a household cogeneration system.

The entire disclosures of Japanese Patent Application No. 2007-022404 filed on Jan. 31, 2007, Japanese Patent Application No. 2007-022406 filed on Jan. 31, 2007 and Japanese Patent Application No. 2007-147984 filed on Jun. 4, 2007 including specifications, claims, drawings and summaries are incorporated herein by reference in their entireties.

The invention claimed is:

1. A membrane/electrode assembly for polymer electrolyte fuel cells, comprising:
   a first electrode having a first cathode catalyst layer and a first gas diffusion layer,
   a second electrode having a second catalyst layer and a second gas diffusion layer, and
   a polymer electrolyte membrane disposed between the first electrode and the second electrode,
   wherein the 90° peel strength of at least one of the interface between the first electrode and the polymer electrolyte membrane and the interface between the second electrode and the polymer electrolyte membrane is at least 0.03 N/cm,
   wherein the cathode catalyst layer comprises
      a layer A comprising a proton-conductive polymer with an ion exchange capacity of X meq/g dry resin, wherein the layer A is in contact with the polymer electrolyte membrane, and
      a layer B comprising a proton-conductive polymer with an ion exchange capacity of Y meq/g dry resin, wherein the layer B is in contact with the cathode gas diffusion layer;
   and wherein said X and Y satisfy the following formulae (a) to (c) simultaneously:
   $1.5 < X \leq 2.0$ (a), $0.9 < Y \leq 1.5$ (b), and $0.18 \leq (X-Y)$ (c).

2. The membrane/electrode assembly for polymer electrolyte fuel cells according to claim 1, wherein the first catalyst layer comprises an electrode catalyst and a proton-conductive polymer; the second catalyst layer comprises an electrode catalyst and a proton-conductive polymer; said polymer electrolyte membrane is disposed between the first catalyst layer and the second catalyst layer; the polymer electrolyte membrane has a proton conductivity of at least 0.05 S/cm in an atmosphere at a temperature of 80° C. under a relative humidity of 40%; the 90° peel strength between the polymer electrolyte membrane and the first gas diffusion layer is at least 0.03 N/cm; and the dimensional change when the first gas diffusion layer is immersed in warm water of 80° C., is less than 10%.

3. The membrane/electrode assembly for polymer electrolyte fuel cells according to claim 2, wherein the polymer electrolyte membrane is formed by casting a liquid composition having a proton-conductive polymer dispersed in a dispersing medium.

4. The membrane/electrode assembly for polymer electrolyte fuel cells according to claim 1, wherein the first electrode having a first catalyst layer and a first gas diffusion layer, is a cathode having the cathode catalyst layer and a cathode gas diffusion layer, and the second electrode having a second catalyst layer and a second gas diffusion layer, is an anode having an anode catalyst layer and an anode gas diffusion layer.

5. The membrane/electrode assembly for polymer electrolyte fuel cells according to claim 4, wherein the 90° C. peel strength of at least one of the interface between the anode and the polymer electrolyte membrane and the interface between the cathode and the polymer electrolyte membrane is at least 0.1 N/cm.

* * * * *